Sept. 18, 1934.   M. L. NELSON ET AL   1,974,191
MERCHANDISE CONTROL SYSTEM
Original Filed April 18, 1932   21 Sheets—Sheet 1

Sept. 18, 1934.  M. L. NELSON ET AL  1,974,191
MERCHANDISE CONTROL SYSTEM
Original Filed April 18, 1932  21 Sheets-Sheet 3

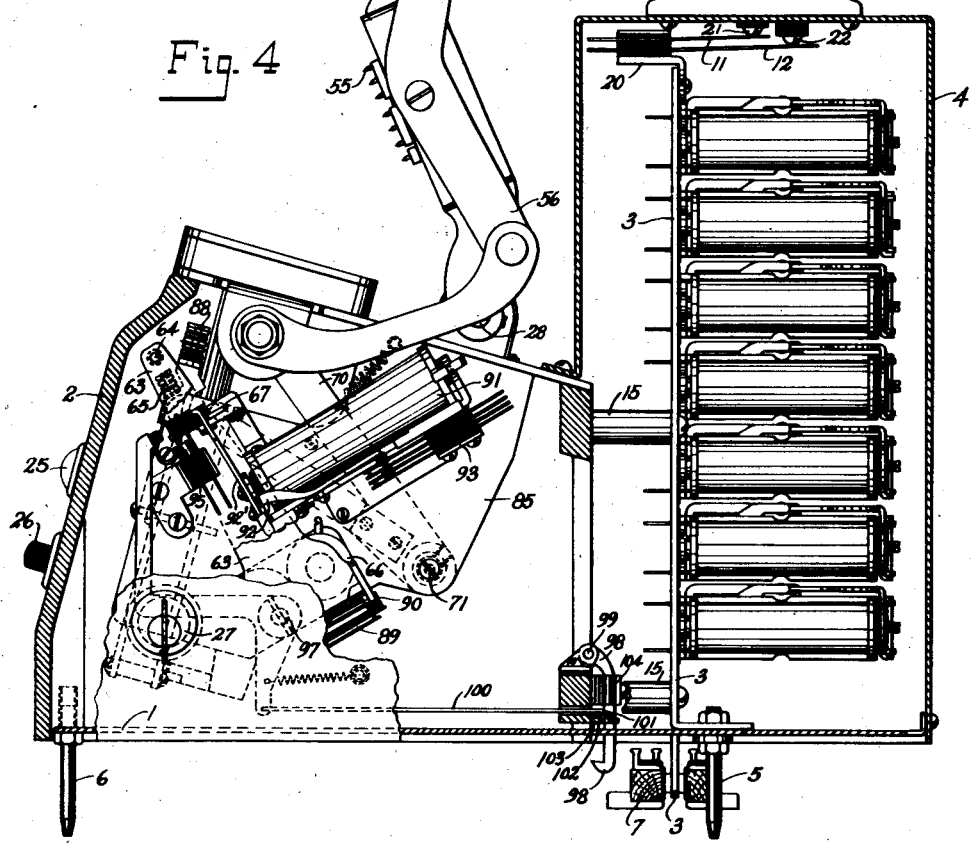

YARD GOODS & BULK GOODS KEY SET

Sept. 18, 1934.                M. L. NELSON ET AL                1,974,191
                          MERCHANDISE CONTROL SYSTEM
                     Original Filed April 18, 1932    21 Sheets-Sheet 18

Fig. 19

Inventors
Martin L. Nelson
Harold C. Robinson
C. R. Sipe
Atty.

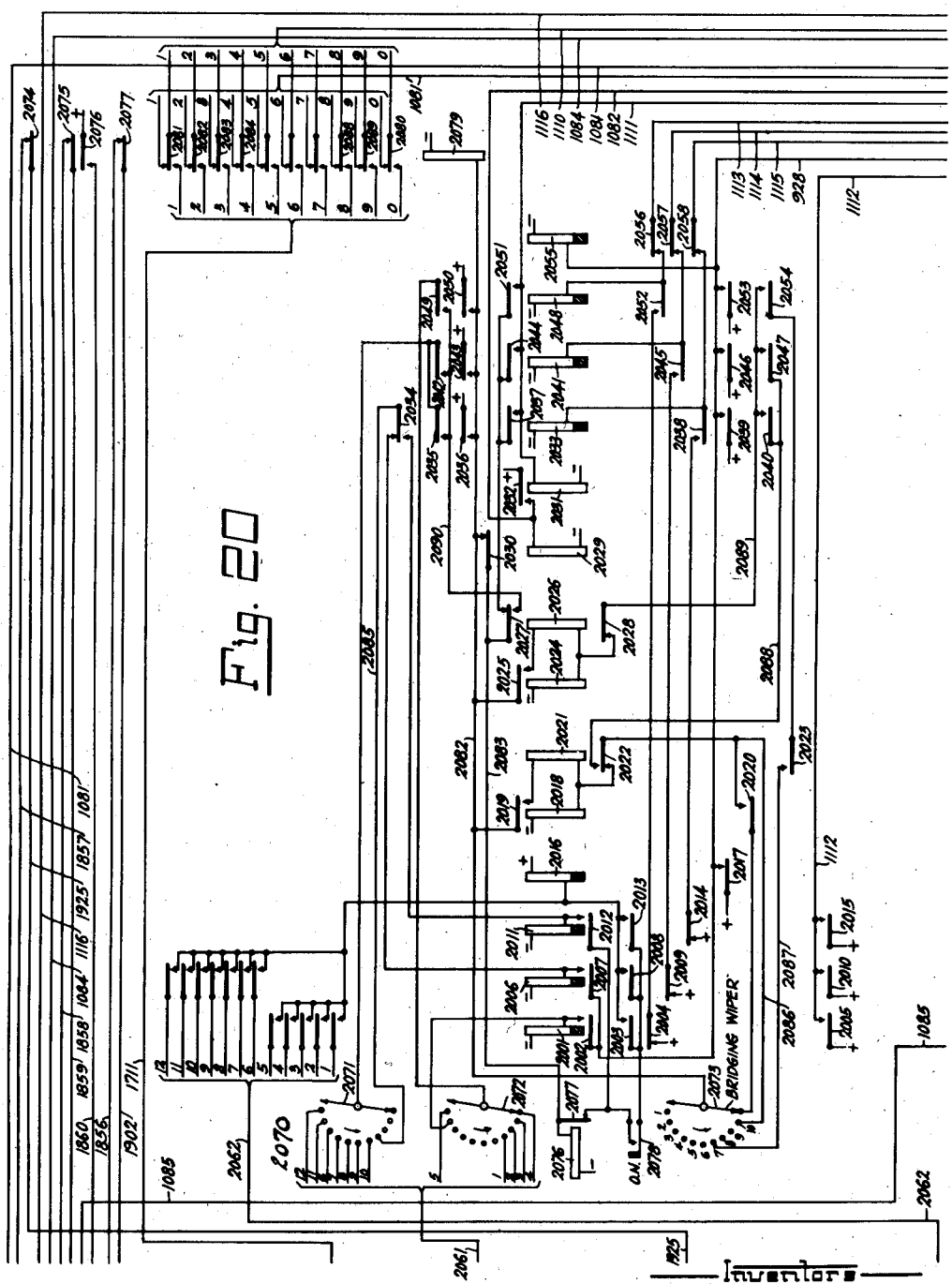

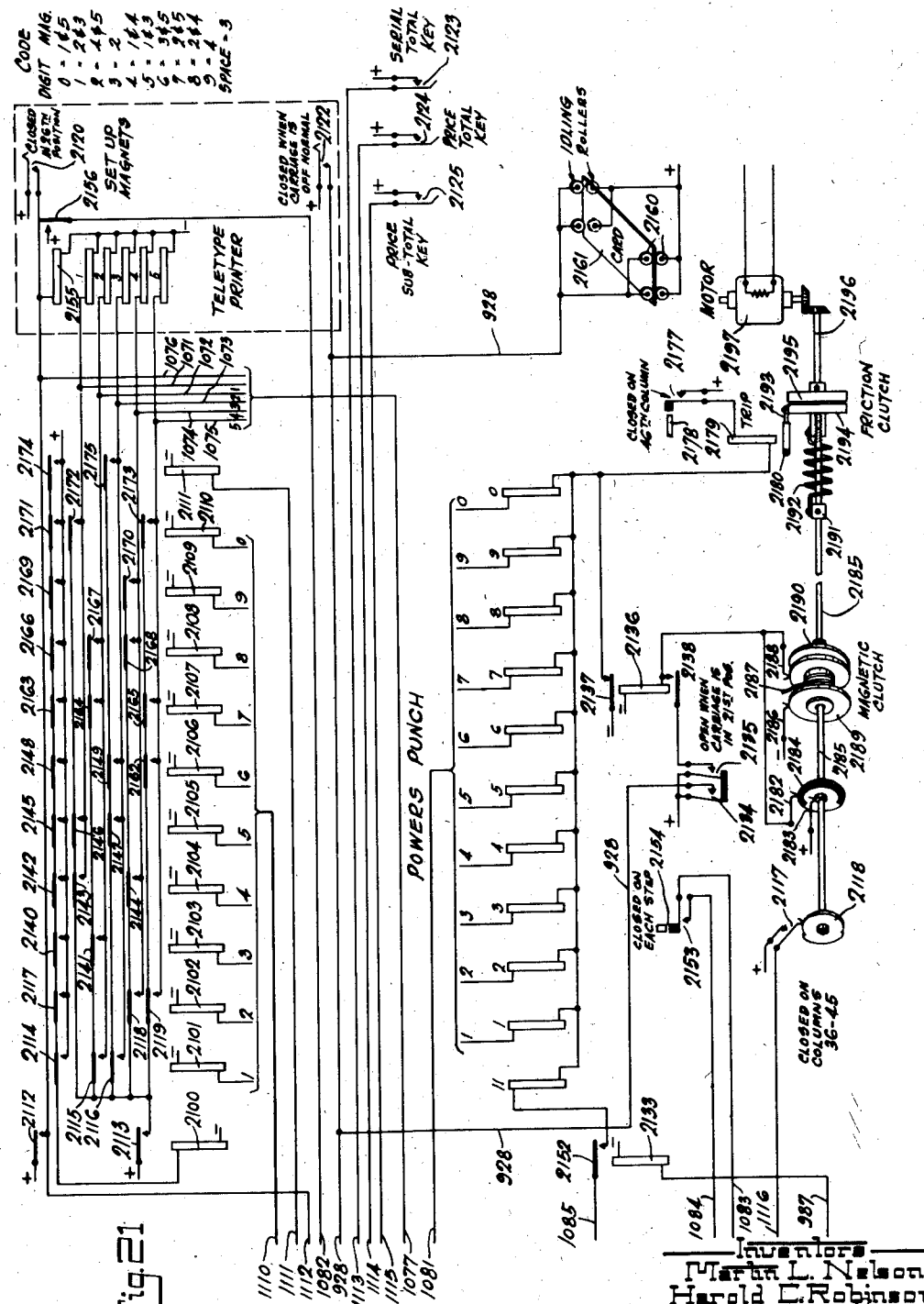

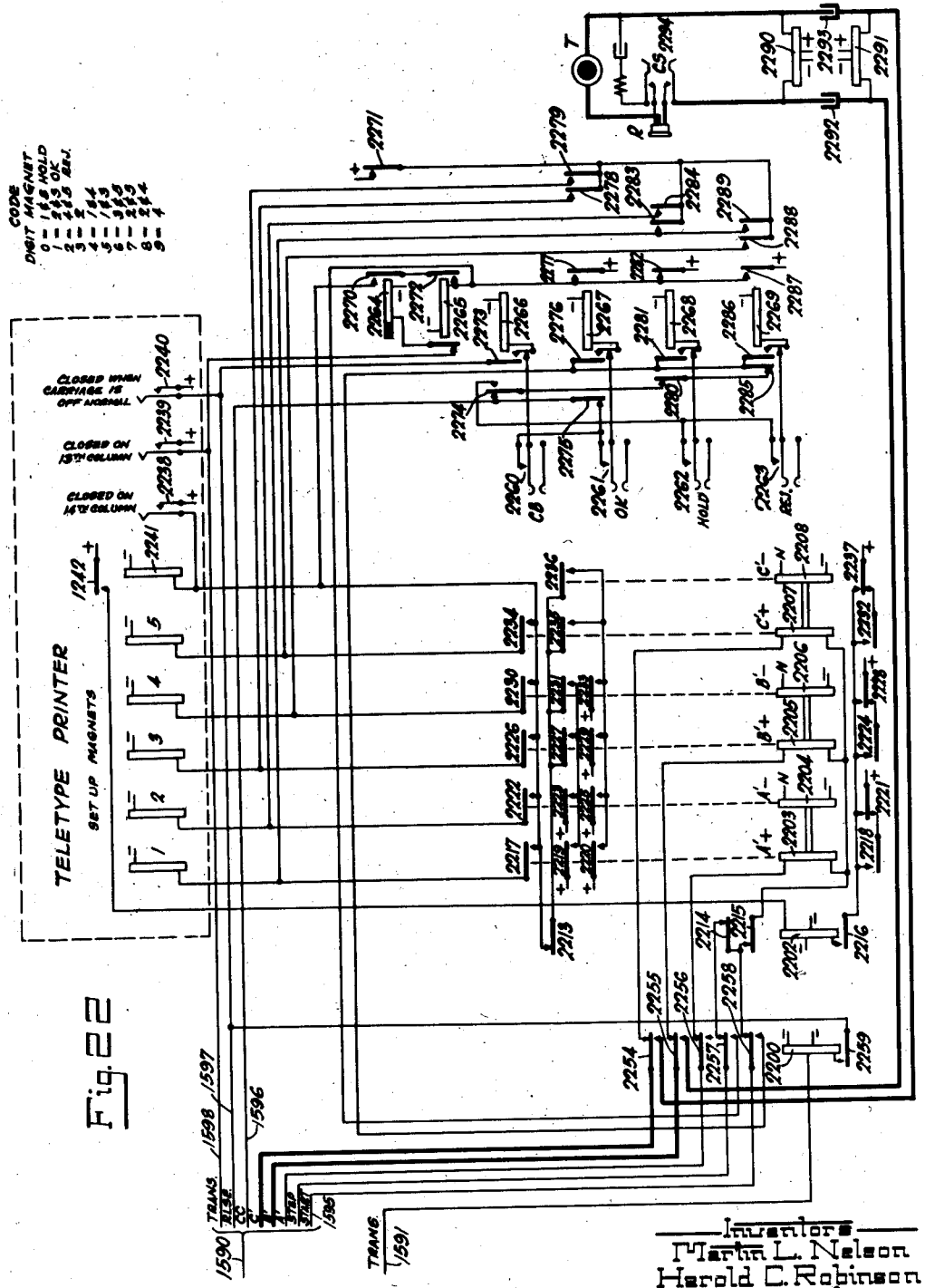

Patented Sept. 18, 1934

1,974,191

UNITED STATES PATENT OFFICE 1,974,191

MERCHANDISE CONTROL SYSTEM

Martin L. Nelson, Park Ridge, and Harold C. Robinson, Chicago, Ill., assignors, by mesne assignments, to Associated Electric Laboratories, Inc., Chicago, Ill., a corporation of Delaware Application April 18, 1932, Serial No. 605,842
Renewed January 4, 1934

51 Claims. (Cl. 178—4)

The present invention relates to an electrically-controlled accounting system.

The system disclosed in the present application may be considered as an improvement on co-pending application Serial No. 275,643, filed May 7, 1928, and Serial No. 454,885, filed May 23, 1930, now Patent No. 1,927,556, dated Sept. 19, 1933. These applications disclose systems for automatically recording the sale of merchandise articles in the various departments or sale floors of a department store at a centrally-located accounting or auditing room.

The main object of the present invention is the provision of a credit authorization arrangement for enabling each charge or credit sale to be quickly approved or rejected by the credit department of a department retail store and for making a permanent record of such approval or rejection.

One of the features relates to the selecting arrangement for selecting a particular credit operator's position in accordance with a portion of the customer's assigned number and the circuit arrangement for repeating that portion of the customer's number which is used for selecting the operator's position so that the complete customer's number is recorded at the credit operator's position.

Another feature relates to the arrangements for switching calls from one position to another to enable a single credit operator to handle calls at her position, normally intended for other positions so that during the non-busy periods certain positions may be vacated.

A further feature relates to the controlled release of the transmitter on unapproved charge or "credit" sales and the automatic release of the transmitter on approved credit and cash sales.

Another feature relates to transmission and recording of "take" or "send" indications which indicate whether the article sold to the customer is to be taken by the customer or to be sent to the customer's address.

A still further feature relates to the provision of two separate switch trains, one used for transmitting "cash" and "approved credit" sales to the central recording room and the other used for transmitting "credit" sales to the credit department.

Another feature relates to the provision of means in the transmitter for first transmitting a "credit" sale over the "credit" switch train to the credit department and then automatically reoperating the transmitter to transmit an "approved credit" sale, over the cash switch train to the recording room in case the credit operator has approved this sale.

An additional feature relates to the provision of means for simultaneously transmitting a "cash" sale and a "credit" sale from different transmitters on the same transmitter line.

A further feature relates to an improved mechanical and electrical transmitter having improved locking, printing, and card-checking means.

Another feature relates to the revertive control arrangement between a transmitter and a group of control relays for automatically stopping the transmission of a sales transaction in case the printer, the punch, or the adding machine associated with the control relays fail to operate properly.

Another feature relates to the means for transmitting and recording indications which indicate that the article sold is bulk or yard goods.

Further features, not specifically mentioned above, relate mostly to holding, guarding, transferring, and other improved circuit arrangements and will be described more in detail by referring to the accompanying drawings comprising Figs. 1 to 22, inclusive.

Fig. 1 diagrammatically illustrates a one-line diagram of the complete system and Fig. 1—A is a key sheet for arranging the various sheets of circuit drawings.

Figs. 2, 3, 4, and 5 show different views of the transmitter with certain parts broken away to show the interior mechanism more clearly.

Fig. 4 shows the other side view of the transmitter with certain parts removed to show additional mechanism.

Fig. 5 shows a top view of the removed contact plate.

Fig. 5—A shows the various cards used in the transmitter and the code for marking the cards.

Figure 6:
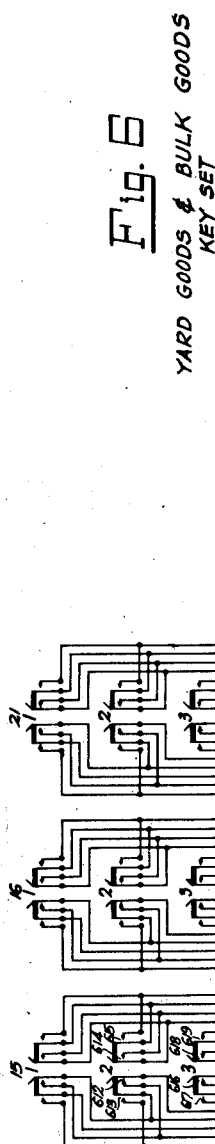

Fig. 6 shows in detail part of the wiring of the yard-goods key set. The keys are of the type commonly known as ladder latching keys, manufactured by the American Electric Company of Chicago, Illinois.

Figure 7:
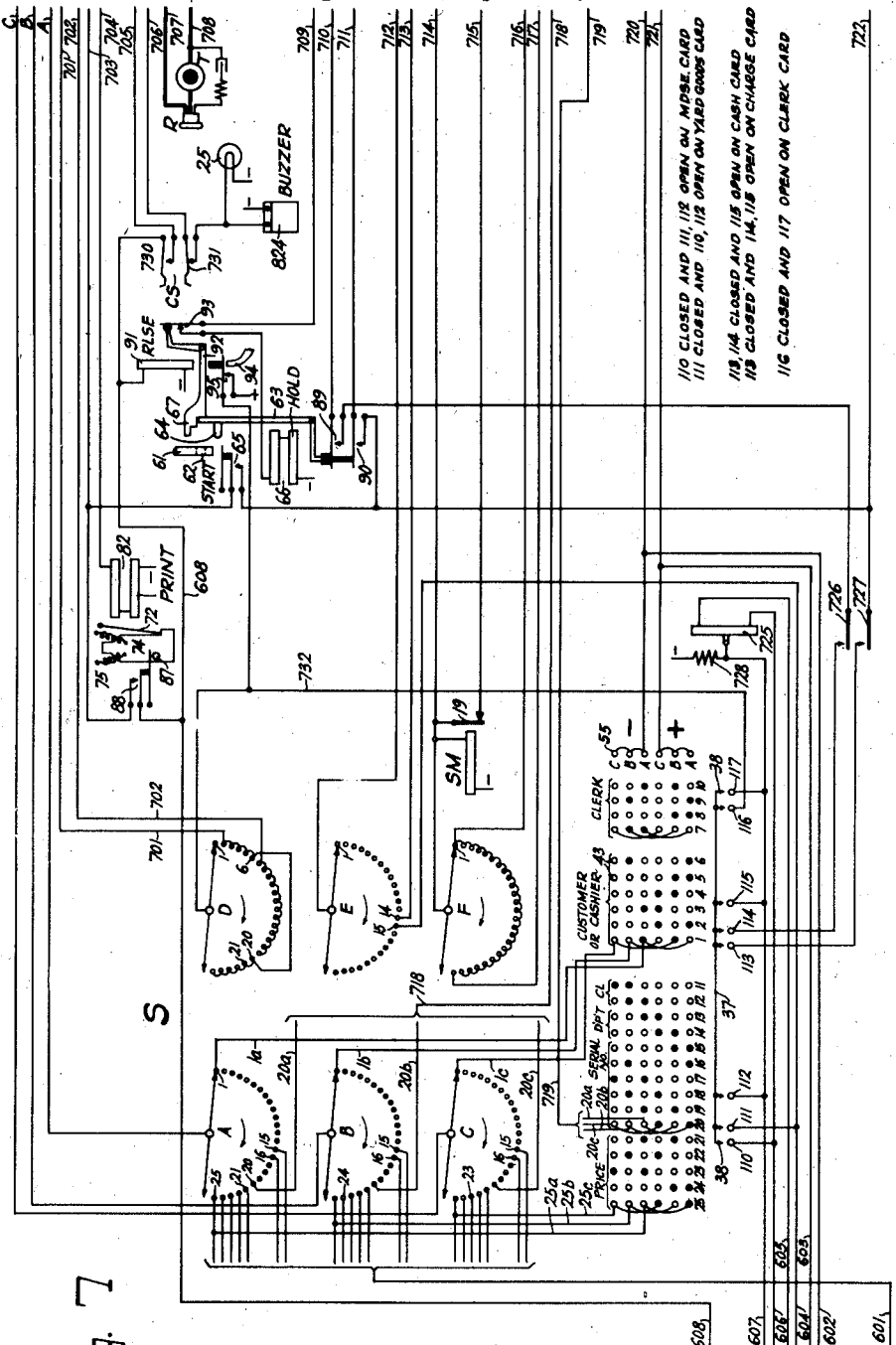
Figure 8:
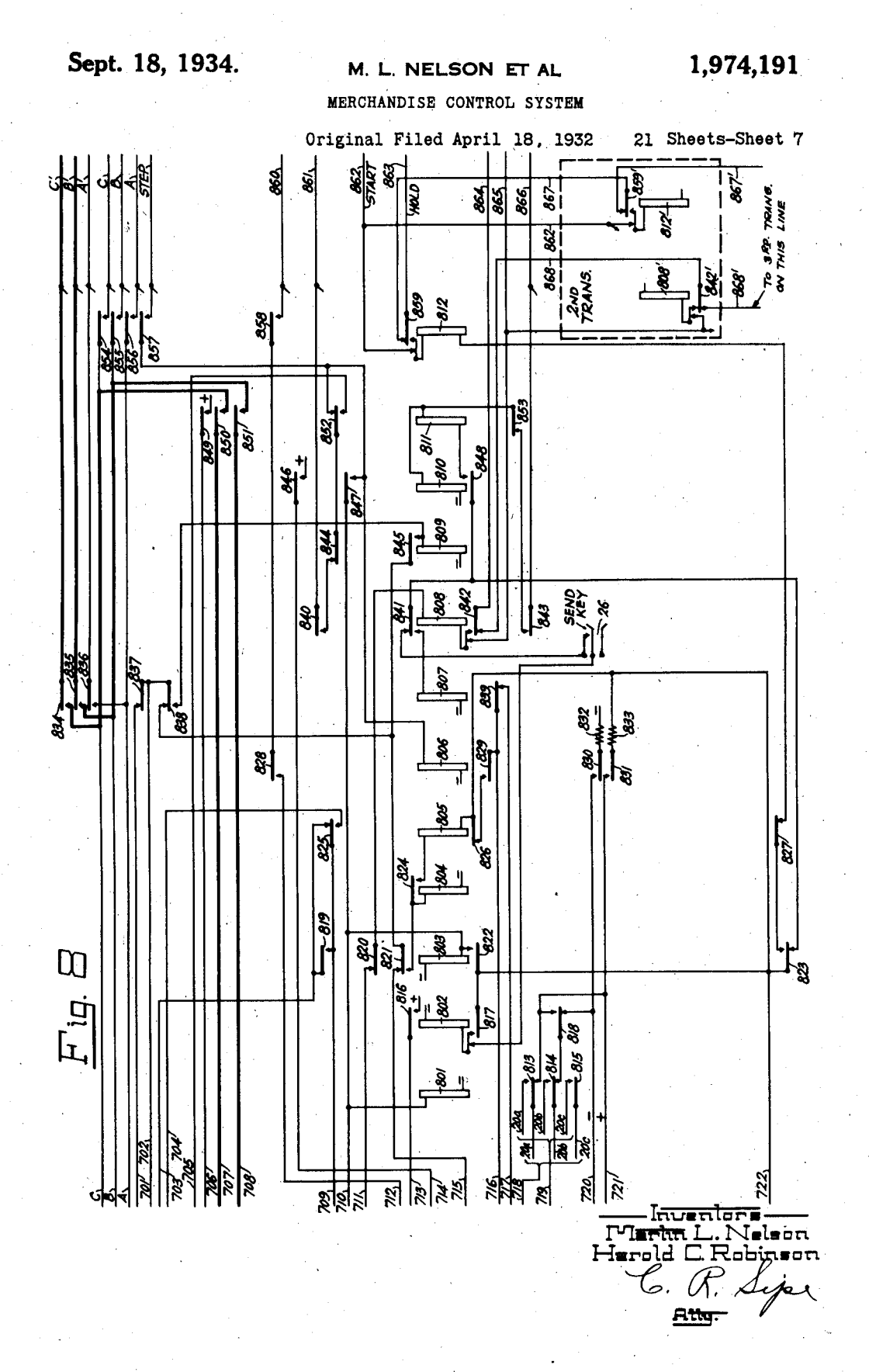

Figs. 7 and 8 show the detail circuits of the transmitter disclosed mechanically in Figs. 2, 3, 4, and 5.

Figure 1:
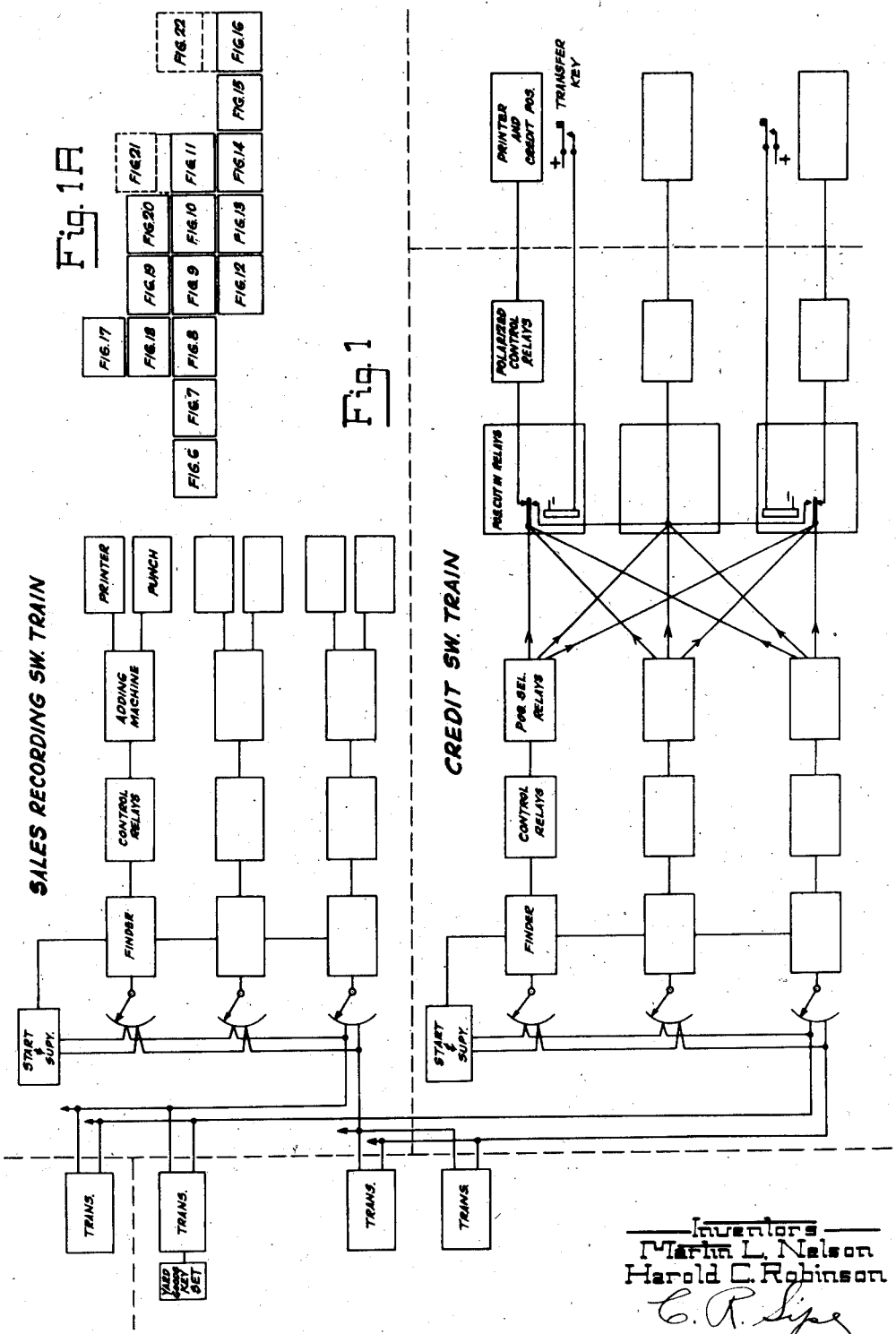
Figure 9:
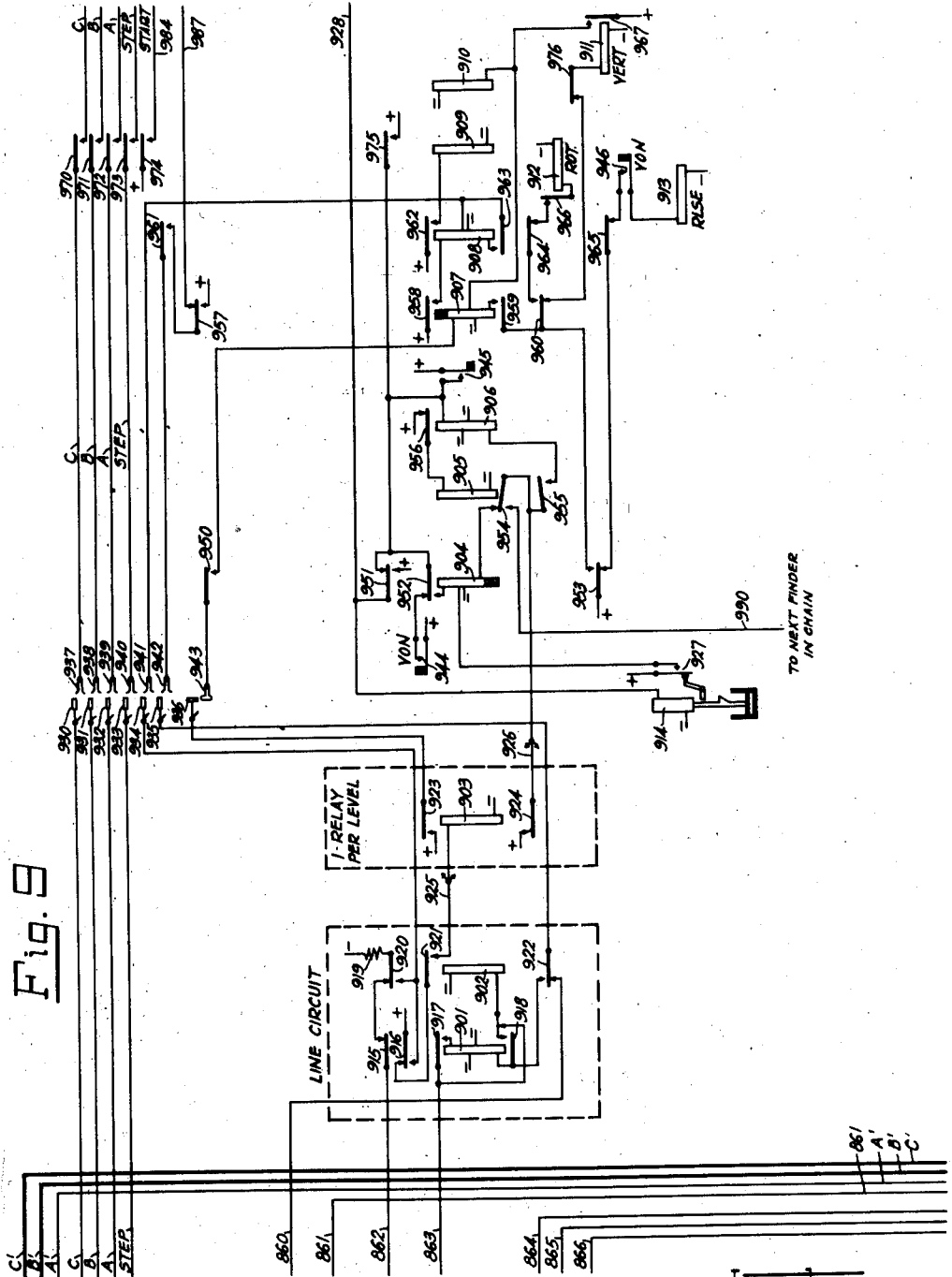

Fig. 9 shows a part of the supervisory line and start circuits on the left of the sheet, and on the right-hand portion of the sheet shows the detail circuits of a finder. This finder is of the well-known Strowger type switch having motion in two planes to find and connect with the transmitter shown in Figs. 7 and 8 and other similar transmitters. This equipment is used in the Sales recording switch train as shown in Fig. 1.

Figure 10:
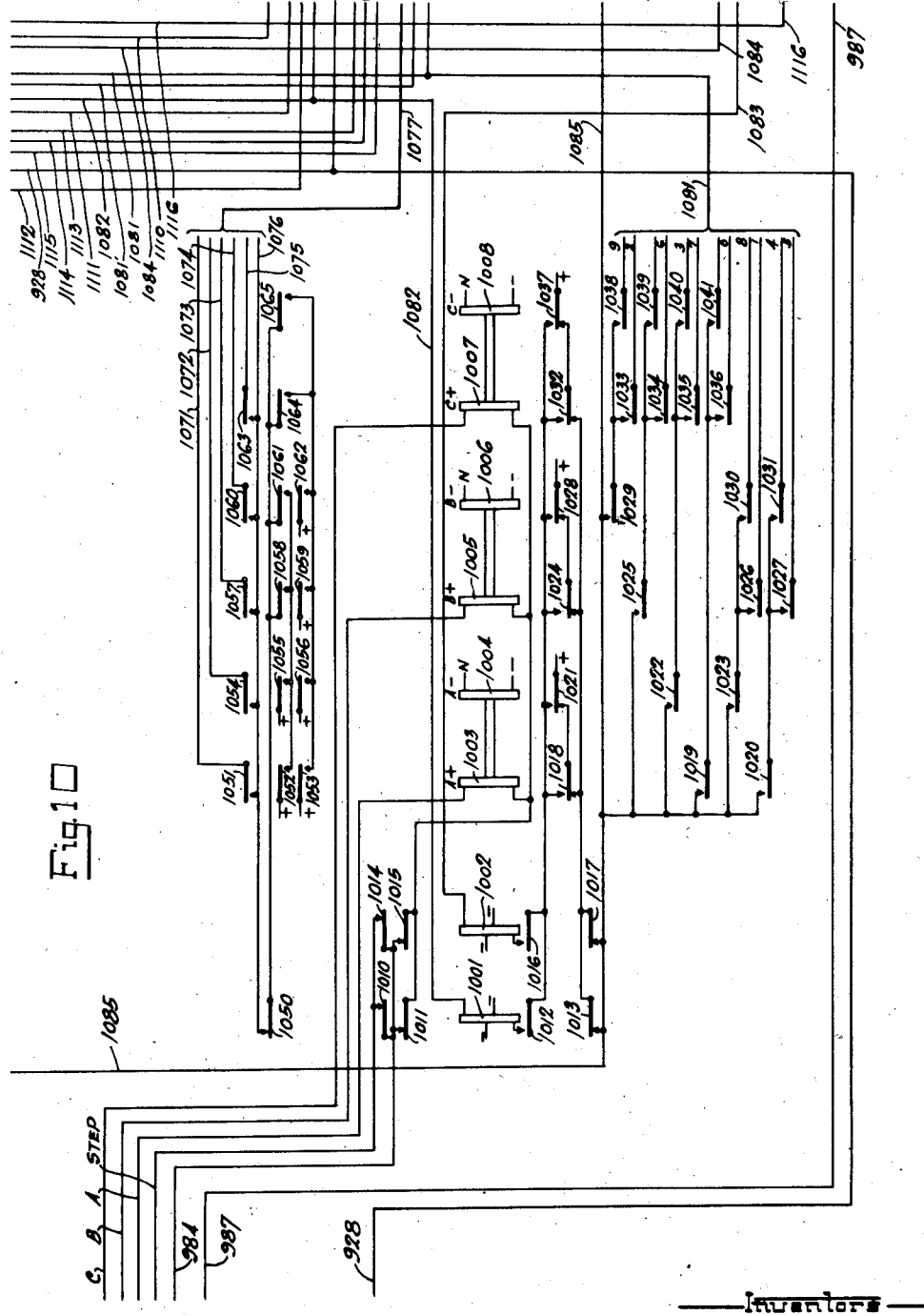
Figure 11:
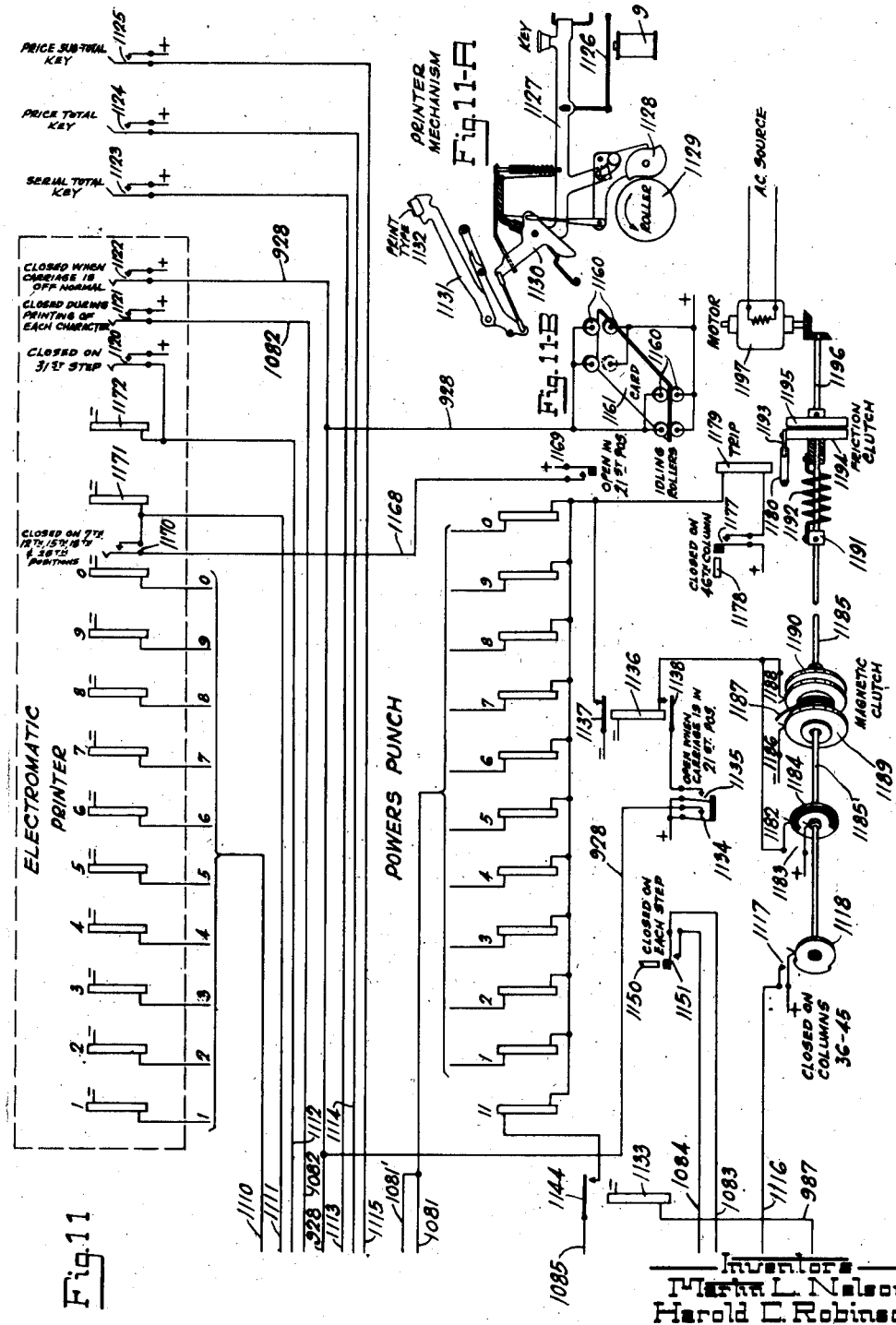

Fig. 10 shows a group of control relays individual to the finder shown in Fig. 9 and is used for translating the code sent by the transmitter from a double-punching code to a single code to control the punch and printer shown in Fig. 11.

The upper portion of Fig. 11 shows the numeral magnets for operating the numeral type bars of the printer. This printer or typewriter is manufactured by the Electromatic Typewriters Inc. of Rochester, New York, and is provided with electromagnets for operating the numeral keys. A publication in Product Engineering, pages 513 to 516 of November, 1930, discloses a somewhat similar typewriter. The manner in which the magnets operate the numeral levers is diagrammatically illustrated in Fig. 11—A.

The lower portion of Fig. 11 shows a Powers punch somewhat similar to the punch disclosed in Patent No. 1,305,557, issued to W. W. Lasker. The magnets shown control the setting pins and carriage of the punch by wires as described in the above-mentioned patent.

Fig. 11—B diagrammatically shows a card-check arrangement for indicating when a card is in position to be punched. This arrangement is accomplished by insulating the whole idling roller assembly from the frame of the machine.

Figure 12:
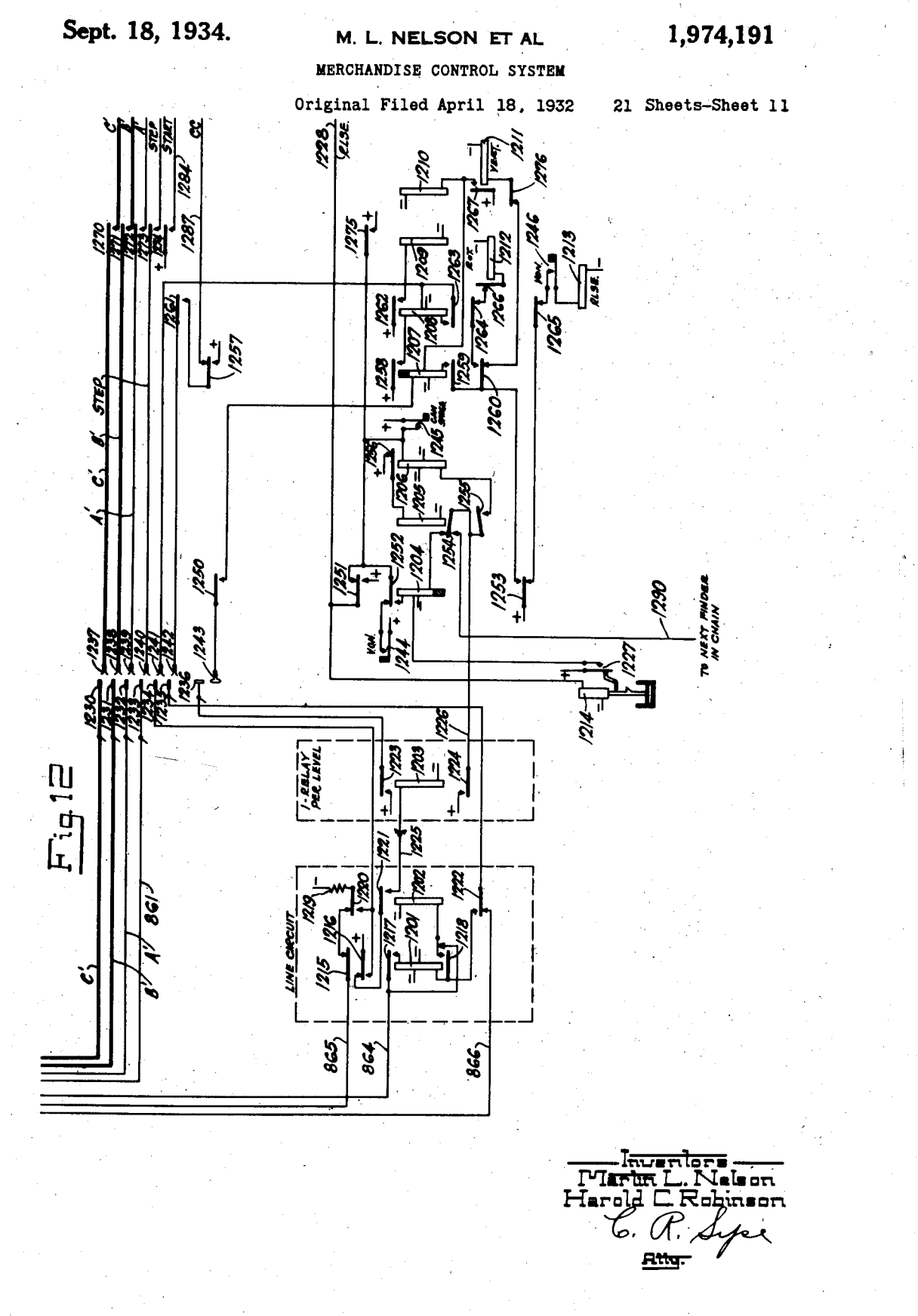

Fig. 12 shows equipment similar to that shown in Fig. 9. This switching equipment is used in the Credit switch train as shown in Fig. 1.

Figure 13:
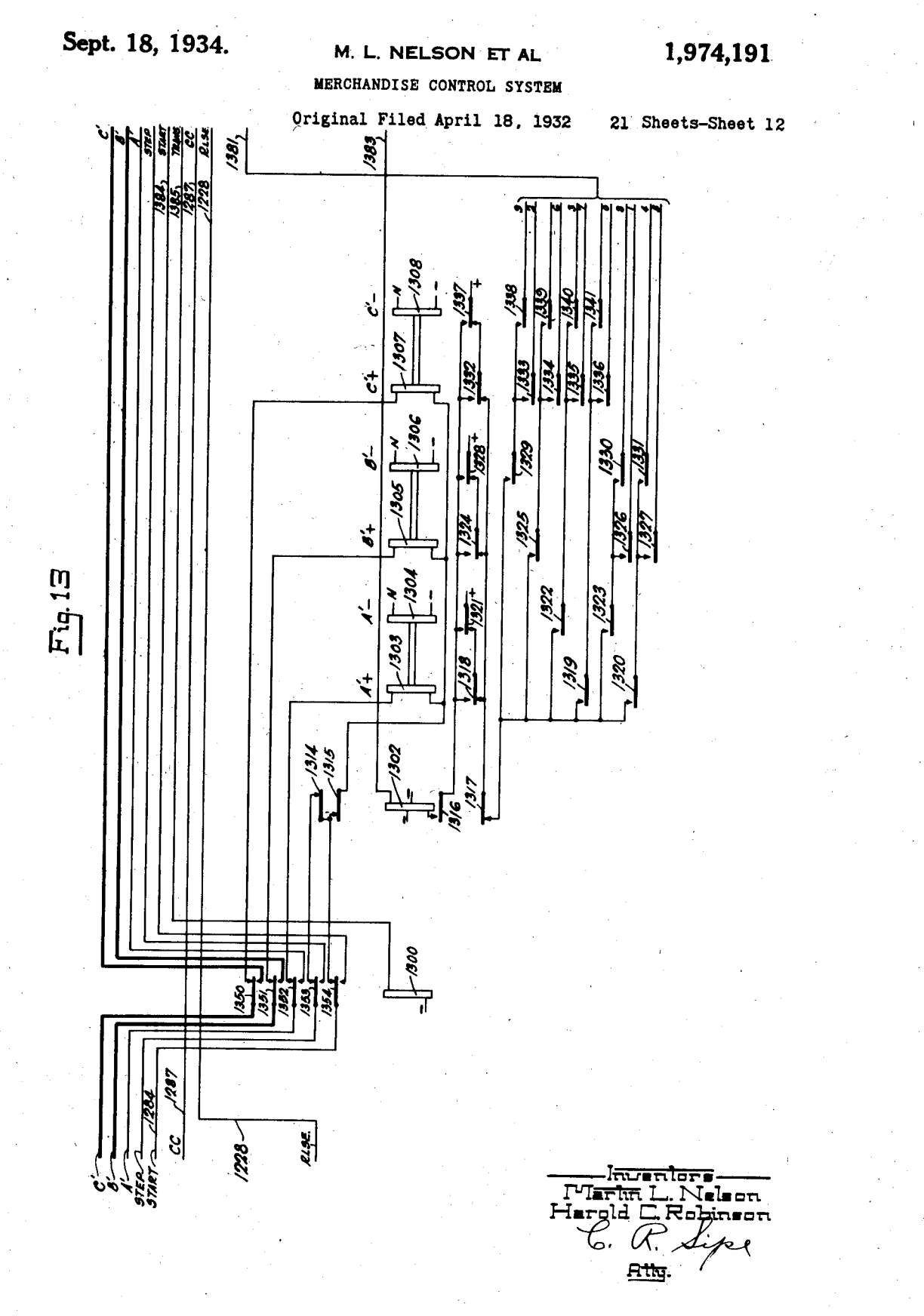

Fig. 13 shows a group of control relays individual to the finder shown in Fig. 12 and is somewhat similar to the control relays shown in Fig. 10. This group of relays translates the code sent from the transmitter from a double-punching code to a single code.

Figure 14:
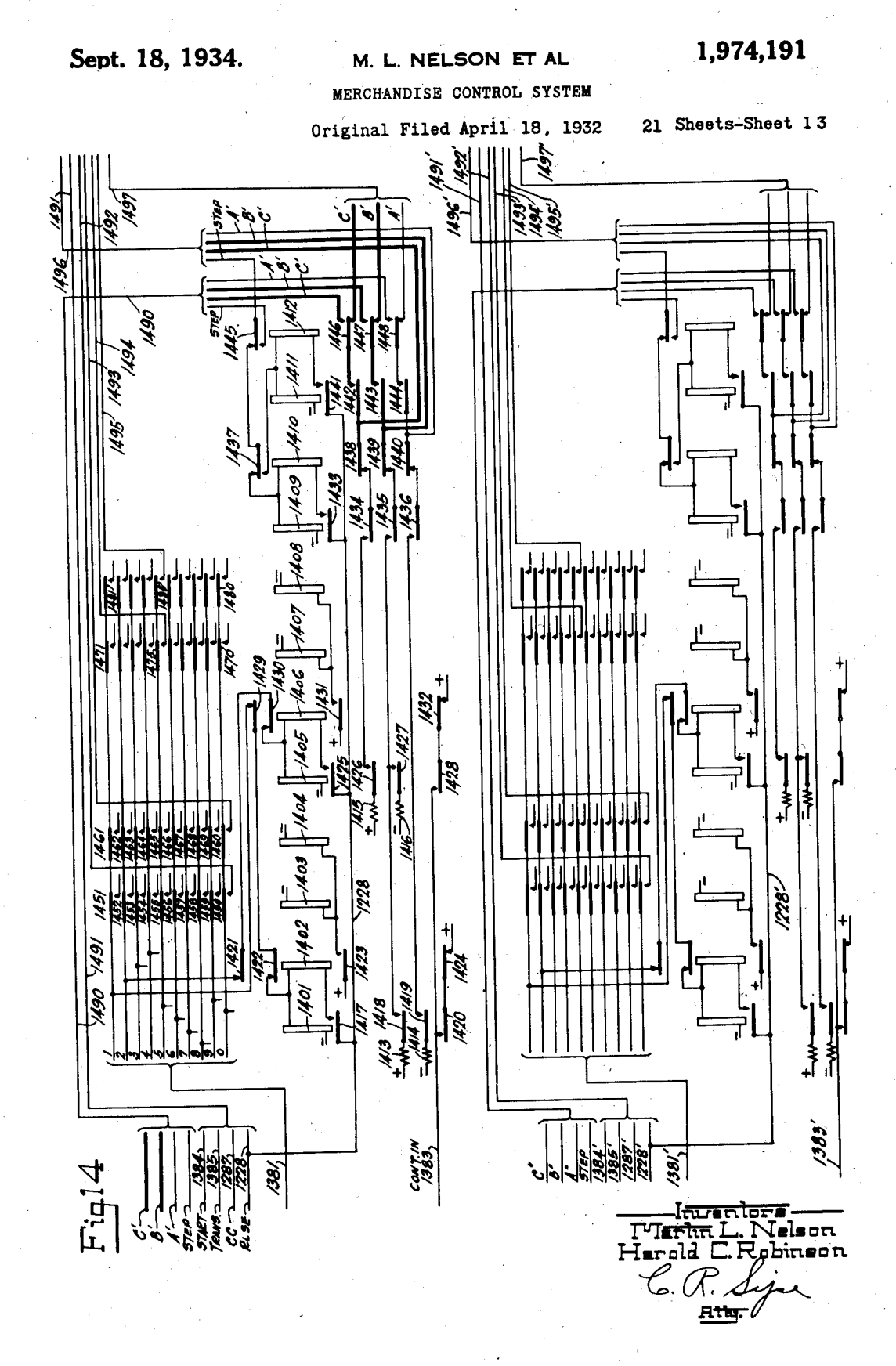

Fig. 14 shows two groups of position selection relays which determine the selection of the proper credit clerk's position.

Figure 15:
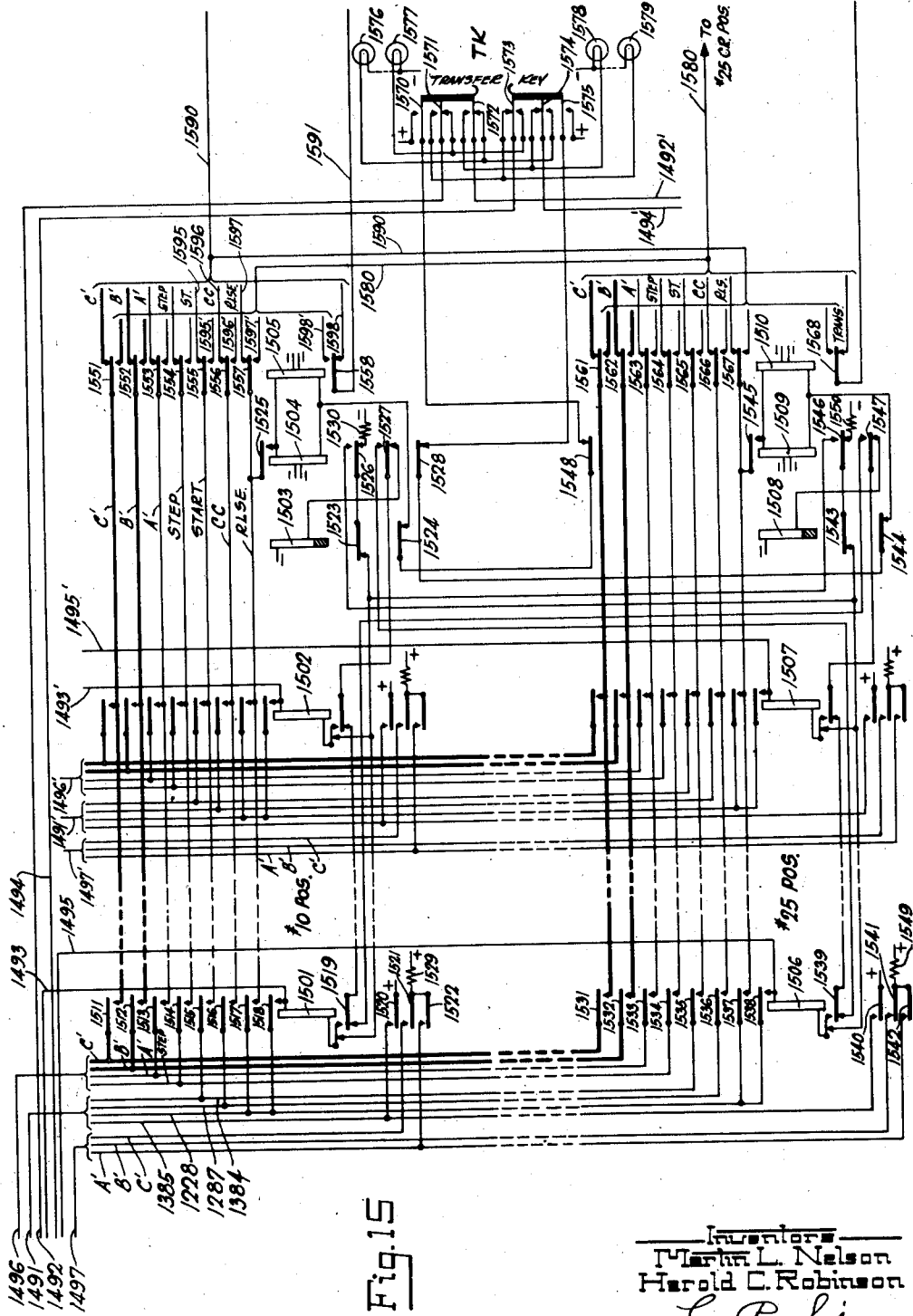

Fig. 15 shows two groups of credit position relays for connecting the credit clerks' positions for use.

Figure 16:
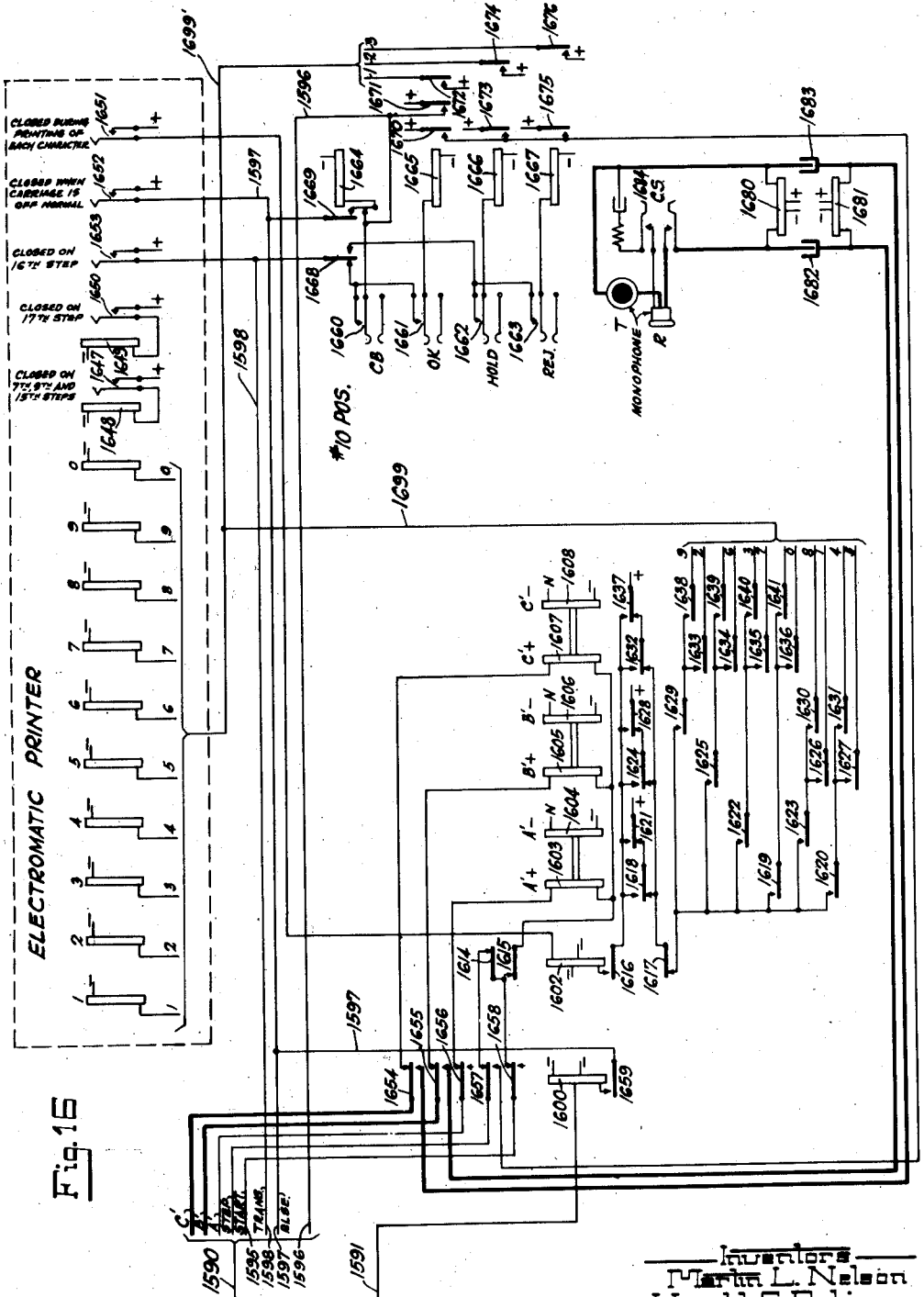

In the upper portion of Fig. 16 is shown the magnets and springs for controlling the numeral levers of an Electromatic typewriter, and is similar to the disclosure in Figs. 11 and 11—A.

In the lower left-hand portion of Fig. 16 another group of control relays is shown, and in the right-hand portion the equipment located at one of the credit clerks' positions is shown.

Figs. 17, 18, 19, and 20 show two complete electrical adding machines comprising relays and rotary switches similar to the well-known, rotary, step-by-step lineswitch used in telephone systems.

Figure 17:
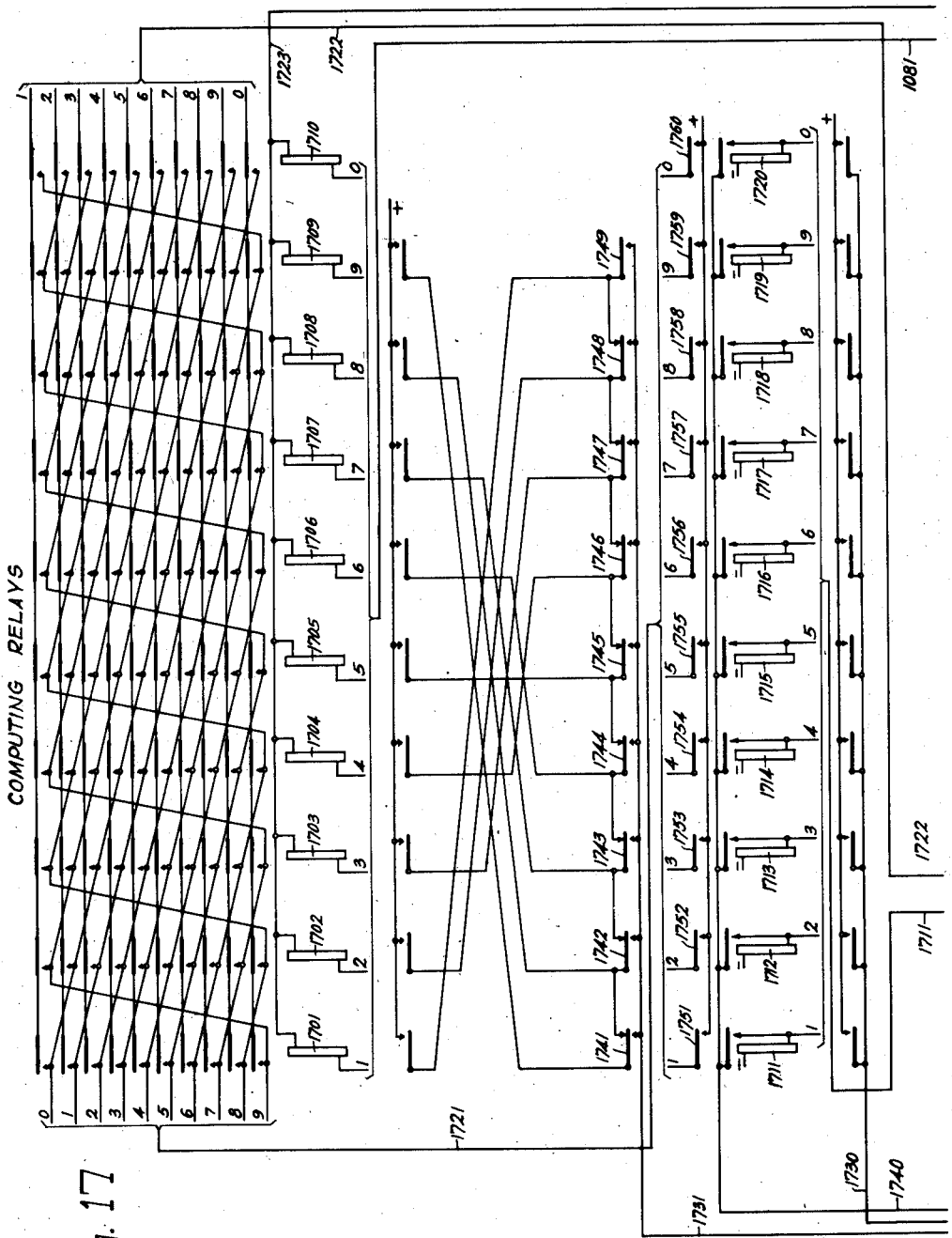

Fig. 17 shows the computing relays by means of which simple additions are made.

Figure 18:
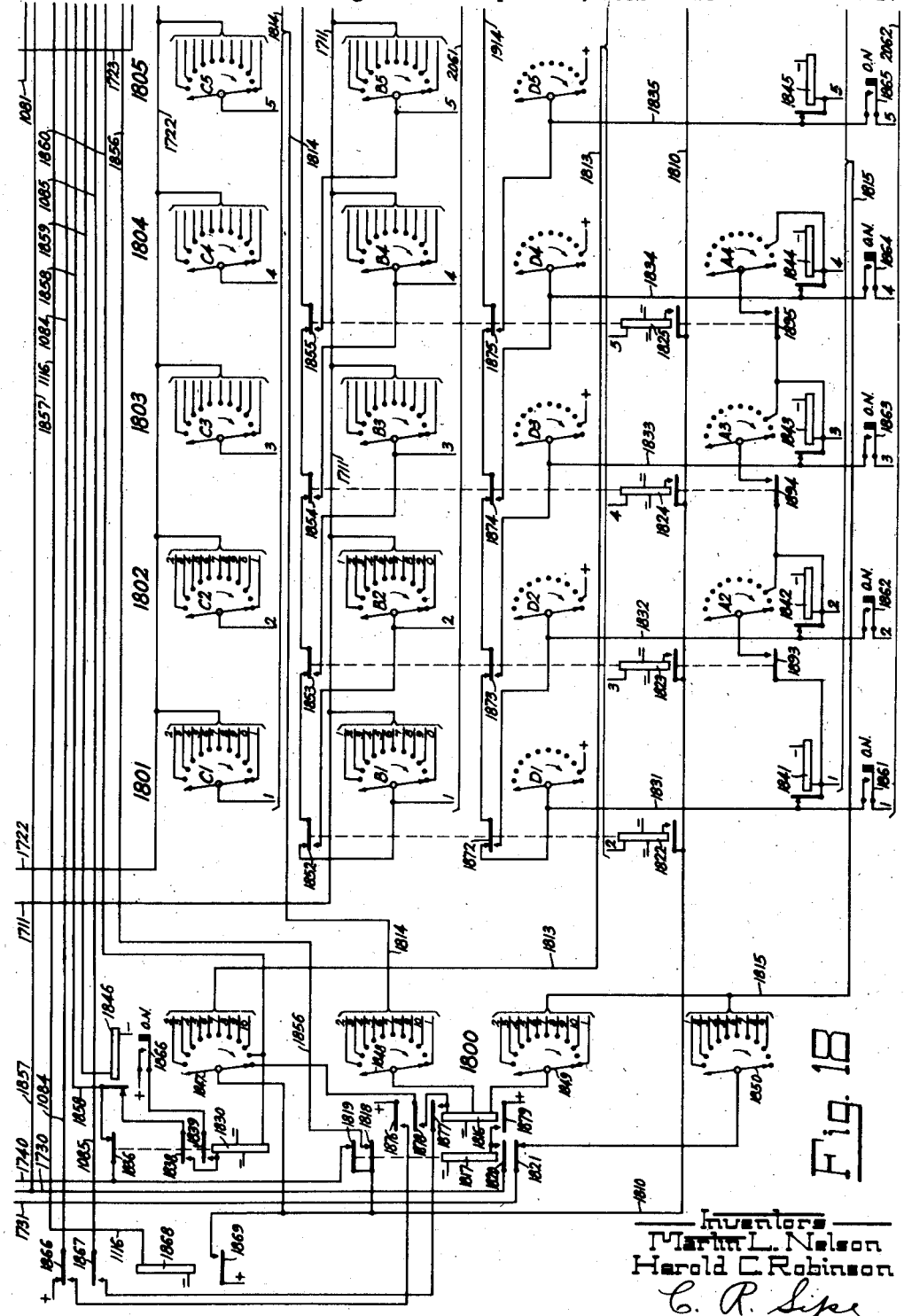

Fig. 18 shows a plurality of registers—1801, 1802, 1803, 1804, and 1805—of one adding machine, which register the totals computed by the computing relays in Fig. 17. At the left in Fig. 18 is shown a sequence switch for assigning the registers of the two adding machines in consecutive order.

Fig. 19 shows another plurality of registers—1906, 1907, 1908, 1909, and 1910—with two carry-over registers 1912 and 1911 for the other adding machine.

Fig. 20 shows the total-taking equipment for causing the totals stored in the registers to be printed by the printer in Fig. 11.

Fig. 21 is to be substituted for Fig. 11 when a Teletype printer, Model 12, manufactured by Teletype Corporation of Chicago, Illinois, formerly the Morkrum-Kleinschmidt Corp., is to be used instead of an Electromatic printer.

The Morkrum-Kleinschmidt Bulletin No. 109, April, 1926, shows and describes the model 12 Teletype printer, and may be referred to for the detail mechanical operations.

The relay group shown in the upper portion is used for controlling the Teletype printer illustrated to the right in the dotted rectangle when a total or a sub-total is to be taken off of the adding machine. The lower portion of Fig. 21 shows the magnets for controlling a Powers punch and is similar to the punch shown in Fig. 11.

Fig. 22 is to be substituted for Fig. 16 when a Teletype printer is to be used in place of an Electromatic printer. The printer is diagrammatically illustrated in the dotted rectangle. The lower portion of this figure shows a control relay group for controlling the printer. The right-hand portion of this figure shows a credit clerk's position having CB (call back), OK, reject REJ, and HOLD keys, indicating lamps and a monophone for talking to a cashier over an established connection.

The current supply to the various magnets and relays shown in the drawings is indicated by negative and positive signs, such as — and +, designating the negative and positive poles, respectively, of a battery. It will be understood that while a plurality of current sources have been shown for convenience, there is but one battery which is tapped at its mid-point. This mid-point is designated in the drawings by the reference letter N. The negative pole of battery will be referred to hereinafter as "battery", the positive pole as "ground", and the mid-point as "neutral".

Before proceeding with the general description, it is believed advisable to explain how merchandise articles are marked. Each article of merchandise to be sold has an inventory card and a merchandise display card punched and printed with information relating to the article. The inventory card is punched in accordance with the article's cost price, its size, file, purchase date, and other necessary information, while the merchandise display card is double punched in code in accordance with the serial number of the article, its size, class, sales price, department number, and any other necessary information. The inventory card is then placed in the inventory file, while the merchandise display card accompanies the article to the proper sales department.

Each sales clerk and each cashier have identification cards double punched in code with their assigned number, and each customer having a charge account has a similar code-punched identification card.

The various cards, the code and the above procedure are illustrated in the application of M. L. Nelson, Serial No. 454,885, filed May 23, 1930.

Referring now to Fig. 1, and in order to give a general description of the system, it will be assumed that a sales clerk has made a cash sale of some article. The clerk removes the merchandise display card from the article and gives this card with her own to the cashier who inserts three cards, the merchandise display card, the clerk's card, and the cashier's card in the transmitter. When the transmitter is closed, a finder switch automatically hunts for and finds the calling transmitter line to which the particular transmitter in use is connected. The stepping switch in the transmitter is now operated to successively close the circuit connections made through the perforated holes in the cards in the transmitter, to cause the punch to punch a new card, the printer to print the transmitted record, and the adding machine to add the serial number to previous transmitted serial numbers and to add the sales price to previous transmitted sales prices in accordance with the information perforated in the cards. At the sales room the merchandise display card is automatically printed with the date of sale just prior to the automatic opening of the transmitter. The merchandise card is then given to the customer as her receipt. The printed record in the record room is printed on a tape and may be used for depleting the inventory file by removing the inventory cards corresponding to the printed record. The new card perforated by the punch in the record room is termed a "Sales audit and accounts receivable card" and can at any time thereafter be run through well known sorting and tabulating machines for determining any sales analysis desired. The adding machine is arranged to keep separate totals of the serial numbers and sales prices and to control the printer to print totals or sub-totals when desired.

It will now be assumed that a customer desires to make a purchase and charge it to her account. The customer gives her perforated charge card to the sales clerk, and the cashier then inserts the merchandise display card of the article to be charged, the customer's card, and the clerk's card in the transmitter and closes the same. The operation is different in this case from a cash sale because of the insertion of the customer's charge card in place of the cashier's card. Due to the perforations in the customer's card, one of the finder switches in the lower or credit switch train is started hunting for the transmitter in use. When the finder finds the transmitter, the step-by-step switch therein controls the operation of the control relays and position selection relays to cause the selection of the proper credit clerk's position in accordance with the customer's number, and controls the operation of the printer at this position to print the customer's number, the price of the article, and an indication as to whether the sale is a "take" or "send". The credit clerk upon observing the customer's number and amount of sale will consult her records and determine whether the charge sale is O. K., or whether the sale should be rejected or held.

In case the customer's credit is good, the credit clerk will press the OK key, causing the printer to print an indication that she has approved this sale and causes a finder in the upper or sales recording switch train to find this particular transmitter in use. The credit switch train is automatically released and the transaction now proceeds the same as a cash sale.

In case the sale is to be rejected because the charge account has been closed, or for other reasons, the credit clerk will operate the call-back key which operates a signal at the transmitter. The transmitter is held in locked position and cannot be released until the cashier removes the monophone from its cradle and talks to the credit clerk who then will press the reject key to cause the credit printer to print a reject indication on the printed record and to automatically open the transmitter. After talking with the credit clerk, the cashier will replace the monophone and inform the customer of the rejection in accordance with the usual store procedure.

In case the credit clerk does not know whether to reject or approve a charge sale, she will then operate the call-back key to signal the cashier and inform the cashier by telephone to wait a few minutes and retransmit the same information in order to give her time to check up the records or to get the credit manager's approval on this sale. To do this, she operates the hold key which causes the "hold" indication to be printed on the record before her and also automatically opens the transmitter so that the transmitter may be used for further transactions. When this transaction is later retransmitted by the cashier, the credit clerk will either approve or reject in accordance with her instructions. Only cash and approved charge sales are recorded at the central records room.

Fig. 1 also diagrammatically indicates how transactions intended for a certain credit clerk or operator are transferred to another credit clerk's position by means of a transfer key.

This system is also arranged to take care of bulk goods or goods sold by the yard. In this case a bolt of yard goods has a special perforated card with the required information perforated therein, which makes it necessary for the yard-goods key set shown in Fig. 6 to be operated in accordance with the number of yards of goods sold, together with the price, before the transmitter will function to transmit the information. After the proper number of keys have been operated, the transmitter will function in the same manner as previously described. It should possibly be mentioned that the transmitter will operate correctly without operating the yard-goods key set provided a merchandise display card having the required perforations is inserted in the transmitter.

Having given a broad general description of the system, a description will now be given explaining the various detail mechanical and electrical operations performed.

Referring now specifically to Figs. 2, 3, 4, and 5, the transmitter comprises a metal base plate upon which is mounted the stationary casing 2, the upright plate 3, and the cover 4. Three large tapered pins 5 and 6 extend through holes in a table (not shown) for centering the transmitter in its proper position. The two rear pins 5 are also utilized to secure the upright plate 3 to the base plate 1, while the pin 6 is also utilized for securing the base plate 1 to the stationary casing 2. The male jacks 7 are similar to the well-known type of jack used in mounting automatic telephone switches and fit into female jacks in the table (not shown). This jack arrangement permits the removal of a transmitter and the substitution of a new transmitter without changing any of the permanently connected wires.

The rotary switch 8 is mounted on the upright plate 3 by means of sleeves 13 and machine screws 14. The rotary switch is similar to the rotary lineswitch used in telephone systems and comprises a stepping magnet SM which operates the pawl 18 and interrupter springs 19 to step the wipers, such as F, over the bank contacts, such as 17, when the stepping magnet SM deenergizes. The resistance coils 9 and 10 are also mounted on the upright plate 3 in the manner shown. The upright plate 3 is also securely fastened to the stationary casing 2 by means of sleeves 15 and machine screws 16. On the top of cover 4 there is mounted a well known monophone telephone set including the cradle assembly and hand phone. The talking connections between the monophone set includes the conducting screws 21 and 22 which are secured to the cover 4, but insulated therefrom. The conducting screws, such as 21 and 22, engage the conducting springs 11 and 12 for completing the telephone circuits in the manner illustrated.

The interior equipment of the transmitter, with the exception of the signal lamp assembly 25, the send or take key assembly 26, and the lock key assembly 27, is mounted on plates 83, 85, and 86. The side plates 85 and 86 are in reality a single U-shaped plate fastened to the top plate 23 by machine screws. Top plate 23 is also attached to the stationary casing 2 by means of machine screws. This mounting arrangement permits the easy removal of the interior mechanism from the stationary casing 2 in case any repairs or inspection is needed.

A movable casing 24 is rotatably attached to the top plate 23 by means of the shaft 28. A handle 29 rotatably mounted on the movable casing 24 and top plate 23, is provided for moving the movable casing to its operated position. In the interior of the movable casing 24 there are three bakelite strips 30 held in place by screws 31, and upon these bakelite strips are mounted the metal strips 32, 33, 35, and 37. Individually movable contact pins 34 are mounted between the metal strips. Each pin 34 is provided with a shoulder which rests against the metal strip 32 and which is held in normal position by means of a spring, such as spring 40.

Figure 3:
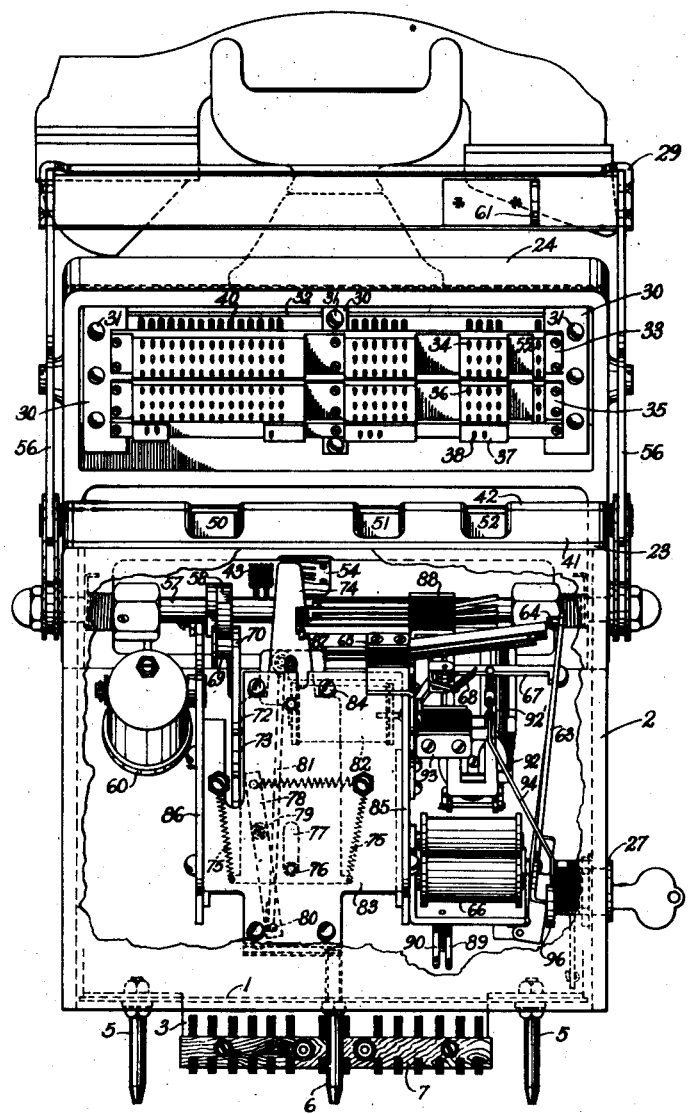
Fig. 3 shows a front view of the transmitter with a part of the outer casing cut away to more fully disclose the interior mechanism.

On top of the plate 23 there is mounted an insulating plate 41, made of suitable insulating material such as bakelite, and into this bakelite plate a plurality of pins, such as pin 43, are cast, which are engaged by the movable pins 34, 36, and 38 when the movable casing 24 is moved to operated position by means of the handle 29 and arms 56. In Fig. 3 to the left of the printing bars 74, the lower portion of a few of the pins 43 are shown and to these lower portions are soldered wires which extend to the bank contacts 17 of the rotary switch 8. Both the pins 43 and the insulating plate or block 41 are grooved as shown in Fig. 5 to provide better contact for the movable pins such as 34, 36, and 38. Mounted on top of the insulated plate 41 is a metal plate 42, more clearly shown in Fig. 5, having three openings for holding cards, portions of which are shown and indicated as 46, 47, and 48. Another opening in the plate 42 is provided to enable the pins 55 in the upper movable casing 24 to come in contact and engage the pins 45 cast in the insulating plate 41. The plate 42 is also provided with flanges to assist in holding the cards 46, 47, and 48 in their proper positions. The plate 41 is provided with slotted openings, such as 50, 51, and 52, in order to permit easy withdrawal of the cards from their respective positions as shown in Figs. 3 and 5. The insulating plate 41 is also provided with an opening in which is placed metal printing bars 53 held in place by the slotted spring 54. The type on these bars is changed each day to correspond to the month, day, and year so that the merchandise card, such as card 46, may be printed with the month, day, and year in which a sale takes place.

When the cashier operates the handle 29 to lower the upper movable casing 24 in engagement with the stationary casing 2, the arms 56 cause the rotation of the shaft 57 to rotate the cam 58. The rotation of the shaft 28 operates the lever 59, which in turn operates a dash-pot 60 provided for the purpose of retarding the operation of the movable casing 24 when the same is released. The bracket 61 mounted on the handle 29 extends through a slotted opening (not shown) in the casing 2, and when the movable casing 24 has been moved to its proper position the springs 65 are closed by the bracket 61 to operate the holding magnet 66, which in turn operates its armature 63 to cause the lug 64 to extend through the opening 62 in the bracket 61 and thereby lock the movable casing 24 in its operated position. When the hold magnet 66 operates its armature 63, a mechanical catch 67 is operated by the spring 68 to catch and hold the armature 63 in its locking position.

When the cam 58 is rotated responsive to the closing of the transmitter, the lever 70 is rotated on its shaft 71 by means of the cam 58 riding in the collar 69 attached to the lever 70. A steel spring set 72 attached to lever 70 is operated in a downward movement to engage the edges 73 of each of the printing bars, such as bar 74. Each of the printing bars 74 are provided with slots 77 to permit their downward movement against the tension of springs 75 which are individual to each printing bar. The printing mechanism is attached to the plate 83 by means of the screws 84. On the rear plate of the printing mechanism there is provided a lever 78 pivoted at 79 for tripping the spring 72 to operate the print bars. The print magnet 82 is mounted on the side plate 85 and is provided with an armature 81 which engages the pin 80 on lever 78. When the print magnet 82 is energized, armature 81 by means of the pin 80 rotates the lever 78 on its axis 79 so that the upper end of the lever 78 engages the spring 72 to cause the spring 72 to be disengaged from the edges 73 of each of the printing bars 74. The individual springs 75 of each print bar 74 cause each print bar to strike the spring 54 to actuate the printing type 53 to print the card with the date. The springs 88 are mounted by means of a bracket to the side plate 85 and are normally closed by the pin 87 on the front print bar 74. When the print bars are being set, the pin 87 moves in a downward direction and opens the springs 88 so that they no longer engage each other.

The springs 89 and 90 are operated by an extension on the armature 63 of the hold magnet 66. The release magnet 91, shown in Fig. 4, is mounted on the side plate 85 and controls the operation of the springs 93 by armature 92. An extension 92' on armature extends in an upward slanting direction between the catch 67 and the springs 95. This extension is for the purpose of operating the catch 67 when the release magnet 91 is energized so that armature 63 of the holding magnet 66 may be restored to its normal position or the position shown in the drawings. In addition, the armature springs 93 may be operated by the lever 94 by way of the springs 95 when the key in the key assembly 27 is operated to the unlocked position. The lever 94 is pivotally mounted at 97 to the side of the stationary casing 2 and rides on the cam 96 which is rotated by the key assembly 27. The lever 94 is shown in a position in which the transmitter may be used for operation. In case it is desired to lock out this transmitter the key would be turned and the cam 96 would raise the lever 94 until the bushing on the extreme upper end thereof would engage the springs 95, thereby opening said springs and in addition operating the armature 92' to likewise open the springs 93 on the release magnet 91.

A hook lever 98 is pivotally mounted on the casing 2 to lock and unlock the transmitter to the table. The hook lever 98 engages a plate (not shown) in the table. When it is desired to remove the transmitter from the table the key assembly is turned, thereby causing the rotation of the lever 94 which in turn operates the rod 100 toward the left to operate a bar 102 which is pivoted at 101 to engage the hook lever 98 and move it towards the right as shown in Fig. 4.

Fig. 4 also shows the manner in which the relays are mounted on the upright plate 3.

The operation of the transmitter is as follows: The cashier places the cards 46, 47, and 48 in their respective positions and then operates the handle 29 to close the transmitter. The bracket 61 enters through a slot in the casing 2 and closes springs 65, thereby actuating the hold magnet 66 to cause armature 63 and catch 67 to lock the transmitter in closed position. At the same time the transmitter was being closed the print bars 74 are being moved to their set positions by means of cam 58, lever 70, and spring 72. The rotary switch is then operated to transmit, and after transmission the print magnet 82 is energized to operate release magnet 91 and to trip the print bars by means of lever 78. Directly after this operation the release magnet 91 is operated to release the catch 67 to open the transmitter.

Before describing the detailed circuit operation, it is believed that a brief description of the Powers punch, the Electromatic printer, and the Teletype printer will enable the invention to be more clearly understood.

Referring now to Fig. 11, the mechanical operation of the Powers punch is preferably the same as disclosed in United States Patent No. 1,305,557, to which reference can be had to details not fully described herein. Generally the feeding means for the cards may be of any suitable construction for successively removing the cards one at a time from a stack and for delivering them to feed rollers. The cards are delivered to the rollers by a block which is operated in relation with the main shaft 1185. The cards delivered from the card magazine enter a passage in the punching unit and abut an automatically operated stop which locates the card in punching position. Fig. 11—B diagrammatically shows the card 1161 in punching position between the idling rollers 1160. The idling rollers 1160 have been slightly changed in accordance with the present invention and are now mounted so that the rollers 1160 are insulated from the frame of the punching machine. The lower rollers 1160 are connected in any suitable manner to ground as shown, while the upper rollers 1160 are connected to the release trunk conductor 928. This arrangement just described provides a card check arrangement for determining when a card, such as 1161, is in punching position. In case no card is between rollers 1160, then the rollers would connect ground to release trunk conductor 928 to busy the punch in a manner to be more fully disclosed hereinafter.

Since the punching mechanism of the Powers punch is well known, it is believed unnecessary to describe the construction and operation other than to state that the setting of the set-up bars which control the individual punches is accomplished by the movable carriage which is arranged to travel in a step-by-step movement to successive rows of set-up bars. This carriage is provided with a plurality of plungers corresponding in arrangement and number to a record column on the card, which in the preferred form is made up of twelve record positions representing numbers. Associated with each of the plungers is a flexible rod which extends to an individual solenoid magnet, such as the magnets numered 1 to 11, inclusive, in Fig. 11. The operation of any one of the solenoid magnets in the Powers punch operates its individual flexible rod and plunger to operate and lock the set-up bar which is at this time directly below this particular operated plunger. Mounted on the movable carriage of the punch are a pair of springs 1151 which are operated by a bar 1150 which in turn is operated to close springs 1151 whenever any one of the solenoid magnets operates its individual plunger. Another set of springs 1134, 1135, and 1169 have been mounted on the punch and are normally arranged to be opened when the carriage of the punch is in its twenty-first position or, in this case, the first punching position. When the carriage steps from its twenty-first position to the twenty-second position, the springs 1134, 1135, and 1169 close to prepare circuits to be disclosed more fully hereinafter. A relay, such as relay 1133, has also been added, and is arranged to control the No. 11 punch magnet to cause the card to be punched in the eleventh hole position. Springs 1177 are arranged to close immediately after the card has been punched in the forty-fifth position so as to close a circuit for the trip magnet 1179 to cause the card in punching position to be punched in accordance with the locked set-up bars and to cause the carriage of the punch to be returned to its normal position and a new card to be inserted in punching position.

All of the Powers punches are arranged to be returned only to their twenty-first position because the cards are arranged to be punched in accordance with the invention in only the twenty-first to the forty-fifth columns. Each morning before the department store opens, the attendant in the central records room will operate the set-up bars to control the punch to punch the date on each of the cards. Since the date is set up on the set-up bars prior to the twenty-first position, and since the carriage is only returned to its twenty-first position, the date set up will not be wiped out, and, therefore, the date will always be punched on all of the cards until the date set up is changed by hand. A cam 1118 is mounted on the shaft 1185', which is rotated in timed relation with the step-by-step movement of the carriage. The cam 1118 closes a set of springs 1117 when the carriage of the punch reaches its thirty-sixth position. The springs 1117 are closed to render the adding machine shown in Figs. 17, 18, 19, and 20 operative. When the trip magnet 1179 energizes, said relay at armature 1180 permits the tensioned spring 1192 to rotate the flange 1194 into engagement with the rotating flange 1195. The spring 1192 turns the flange 1194 upon its thread so that the flange 1194 engages the rotating flange 1195, thereby causing the shaft 1185 to rotate the entire shaft assembly. It might also be stated that the rotation of the shaft 1185 causes the card in the punch to be perforated in accordance with the pins or set-up bars which have been set and locked responsive to the operation of the various magnets, as previously described. After the card has been punched, the cam 1184 closes a circuit between wipers 1182 and 1183 for energizing the carriage-return relay 1136. A circuit may also be traced through these springs 1182 and 1183 to the magnetic clutch 1189. Due to the energization of the magnetic clutch 1189, the magnetic clutch is held in engagement with the rotating disc 1190, thereby causing the clutch to wind up the tape 1187 to cause the carriage of the punch to be returned to its twenty-first position, at which point the springs 1134 and 1135 are opened. The return of the carriage to normal position causes all of the set-up bars which have been locked operated to be returned to their normal positions, the punched card to be ejected into a card hopper, and a new card to be positioned in punching position in a manner similar to that described in Patent No. 1,643,779, issued September 27, 1927, to W. W. Lasker. The operation of the carriage-return relay 1136 at armature 1137 opens the circuit to the trip relay 1179, thereby permitting the latter relay to drop its armature 1180 in the path of the rotating pin 1193. When the carriage has been returned to its twenty-first position, the springs 1134, 1135, 1169, 1117, and 1177 and the circuits through wipers 1182, 1183, 1186, and 1188 are opened. When the circuit of the magnetic clutch 1189 is opened, the carriage is returned to its twenty-first position and remains in such position until it is again actuated by its escapement.

The two shafts 1196 and 1185 continue to rotate until the pin 1193 strikes the armature 1180 which causes the screw flange 1194 to screw away from and disengage from the flange 1195. Due to the construction and the weight of the shaft 1185, the shaft 1185 rotates a little further, or only a sufficient distance, to tension the spring 1192 so that it may again operate the flange 1194 when the trip relay 1179 is again actuated. All of the apparatus of the punch is now in normal position and may now be used for punching a different card, it being understood that a new card has been positioned in punching position in the manner previously described and in the manner described in the aforesaid Lasker patent.

Referring now to the Electromatic printers shown in the upper portions of Figs. 11 and 16 and to Fig. 11—A, the Electromatic printer comprises a motor-driven typewriter such as disclosed in the aforementioned publications entitled "Product Engineering" for November, 1930, and in the publication "The Story of Electromatic", published by the Electromatic Typewriters, Inc., Rochester, New York. During the time the Electromatic printers are in use, the small electric motors for controlling the same are in constant operation and are constantly operating the soft rubber roller, such as roller 1129, shown in Fig. 11—A. In order to operate the Electromatic printers in this case, magnets 1 to 10, inclusive, are added to control the key bars. In Fig. 11—A magnet 9 operates its armature 1126 to in turn actuate the key bar 1127. This results in bringing the cam 1128 into contact with the roller 1129. Cam 1128 instantly turns through one-half revolution, and, in so doing, actuates the type bar 1131 to print the numeral 9. Each cam, such as 1128, is pivoted at one end of a bell crank, forming part of the linkage it operates. Normally, a stop on the side of the cam holds each cam a few thousandths of an inch out of contact with the roller surface, but when the magnet corresponding to a given cam is operated a spring forces the serrated surface of the cam against the soft rubber surface of the roller and the two rotate together without slippage. In so doing, the cam pivot and the link to which it is attached are forced away from the roller. It is this motion, for which the motor supplies the power, that actuates the type bar. Since the mechanical construction of the Electromatic printer is not part of this invention, it is believed that this general description of its operation will suffice. Any further details regarding the mechanical operation of this type of printer may be had by referring to the aforesaid publications. The Electromatic printer shown in Fig. 11 is provided with a contact 1120 which closes when the carriage of the printer reaches its thirty-first position. The closure of springs 1120 causes the energization of the carriage-return magnet 1172 to cause the carriage to be returned to its original or initial position and to space the paper in the well-known manner. Springs 1122 are normally closed when the carriage of the printer is in its normal position and open as soon as the carriage moves in its first step. Springs 1121 are closed during the printing of each character. These springs are closed by a bar which is operated when any type bar is operated. Springs 1170 are closed when the carriage of the printer reaches the seventh, twelfth, fifteenth, eighteenth, and twenty-fifth positions. This set of springs is for operating the space magnet 1171 to space or group different groups of characters. In the Electromatic printer shown in Fig. 16 the springs 1647 are closed in the seventh, ninth, and fifteenth positions for automatically operating the space magnet 1648. The springs 1650 are closed in the seventeenth position of the carriage for operating the carriage-return magnet 1649. The springs 1653 are closed on the sixteenth position of the carriage to prepare certain circuits shown directly below. The springs 1652 are closed when the carriage is off-normal, while the springs 1651 are closed during the printing of each character.

The Teletype printers diagrammatically illustrated in the dotted rectangles in Figs. 21 and 22 are similar in mechanical construction and operation to the Teletype printer, model 12, disclosed in the Morkrum-Kleinschmidt publication "Bulletin No. 109, dated April, 1926". The Teletype printer consists of a basket carrying a set of type bars similar to that of the typewriter, these type bars being mechanically thrown against a platen, thus causing the letter to be printed. The type bar to be selected is determined by the setting of five code bars which are actuated by the five set-up magnets numbered 1 to 5, inclusive, in Figs. 21 and 22. The code bars are so arranged that notches on their underside will be lined up, permitting a certain push bar which is linked to the type bar to move upward into the path of the striker bail. This bail moves the push bar which causes the type bar to move against the platen. The various functions such as the line feed, space, carriage return, and the printing of figures are all accomplished mechanically. The electrical equipment in the printer comprises the five previously mentioned set-up magnets for actuating the code bars, and a sixth-pulse magnet, or print magnets such as 2155 and 2241 shown in Figs. 21 and 22, respectively. The sixth-pulse magnet starts the operation of the printer, and a small motor drives the mechanism. The various operations of the printer are accomplished by a series of cams arranged on a shaft and driven by the motor through the medium of a clutch. These cams are so arranged that they operate various levers in a certain sequence, causing the printer to perform its functions. Springs 2120 close when the carriage of the printer reaches its twenty-sixth position, while springs 2122 close when the carriage of the printer is in an off-normal position to guard against the seizure of such printer. Springs 2238, 2239, and 2240 close in the fourteenth, thirteenth, and off-normal positions, respectively, in order to control circuits to be more fully described hereinafter.

With the foregoing general description of the mechanical operation of the apparatus involved in this system, it is believed that we may now proceed with the detailed circuit descriptions.

Figure 2:
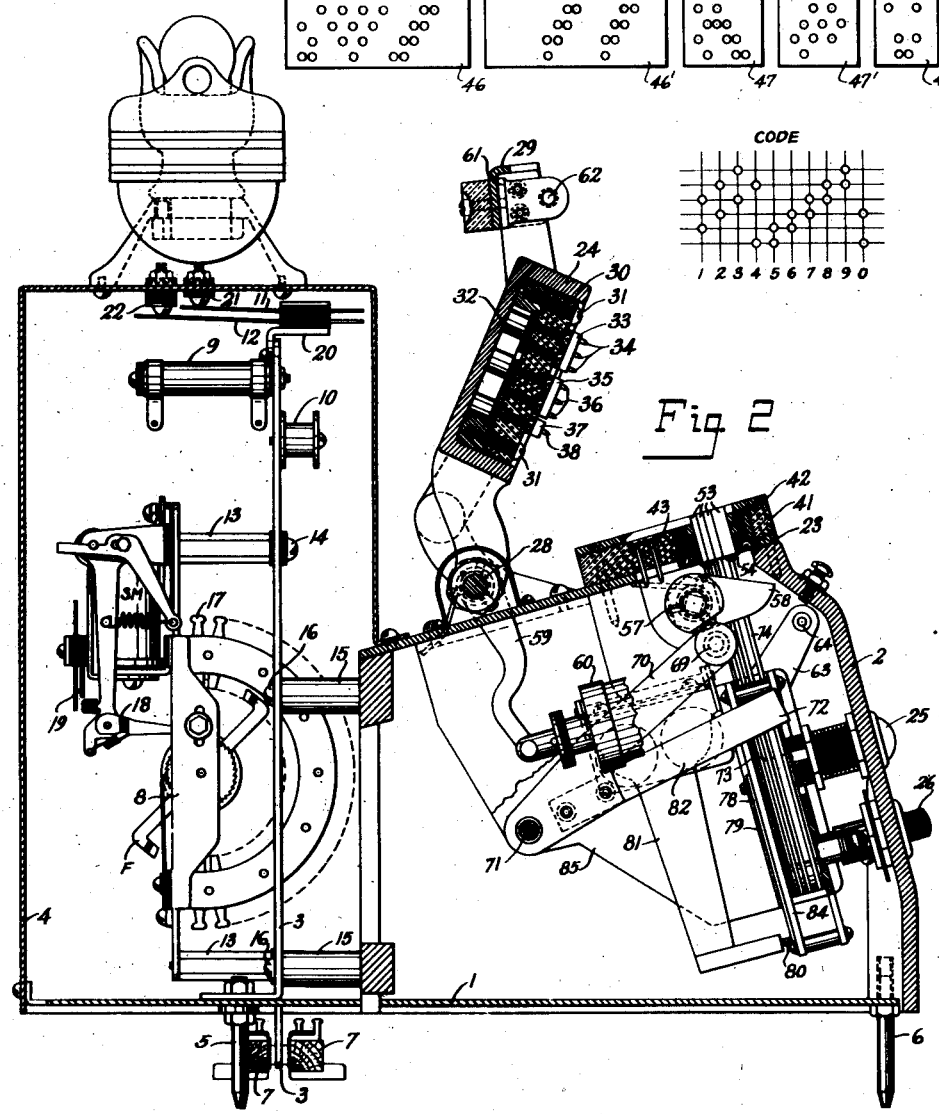
Fig. 2 shows a sectional side view of the transmitter.

Referring now to Fig. 7, the small circles shown near the left of the drawings indicate the contact pins 43, shown in Figs. 2 and 5. The various vertical rows of pins 43 are numbered 1 to 25, inclusive, below the lower horizontal row. In the twenty-fifth vertical row the lower pin is electrically connected, as shown, to the pin in the third horizontal row, and is also connected by conductor 25—a to the twenty-fifth bank contact accessible to the A wiper of the switch S, which is also shown in Fig. 2. In a similar manner, in the twenty-fifth vertical row, the pin second from the bottom is electrically connected by conductor 25—b to the twenty-fifth bank contact accessible to the B wiper of the switch. In a similar manner, the pin third from the bottom in vertical row 25 is connected by conductor 26—c to the twenty-fifth bank contact accessible to the C wiper of the switch. All of the pins in vertical row 1 are connected in a similar manner by conductors 1—a, 1—b, and 1—c to the first set of bank contacts accessible to the A, B, and C wipers of the switch. All the remaining vertical columns, Nos. 2 to 19 and 21 to 24, inclusive, are multipled and connected in the same manner and terminate in the bank contacts accessible to the A, B, and C wipers of the switch. The conductors of the pins in the twentieth vertical column, instead of extending directly to the bank contacts of the switch, extend by way of conductors 718 and 719, through the contacts controlled by relay 801 (Fig. 8), to the twentieth bank contacts in the switch.

The three upper pins, designated 55 are connected in multiple to conductor 720. In a similar manner the three lower pins 55 are multipled together and connected to the conductor 721. Keeping in mind that the reference characters in Figs. 7 and 8 correspond to similar reference characters in Figs. 2 to 5, inclusive, the detailed description will be proceeded with.

It will now be assumed that the key assembly 27 has been operated and that the transmitter is ready for operation. Responsive to a sale, the cashier places the merchandise card 46, the cashier's card 47, and the sales clerk's card 48 in the transmitter as shown in Fig. 5. The pins 110 to 117, inclusive, are card check pins which have circuits closed thereto by movable pins 38 under certain conditions. In case any one of the above-mentioned cards should be left out of its compartment when the transmitter is closed, it will be readily seen that the circuits are closed for short-circuiting the card check relay 725 to thereby prevent its operation. The chart shown in the lower right-hand corner indicates when circuits are closed to the aforementioned card check pins.

Responsive to the closure of the transmitter the bracket 61 extends through the opening in the casing 2 to operate and close the start spring 65. Since a merchandise display card 46, a cashier's card 47, and a clerk's card 48 have been placed in the transmitter, circuits through the card check pins 110, 113, 114, and 116 are closed. A circuit may now be traced from ground at springs 95, conductor 732, card check pin 116, movable pin 38 in contact with card check pin 116, over the metal strip 37 through the movable pin in engagement with card check pin 110 and through the lower winding of the card check relay 725 and resistance 728 to negative battery. Card check relay 725 is energized over the above-traced circuit to close its armature contacts 726 and 727.

It can readily be seen that if the clerk's card 48, for instance, has been left out, a circuit would have been closed through the card check springs 117 to the card check relay 725, thereby short-circuiting the card check relay to prevent its operation. It will also be noted that a similar circuit will be closed in case either the merchandise card 46 or the cashier's card 47 is omitted and certain short-circuiting circuits are closed through the card check pins 112 and 115. It may also be seen that in case either the merchandise card or clerk's card should be inserted incorrectly in the compartments of the transmitter, the card check holes in the various cards will not line up with the card check pins, and, therefore, no circuit is closed for the card check relay 725. It will also be seen later that no circuit will be completed for the hold magnet in case the cashier's card is inserted incorrectly. Responsive to the closing of the transmitter the type bars 74 are set in the position diagrammatically shown in Fig. 7, and the pin 87 on the first type bar 74 is operated to open springs 88.

Responsive to the closing of springs 65 and springs 727 on the card check relay 725, a circuit may be traced for energizing the hold magnet 66 as follows: from ground by way of springs 95, conductor 732, card check springs 116, pin 38, metal strip 37, pin 38, card check pin 113, springs 727, start springs 65, conductor 703, resting contact of armature 825 and said armature, conductor 709, springs 93, and through the winding of hold magnet 66 to negative battery. Hold magnet 66, upon energizing, closes springs 89 and 90 and inserts the lug 64 into the hole 62 to lock the transmitter in closed position. The lever 67, due to the operation of armature 63, falls down and holds the armature 63 in operated position until the release magnet 91 is energized. The transmitter is now locked in operated position. In case the card check relay 725 did not operate for the reasons previously described, the circuit to the hold magnet 66 would not be completed and the transmitter would not, therefore, be locked, and would instantly open to inform the cashier that some error or omission had been made in inserting the cards in the transmitter.

When the hold magnet 66 operates its armature 63 to close springs 89 and 90, a circuit can now be traced for energizing cash relays 801 and 803 as follows: from grounded conductor 732, card check pin 116, metal strip 37, card check pin 114, armature 726, springs 89, conductor 710, and through the windings of relays 801 and 803 to battery. Since this sale is a cash sale, the cashier has placed her card in the transmitter, and, therefore, each of the cashier's cards have holes punched therein conforming to the location of the pin 114. If this particular sale had been a credit sale, the customer's charge card instead of the cashier's card would have been placed in the transmitter, and, therefore, a circuit would have been completed through only the card check spring 113. From the foregoing, it will, therefore, be seen that the pin 114 is used only on cash sales.

Relay 801, upon energizing, at armatures 813 to 815, inclusive, connects the twentieth bank contact in the A, B, and C banks to the twentieth vertical row of pins 43 in the transmitter. Relay 803, upon energizing, at armature 819 places a shunt around armature 825 and its resting contact to maintain the hold magnet 66 energized; at armature 820 opens the circuit for the credit relay 808 before this relay can fully energize; at armature 821 opens a point in the self-restoring circuit for the switch shown in Fig. 7; and at its working contact prepares a circuit for relay 804. At armature 822, relay 803 closes a locking circuit for itself extending from grounded conductor 722; at armature 823 and its working contact closes a circuit for cash switching relay 812; and at its resting contact opens a point in the circuit controlled by the send key 26. In case no other transmitter is in use on this transmitter line, switching relay 812 will energize over the following circuit: from grounded conductor 722, armature 823 and its working contact, armature 827, through the winding of relay 812 to the normally closed springs controlled by armature 859, conductor 862, armature 915, armature 920 and through resistance 919, to negative battery. Switching relay 812 energizes over the above-traced circuit and at armatures 854 to 857, inclusive, connects the C, B, A, and step conductors through to the bank contacts 930 to 933, inclusive, accessible to the finder shown in Fig. 9. At armature 859 relay 812 prepares a circuit for sending an indication of designating bulk or yard goods. At armature 859, relay 812 completes a holding circuit for itself in series with relay 902 as follows: from the grounded conductor 722 over the previously traced circuit, through the winding of relay 812, through the working contacts of armature 859 and said armature, hold conductor 863, through the normally closed springs controlled by armature 918, and through the winding of relay 902, to battery. Relay 902 energizes in series with relay 812, and at armature 920 removes the marking battery potential from conductors 862. It will, therefore, be seen that if another transmitter on this line should attempt to send through another cash sale, the cash switching relay in the second transmitter, for instance switching relay 812', will not find battery potential, with the result that the switching relay in the second transmitter will not energize. Even if the second transmitter should simultaneously attempt to send a cash sale at the same time the first transmitter did, the relay 812 in the first transmitter at armature 859 would prevent the switching relay 812' in the second transmitter from being maintained energized. From the foregoing, it may, therefore, be seen that only one transmitter on a transmitter line may send a cash sale through to the recording room.

Relay 902 at armature 920 and its working contact connects the negative battery marking potential to bank contact 934 and its multiple bank contacts in the other finder switch banks to mark this particular transmitter line as a calling line. At armature 921 relay 902 completes a circuit for energizing the level marking relay 903 by way of grounded armature 916, and at armature 922 and its working contact prepares a circuit for the cut-off relay 901. At armature 923 level marking relay 903 marks the vertical bank 936 in all of the finder banks, and at armature 924 completes a circuit for energizing the start relay in the first idle finder in the chain of finders. It will now be assumed that the finder shown in Fig. 9 is the first idle finder, and, therefore, a circuit may be traced from armature 924 by way of conductor 926, armature 954 and its working contact, and through the winding of start relay 904, to battery. In case this particular finder was in use, the start circuit would extend by way of armature 954 and its resting contact and by way of conductor 990 to the next finder in the chain.

At armature 951 and its working contact, start relay 904 completes a circuit for energizing the solenoid dash-pot relay 914. The solenoid dash-pot 914 is slow to operate due to the plunger of the solenoid being immersed in oil and will not operate the contacts 927 until a certain period of time has elapsed. The dash-pot 914 is adjusted to close its springs 927 only in case the call is held up on account of trouble. In case the call goes through without trouble, the dash-pot 914 will not have had sufficient time to fully energize and close its springs 927 or to close an alarm circuit (not shown). At armature 952 start relay 904 opens a point in the circuit for relay 906 as well as opening a point in the circuit of dash-pot relay 914, which latter circuit would be closed in case the finder failed to release properly and open the vertical off-normal springs 944. At armature 953, start relay 904 opens a point in the circuit extending to the release magnet 913, and at the working contacts of the armature 953 closes a circuit for energizing the vertical magnet 911 as follows: from ground at armature 953 and its working contact, armature 960 and its resting contact, armature 976, and through the winding of vertical magnet 911, to battery. Vertical magnet 911 energizes over the above-traced circuit and operates the wipers 937 to 943, inclusive, one vertical step and closes the vertical off-normal springs 944 and 946. The closure of the vertical off-normal springs at this time is without effect. At armature 967, vertical magnet 911 closes a circuit for energizing stepping relay 910. Stepping relay 910 at armature 976 opens the circuit to the vertical magnet 911 with the result that the vertical magnet deenergizes to open the circuit of the stepping relay 910. The operation of the finder at this point is dependent upon whether the vertical test wiper 943 which is now in engagement with the first vertical bank encounters a ground potential or not. In case the vertical test wiper 943 does not find a ground potential on this vertical bank contact, the stepping relay deenergizes as previously described and again closes the circuit at armature 976 for the vertical magnet 911. The vertical magnet is again energized over its circuit and again steps the wipers another vertical step and operates the stepping relay 910. This operation continues until vertical test wiper 943 encounters a ground potential applied to the vertical test contact by the level marking relay, such as 903, and at such a time a circuit may be traced from grounded armature 923 by way of vertical test contact 936, vertical bank wiper 943, armature 950, through the upper winding of the change-over relay 907, and through the winding of stepping relay 910, to battery. As soon as the vertical wiper 943 encounters this ground potential and the vertical magnet 911 removes the short circuit from around the upper winding of the change-over relay 907, the change-over relay 907 will energize in series with the stepping relay 910 which is maintained energized in this circuit. Change-over relay 907, upon energizing, at armature 958 prepares a circuit for the test relay 908; at armature 959 closes an obvious locking circuit through its lower winding; at armature 960 opens the stepping circuit extending to the vertical magnet 911 and closes through its working contact the circuit for energizing the rotary magnet 912. The circuit for energizing the rotary magnet extends by way of armature 953 and its working contact, armature 960 and its working contact, armature 964, interrupter springs 966, and through the winding of rotary magnet 912, to battery. Rotary magnet 912, upon each energization, rotates the wipers 937 to 942, inclusive, step by step over the bank contacts. At interrupter springs 966, rotary magnet 912 interrupts its own circuit with the result that the rotary magnet operates in a buzzer-like manner to step the wipers over the bank contacts. The operation of the rotary magnet 912 continues until wiper 941 encounters a bank contact having a negative battery or marking potential thereon. When this occurs, a circuit may be traced for energizing the test relay 908 as follows: from ground by way of armature 958, through the upper winding of test relay 908, rotary test wiper 941, bank contact 934, working contact of armature 920, and through resistance 919 to battery. Test relay 908 energizes very quickly over the above-traced circuit, and at armature 964 opens the circuit of the rotary magnet before the rotary magnet can rotate the wipers another step. At armature 961, test relay 908 closes a circuit for energizing the cut-off relay 901; at armature 962 closes an obvious circuit for energizing the switching relay 909; at armature 963 prepares a locking circuit for itself; and at armature 965 opens another point in the circuit extending to the release magnet 913. The circuit for energizing the cut-off relay 901 will be traced as follows: from ground by way of working contact of armature 957 and said armature, armature 961, wiper 942, bank contact 935, armature 922 and its working contact, and through the lower winding of cut-off relay 901 to battery. Cut-off relay 901, upon energizing, at armature 915 opens a point in the start lead 862 extending to the transmitter line; at the resting contact of armature 916 opens the circuit of level marking relay 903 which deenergizes, and at its working contact completes a locking circuit through the lower winding of test relay 908 by way of bank contact 934 and wiper 941 and for also guarding this transmitter line from intrusion by connecting ground to the multiple bank contacts connected to bank contact 934. At armature 917 relay 901 completes a locking circuit for its upper winding including the hold conductor 863, and at armature 918 transfers the circuit of relay 902 from conductor 863 to grounded armature 957. Relay 909, upon energizing, at armatures 970 to 974, inclusive, closes the C, B, A, step, and start conductors through to the decoding relays shown in Fig. 10. At armature 975 relay 909 closes a circuit for energizing the relay 906 through its upper winding. Relay 906, upon energizing, at armature 956 opens the circuit to the transfer relay 905, whereupon the transfer relay 905 deenergizes and at armature 954 opens the circuit for the start relay 904 and closes the start circuit to the next finder in the chain by way of conductor 990. Since the start relay 904 has a copper slug on its core, the relay is slow to release, and after an interval releases. At armature 951 and its resting contact, relay 904 connects grounded armature 975 to release trunk 928 for maintaining the circuit for the supervisory dash-pot solenoid 914; at armature 952 and its resting contact connects ground at vertical off-normal springs 944 to ground release trunk 928 and to maintain relay 906 in energized position; and at armature 953 and its working contact opens the locking circuit of relay 907, which deenergizes and at its resting contact prepares a point in the circuit for the release magnet 913. When the change-over relay 907 deenergizes and releases armature 957, the circuit of relay 902 is opened, with the result that the relay 902 deenergizes and at armature 922 prepares a circuit for relay 1133 which controls the operation of the No. 11 punch magnet shown in Fig. 11.

When relay 909 at armature 974 connects ground to start conductor 984, a circuit may be traced over conductor 984 by way of armature 1011 and 1015 and through the lower windings of relays 1003 to 1008, inclusive. Relays 1003 to 1008, inclusive, are electro-polarized relays and the circuits through their lower windings polarize each relay so that relays 1003, 1005, and 1007 respond only when positive battery is connected through their upper windings and relays 1004, 1006, and 1008 respond only when negative battery is connected through their upper windings. A circuit for energizing the stepping relay 806 in the transmitter may now be traced as follows: ground by way of armature 974, start conductor 984, through armatures 1010 and 1014 in multiple, step conductor, armature 973, wiper 940, bank contact 933, over the step conductor to armature 857, and through the winding of stepping relay 806, to battery. Stepping relay 806, upon energizing over the above-traced circuit, at armature 829 closes a circuit for energizing stepping magnet SM in Fig. 7 as follows: from ground by way of grounded conductor 722, armature 826, armature 829, conductor 716, which is connected to the multipled bank contact accessible to wiper F, through the wiper F, and through the winding of stepping magnet SM, to battery. The stepping magnet SM operates its armature and pawl 18 as well as springs 19, preparatory to stepping the wipers of the switch. At armature 830, stepping relay 806 connects negative battery potential through resistance 832 to conductor 720, which is connected to the multiple contacts 55. At armature 831, relay 806 connects the ground potential by way of grounded conductor 722 and resistance 833 to conductor 721, which is connected to the lower multiple contacts 45.

All of the apparatus is now in position to transmit the first code impulse from the sales room. The transmission of this code is now dependent upon the holes or perforations in the cashier's card in the transmitter. The holes in the cards in the transmitter permit the movable pins, such as 34 and 36 to engage the pins 43 to make electrical connections by means of metal strips 33 and 35 to the conductors 720 and 721 by way of pins 55. The holes in the various cards have been diagrammatically represented by heavy, black circles shown in the twenty-five vertical columns in the rows of pins 43 shown in Fig. 7.

The following is a code chart showing the combination code or the potential connected to the various conductors, such as C, B, and A, for the various digits and the relays which are energized responsive to each of the combinations:

| Digit | Code | Relays |
|---|---|---|
| 0 | A Pos. C Pos. | (1003, 1007) |
| 1 | A Neg. B Pos. | (1004, 1005) |
| 2 | B Neg. C Pos. | (1006, 1007) |
| 3 | A Neg. C Neg. | (1004, 1008) |
| 4 | A Pos. B Neg. | (1003, 1006) |
| 5 | A Pos. B Pos. | (1003, 1005) |
| 6 | B Pos. C Pos. | (1005, 1007) |
| 7 | A Neg. C Pos. | (1004, 1007) |
| 8 | A Neg. B Neg. | (1004, 1006) |
| 9 | B Neg. C Neg. | (1006, 1008) |
| 11 | B Pos. C Neg. | (1005, 1008) |
| 12 | A Pos. C Neg. | (1003, 1008) |

In this case, since the number 1 digit is punched in card 46 in the first vertical column as shown by the heavy circles, the A conductor is connected to negative battery and the B conductor is connected to positive battery as follows: the A conductor is connected to negative battery by way of resistance 832, armature 830, conductor 720, pin A—55, through the metal bar 33 shown in Fig. 2, through the pins 34 extending through the hole indicated by the heavy black circuit, to the pin 43 third from the top in the #1 vertical row, conductor 1—a, to the first bank contact accessible to the A wiper of the switch, A conductor extending through armature 856, bank contact 932, wiper 939, armature 972, and through the upper windings of relays 1003 and 1004 to mid-point or neutral battery. Since negative battery extends through the upper windings of these two polarized relays, relay 1004 alone will energize due to the polarizing effect through the lower windings of these relays. The circuit for grounding the B conductor extends by way of grounded conductor 722, resistance 833, armature 831, conductor 721, through the lower pin B—55, metal strip 35, pin 36, extending through the hole indicated by the heavy, black circuit in the circle second from the bottom in vertical column #1, through the multiple connection to conductor 1—b, which terminates in the first bank contact accessible to the B wiper of the switch and then by way of the B conductor through armature 855, bank contact 931, wiper 938, armature 971, and through the upper windings of relays 1005 and 1006, to neutral battery. Polarized relay 1005 alone energizes over the above-traced circuit because of the polarizing effect through the lower windings of both relays 1005 and 1006.

Before proceeding with the description, it should be stated that the upper contacts shown in Fig. 10, including armatures 1050 to 1065, inclusive, are omitted when the decoding relays are arranged to operate an Electromatic printer. These armatures are only used when the decoding polarizing relays are arranged to work in conjunction with Fig. 21.

Responsive to the energization of relays 1004 and 1005, such relays or armatures 1021 and 1024 prepare locking circuits for check-back relays 1001 and 1002, and at armatures 1023 and 1026 close a circuit for operating the No. 1 punch solenoid magnet in the Powers punch. The circuit for operating the #1 punch magnet of the punch may be traced as follows: from ground by way of armature 1037 and its resting contact, armature 1032 and its resting contact, armatures 1013 or 1017, armature 1023, armature 1026, the #1 conductor in the ten-conductor cable 1081, through the #1 solenoid magnet in the punch shown in Fig. 11, and through armature 1137 to negative battery. The #1 solenoid magnet energizes its armature and operates its individual flexible rod and plunger to operate and lock the #1 set-up bar in the twenty-first column so that the card in the punch may be later perforated in the #1 hole in the first column. The bar 1150 is also operated to close springs 1151, thereby closing a circuit from grounded armature 1866 in Fig. 18 by way of conductor 1084, springs 1151, conductor 1083, and through the upper winding of check-back relay 1002, to battery. When the circuit to the #1 punch magnet is interrupted, as will be described very shortly, the carriage steps one step to its twenty-second position and closes the springs 1134 and 1135. Spring 1134 grounds the release trunk conductor 928 to maintain the finder shown in Fig. 9 non-selectable by maintaining the relay 906 in energized position.

Check-back relay 1002, upon energizing, at armature 1016 completes an obvious locking circuit for itself, and at armatures 1014, 1015, and 1017 prepares points for opening the stepping circuit and for opening the control circuit extending to the punch and printer. However, as will be noted, these circuits are still maintained closed at armatures 1010, 1011, and 1013, and the circuits are not, therefore, at this time opened.

When polarized relays 1004 and 1005 connect ground to the #1 conductor in the cable 1081, a circuit may also be traced for operating the #1 print magnet in the Electromatic printer as follows: from the grounded #1 conductor in cable 1081, grounded #1 conductor in cable 1081', resting contact of armature 2081 and said armature (Fig. 20), conductor #1 in cable 1110, and through the #1 conductor to #1 print magnet, to battery. The #1 print magnet operates its armature and key-bar to cause the type bar to print the numeral 1 in the manner previously described. The operation of the #1 print magnet, in addition to causing the #1 type to be printed on the paper, causes the carriage of the printer to step in the well-known manner, thereby causing the off-normal springs 1122 to close and ground the release trunk conductor 928 for maintaining the finder switch in Fig. 9 non-selectable. The operation of the print magnet #1 also operates a common bar to temporarily close springs 1121, thereby connecting ground to conductor 1082 to complete an energizing circuit through the upper winding of check-back relay 1001. Relay 1001 at armature 1012 completes a locking circuit for itself.

Relay 2029 in Fig. 20 is also energized over conductor 1082, but the operation of this relay at this time is without effect. It may also be stated that when the #1 conductor in the cable 1081 was grounded the #1 computing relay, or relay 1701 shown in Fig. 17, is also energized at this time. The energization of the computing relay 1701 at this time is without effect because the cut-in relay 1868 in Fig. 18 at this time is not in energized position. It may be stated that the cut-in relay 1868 is only operated at a time when the movable carriage of the Powers punch reaches a certain position, or in this case position 36. Therefore, the operation of any of the computing relays such as 1701 to 1710, or the operation of relay 2029, is without effect until cam 1118 on shaft 1185' of the Powers punch completes a circuit by way of its springs 1117 and conductor 1116 to the cut-in relay 1868 shown in Fig. 18. The adding machine shown in Figs. 17, 18, 19, and 20 is, therefore, inoperative until the punch reaches its thirty-sixth position.

Since the two check-back relays 1001 and 1002 have been operated and locked in operated position in response to the operation of the printer and punch magnets, thereby indicating the full operation of the printer and punch for the transmitted digit, it will now be seen that the two check-back relays at armatures 1013 and 1017 disconnect grounded armature 1037 from the #1 conductor in cable 1081 to cause the deenergization of the printer and punch magnets as well as the deenergization of the relays in the adding machine. In addition, the two check-back relays 1001 and 1002 at armatures 1010, 1011, 1014, and 1015 open the polarizing winding of the electro-polarized relays 1003 to 1008, inclusive, to deenergize any of such relays which at this time may be operated, and in addition disconnects the step conductor from the grounded start conductor 984 to cause the deenergization of the stepping relay 806 in the transmitter. The deenergization of the operated electro-polarized relays in Fig. 10 opens the locking circuit of the check-back relays 1001 and 1002 with the result that the check-back relays deenergize, and at this time all of the relays in Fig. 10 are returned to their normal positions or the positions shown in the drawings. In the meantime the Electromatic printer has printed the numeral 1 and has advanced its carriage to its second position while the punch has set and locked the #1 set-up bars in the punch preparatory to punching the card in the #1 hole in the twenty-first column on the card and has thereafter advanced its carriage to its twenty-second position. Returning now to the transmitter and at a time when stepping relay 806 deenergizes responsive to the operation of the check-back relays 1001 and 1002 shown in Fig. 10, stepping relay 806 at armatures 830 and 831 disconnects negative battery from the A conductor and disconnects ground from the B conductor. At armature 829 stepping relay 806 opens the circuit of the stepping magnet SM in Fig. 7, with the result that the stepping magnet deenergizes and advances the wipers A to F, inclusive, one step into engagement with their second set of bank contacts. The operation just described all takes place responsive to the closure of the transmitter and the transmission of the first digit of the cashier's number, which in this case was the digit 1. The operation of the D wiper to its second position closes a circuit by way of grounded springs 95, conductor 732, the D wiper in engagement with its second bank contact, conductor 701, armature 837, armature 838 and its resting contact, armature 821 and its working contact, and to the winding of relay 804 to battery. Relay 804 energizes over the above-traced circuit and is thereafter maintained energized by way of the multiple contacts accessible to the D wiper until the D wiper reaches its normal or first position. At armature 824, relay 804 prepares a circuit for relay 805, but this relay cannot energize at this time because it is short circuited by way of grounded conductor 722, and, therefore, relay 805 does not energize until wiper D reaches its normal position.

When the check-back relays 1001 and 1002 deenergize, said relays again close the circuit for polarizing the relays 1003 to 1008, inclusive, by way of conductor 984 and armatures 1011 and 1015. In addition, at armatures 1010 and 1014 the check-back relays 1001 and 1002 again complete the circuit for the stepping relay 806 which again energizes over the circuit previously traced to again energize the stepping magnet SM and to apply battery and ground to the A, B, or C conductors in accordance with the holes punched in the second column of the cashier's card.

In this case, if the digit 0 is punched in the cashier's card. the C and A conductors will be grounded by way of conductor 722, resistance 833, armature 831, conductor 721, pins 55, metal strip 35, movable pins 36, to pin 43, shown by heavy black circles in the #2 vertical column, and thence by way of the multiple connections to the second bank contacts accessible to the A and C wipers, and thence by way of the A and C conductors through the upper windings of polarized relays 1003, 1004, 1007, and 1008 in Fig. 10. Since the C and A conductors are at this time grounded, only the relays 1003 and 1007 at this time energize. At armatures 1018 and 1032, relays 1003 and 1007 prepare circuits for locking the check-back relays 1001 and 1002 in operated position, and at armatures 1019 and 1036 grounds the #0 conductor in cable 1081 by way of armature 1028 and its resting contact, armature 1024 and its resting contact, and through armatures 1013 and 1017 in multiple to the #0 conductor. The #0 magnet in the punch, the #0 print magnet in the printer, and the #0 or computing relay 1710 energize responsive to ground being applied to the #0 conductor over circuits similar to those previously traced. In the same manner as previously described, the #0 magnet of the punch sets the #0 set-up bars in the twenty-second column of the punch preparatory to causing the card 1161 to be punched with the 0 digit in the twenty-second column and again closes the check-back spring 1151, thereby causing the check-back relay 1002 to energize and lock in the manner previously described. The #0 printing magnet in the printer causes the numeral 0 to be printed on the paper and again causes the springs 1121 to ground conductor 1082 to cause check-back relay 1001 to energize and lock as previously described. When the 0 magnets in the printer and punch deenergize, the carriage of the printer is stepped to its twenty-third position. In the same manner as previously described, the check-back relays 1001 and 1002 open the circuit of the stepping relay 806, as well as the circuit extending to the lower winding of the polarized relays 1003 to 1008, thereby causing their deenergization and also disconnecting ground from the #0 conductor included in the cable 1081.

Stepping relay 806 in the transmitter is again energized to cause the wipers of the switch in the transmitter to step to their third position and to remove ground from the C and A conductors, as previously described. When the check-back relays 1001 and 1002 and the polarized relays 1003 to 1008 deenergize, the stepping relay 806 is again energized to transmit the third number, in this case the digit 7.

From the foregoing description and by referring to the above-mentioned chart, it can be readily seen that in order to transmit the digit 7 the A conductor will be connected to negative battery, while the C conductor will be connected to positive battery, thereby causing the operation of polarized relays 1004 and 1007, which in turn will cause the #7 print magnet and the #7 punch magnet to control the printer and punch in the same manner as previously described. By referring to the above-mentioned chart it can readily be seen that any digit from 0 to 12, inclusive, may be transmitted in code over the A, B, and C conductors to cause the operation of any two polarized relays in Fig. 10. It will, therefore, suffice to say that the remainder of the cashier's number, in this case the digits 6, 5, and 4, is transmitted in sequence, causes the printer to print the number 107654, and causes the punch to set and lock the set-up bars so that the punch may later punch the card with the cashier's number, or No. 107654.

At this time, the carriage of the punch has been set to its twenty-seventh position while the carriage of the printer has been set to its seventh position. Since springs 1170 are closed when the carriage of the printer reaches its seventh position, the space magnet 1171 is operated over an obvious circuit including springs 1169 on the punch to automatically move the carriage of the printer another step and thereby provide a space between the cashier's number and the succeeding number, which will be the clerk's number. The clerk's number or No. 8541, as indicated by the heavy, black circles, is then transmitted; the set-up bars in the punch are operated and locked preparatory to punching the clerk's number in the twenty-seventh to the thirtieth columns, inclusive, while the clerk's number is printed on the paper or tape in the eighth to the eleventh positions. The carriage of the printer is, therefore, stepped to the twelfth position where springs 1170 again operate space magnet 1171 to move the carriage to its thirteenth position. The carriage of the punch at this time is in its thirty-first position. The wipers of the stepping switch in Fig. 7 at this time are in engagement with their eleventh bank contacts, and, therefore, the transmitter transmits the digits 9 and 8, as indicated by the heavy, black circles in vertical column 11 and 12, for transmitting the class of goods as indicated and punched in the merchandise card 46. The space magnet 1171 is again operated after the transmission of the class indication to move the carriage of the printer to its sixteenth position, after which the department number, or department 76, which is also perforated in the merchandise card, is transmitted to the punch and printer. After transmitting the class and department digits, the stepping switch in the transmitter is in its fifteenth position, with its wipers in engagement with the fifteenth bank contact, and the first number of the serial number, or digit 5, is transmitted to control the punch and printer. After this, the carriage of the punch is stepped to its thirty-sixth position, and, therefore, the cam 1118 closes springs 1117 to complete a circuit over conductor 1116 for energizing the cut-in relay 1868, shown in Fig. 18. From now on until the transmitter has finished transmitting the transaction, the remaining digits of the serial number are added to the previously transmitted serial numbers registered in the adding machine, while the sales price punched in vertical columns 21 to 25, inclusive, in Fig. 7 is added to the previously transmitted sales prices in the price registers in the adding machine.

It will now be assumed that no number is stored in any of the registers in the adding machine, and, therefore, all of the registers in Figs. 18 and 19 are in zero position, or the positions shown by the B wipers of the registers. The circuit for energizing the cut-in relay 1868 may be traced as follows: from grounded springs 1117, closed by the cam 1118 when the punch carriage is in its thirty-sixth position, conductor 1116 through Figs. 10, 20, 19, and 18, and through the winding of cut-in relay 1868 to battery. At armature 1866 and its resting contact, relay 1868 disconnects ground from conductor 1084 and connects conductor 1084 by way of its working contact to the make contact of armature 1876 controlled by stop relay 1816. The circuit prepared through the make contacts of armature 1866 is prepared so that the adding machine and the punch must operate before the check-back relay 1002 in Fig. 10 can be operated to permit the transmitter to transmit the next or succeeding digit. At armature 1867, relay 1868 prepares a locking circuit for the stop relay 1816 from grounded conductor 1085, which is normally grounded by the polarized decoding relays shown in Fig. 10, and which ground is only removed from conductor 1085 when both check-back relays 1001 and 1002 are fully energized. At armature 1869, relay 1868 grounds conductor 1810 to provide a locking circuit for relays, such as relays 1822 to 1825, inclusive; armature 1869 also grounds conductor 1740 by way of armature 1819 to provide a locking circuit for the computing relays 1711 to 1720, inclusive. A circuit may also be traced for energizing the stepping magnet 1846 of the sequence switch 1800 as follows: grounded armature 1869, armature 1819, armature 1836, conductor 1858, armature 2075 in Fig. 20, conductor 1859, and through the winding of stepping magnet 1846, to battery. The stepping magnet 1846 operates its pawl and ratchet preparatory to stepping the wipers of the sequence switch 1800 when the magnet deenergizes. Another circuit may also be traced from grounded armature 1869 as follows: from grounded armature 1869, armature 1818, conductor 1856, armature 2077 in Fig. 20, conductor 1902, armature 1901 and its resting contact, through armatures 1950, 1959, 1958, 1957, 1956, 1855, 1854, 1853, and 1852 and their resting contacts, wiper B1 in zero position since no digit is registered in register 1801, #0 conductor included in cable 1711, and through the winding of computing relay 1720, to negative battery. Relay 1720 at its upper-inner armature completes a locking circuit for itself from grounded conductor 740. At armature 1760 connects ground to the #0 conductor included in cable 1721; and at its lower armature grounds conductor 1730 for completing an energizing circuit for relay 1900 by way of conductor 1857, armature 2074, Fig. 20, conductor 1925, and through the winding of relay 1900, to battery. At armature 1901 and its resting contact, relay 1900 opens the original energizing circuit of computing relay 1720, and at its working contact prepares a point in the circuit for operating the motor magnet 1841 of the first register 1801. The adding machine is now prepared for operation and from now on will store the second digit of the serial number in register 1801, the third digit in register 1802, the fourth digit in register 1803, the fifth digit in register 1804, and the sixth digit of the serial number in register 1805. In addition, the first digit of the price will be stored in register 1906, the second in 1907, the third in 1908, the fourth in 1909, and the fifth in 1910.

When the second digit of the serial number, or digit 4, is transmitted from the transmitter to the decoding relays shown in Fig. 10, relays 1003 and 1006 will operate and connect ground to the #4 conductor in cable 1081 in the same manner as previously described. The #4 print magnet in the printer and the #4 magnet in the punch will operate in the same manner as previously described. In addition, at this time, since the adding machine is now prepared for operation, computing relay 1704 is energized over the grounded #4 conductor included in cable 1081. The circuit for energizing relay 1704 extends from the #4 conductor to cable 1081 and thence through the winding of computing relay 1704, conductor 1723, and through the winding of relay 1923, to battery. Both relays 1704 and 1923 energize over the above-traced circuit. Since computing relay 1720 is energized at this time, said relay at armature 1760 connects ground to the #0 conductor included in cable 1721, and thence by way of the armature fourth from the top operated by computing relay 1704, conductor #4, included in cable 1722, to ground the #4 bank contact accessible to the C wipers of the registers.

At armature 1924, relay 1923 completes a circuit for energizing the stepping magnet 1841 of the first register 1801 as follows: from ground by way of armature 1869, armature 1818, conductor 1856, armature 2077 in Fig. 20, conductor 1902, armature 1901 and its working contact, armature 1924, and through armatures 1970, 1979, 1978, 1977, 1976, 1875, 1874, 1873, and 1872 and their resting contacts, interrupter springs controlled by magnet 1841, and through the winding of stepping magnet 1841 to battery. Magnet 1841, upon energizing, positions its pawl preparatory to stepping the wipers of the first register and near the end of its stroke opens its interrupter springs to cause the magnet to deenergize and step the wipers one step. Stepping magnet 1841, therefore, operates in the manner of a buzzer to step the wipers of the first register step by step until the C1 wiper engages the grounded bank contact which terminates the #4 conductor which was grounded by the operation of computing relays 1720 and 1704.

As soon as the C1 wiper in register 1801 encounters the grounded #4 conductor included in cable 1722, a circuit may be traced from the C1 wiper over the #1 conductor included in cable 1814, wiper 1848 of the sequence switch in engagement with its #1 bank contact, through the lower winding of stop relay 1816, wiper 1849, #1 conductor included in cable 1814, and through the winding of stepping magnet 1841, to battery. Stop relay 1816 is energized over the above-traced circuit when magnet 1841 operates its interrupter springs and the stepping magnet 1841 is held energized to permit the wipers of the first register to take an additional step later on.

At this time the wipers of the register 1801 have advanced three steps, the C1 wiper being in engagement with the #4 conductor included in cable 1722, and the B1 wiper being in engagement with the #3 conductor included in cable 1711. At armature 1876, stop relay 1816 completes a circuit in conjunction with the punch shown in Fig. 11 for operating the check-back relay 1002 as follows: from grounded armature 1876, working contact of armature 1866, conductor 1084 through Figs. 19, 20, 10, and 11, springs 1151 on the punch, conductor 1083, and through the upper winding of check-back relay 1002 to battery. From the foregoing it will be evident that the check-back relay 1002 will only energize when a punch magnet in the punch and the stop relay 1816 in the adding machine are operated. At armature 1878, stop relay 1816 completes a locking circuit for itself by way of grounded armature 1869, wiper 1847, normal position bank contact, armature 1878, and through the upper winding of stop relay 1816, to battery. At armature 1877, relay 1816 completes a circuit for maintaining itself in energized position in case both of the check-back relays 1001 and 1002 in Fig. 10 for some reason fail to energize. This circuit may be traced from any one of the grounded armatures 1021, 1028, or 1037 in Fig. 11 by way of armatures 1017 and 1013 to conductor 1085 which extends to armature 1867 in Fig. 18 and armature 1877 through the upper winding of stop relay 1816. As previously described, check-back relay 1001 is operated in case the printer operates properly, and check-back relay 1002 now operates only in case the magnet in the punch and the stop relay 1816 in the adding machine both operate. The check-back relays 1001 and 1002, therefore, only operate when the adding machine, the printer, and the punch operate in the proper manner.

The energization of stop relay 1816 closes an obvious circuit for energizing relay 1817, and the latter relay at armature 1820 closes a circuit for maintaining relay 1900 in energized position as follows: from grounded armature 1879, armature 1820, conductor 1730, conductor 1857, armature 2074, conductor 1925, and through the winding of relay 1900, to battery. The operation of armature 1821 of relay 1917 is without effect at this time since there are no carry-overs in the register 1801. At armature 1818, relay 1817 opens a point in the automatic stepping circuit of magnet 1841 of the first register, and at armature 1819 removes ground from conductor 1740 to unlock any of the lower computing relays which may have been locked operated, and also opens the circuit of stepping magnet 1846 of the sequence switch 1800 to cause the wipers 1847, 1848, 1849, and 1850 of the sequence switch to take one step.

When wiper 1847 takes its first step in engagement with conductor #2, included in cable 1813, the locking circuit through the upper winding of stop relay 1816 is opened, and a circuit is extended by way of the #2 conductor included in cable 1813 through the upper winding of relay 1822 for energizing said relay. The deenergization of computing relay 1720 in response to ground being removed from conductor 1740 and the stepping of the sequence switch wipers 1848 and 1849 opens the circuit of the stepping magnet 1841 of the first register as well as the circuit to the lower winding of stop relay 1816. Stepping magnet 1841, upon deenergizing, steps the wipers of the first register 1801 into engagement with their fourth set of bank contacts, at which time the B1 wiper will engage the contacts terminating the #4 conductor included in cable 1711, while the No. C1 wiper will engage the contact terminating the #5 conductor included in cable 1722. When both card-check relays 1001 and 1002 energize, ground is removed from conductor 1085 to permit the restoration of the stop relay 1816. When the polarized decoding relays in Fig. 10 deenergize responsive to the operation of the check-back relays, ground is removed from the #4 conductor included in cable 1081, with the result that computing relay 1704 and relay 1923 deenergize.

Stop relay 1816, upon deenergizing, opens the circuit of relay 1817, which in turn also deenergizes. Relay 1822, upon energizing, at its lower armature completes a locking circuit through its lower winding to grounded conductor 1810; at armature 1852 disconnects the B1 wiper of the first register and connects in place thereof the B2 wiper of the second register; and at armature 1872 disconnects the stepping magnet 1841 of the first register and prepares a circuit for stepping magnet 1842 of the second register.

The deenergization of computing relay 1720 and stop relays 1816 and 1817 have, therefore, removed ground from conductor 1857 to deenergize relay 1900. The deenergization of relay 1900 at this time completes a circuit for energizing one of the lower computing relays in Fig. 17 dependent upon the digit stored in the second register 1802. In this case, since there is no storage on register 1802, a circuit may be traced at this time for energizing computing relay 1720 from ground by way of armature 1869, armature 1818, conductor 1856, armature 2077 in Fig. 20, conductor 1902, armature 1901 and its resting contact, and thence over the armatures and their resting contacts of the various registers to armature 1852 and its working contact, wiper B2 in engagement with the #0 conductor included in cable 1711, and through the winding of computing relay 1720, to battery. The operation of computing relay 1720 again grounds conductors 1730 and 1857 to again energize relay 1900 to open the original energizing circuit of relay 1720, which at this time is locked in operated condition, as previously described, and to prepare a circuit for automatically operating the stepping magnet 1842 of the second register.

The adding machine has now received the second digit, or digit 4, of the serial number, and has stored this digit on the B1 wiper of the first register and has prepared the second register 1802 so that it may receive and store the next digit of the serial number. It might also be added that the punch, the printer, and the transmitter have operated in the same manner as previously described, the printer to print the numeral 4 on the tape and then step the carriage to its next position, the punch to operate and lock the set-up bars preparatory to punching the card in the punch in accordance with digit 4 in column thirty-six of said card, to thereafter step the carriage of the punch into its thirty-seventh position, and to operate the stepping switch in the transmitter to step into engagement with its seventeenth set of bank contacts in order to transmit the next digit of the serial number.

The transmitter now transmits the third digit of the serial number, or digit 3, to cause the operation of the printer to print the numeral 3, to set the set-up bar in the punch to punch the numeral 3 in the card, and to computing relay 1703 and relay 1923 by way of grounded #3 conductor included in cable 1081. Since computing relay 1720 at armature 1760 connects ground to #0 conductor included in cable 1721, a circuit may be traced to the #0 conductor through the armature third from the top, controlled by computing relay 1703, to conductor #3 included in cable 1722, and thence to the second set of bank contacts in the C wipers of the registers. The operation of relay 1923 at armature 1924 completes a circuit as previously described over conductor 1914 and through the interrupter springs of stepping magnet 1842 and the winding of said magnet, to battery. Stepping magnet 1842 is thereby automatically operated to step the wipers of the register 1802 step by step until the C2 wiper of register 1802 encounters the grounded bank contact which terminates the grounded conductor #3 included in cable 1722. When the C2 wiper encounters this grounded contact, a circuit may be traced over the #2 conductor included in cable 1814, the bank contact engaged by sequence switch wiper 1848, the lower winding of stop relay 1816, wiper 1849 in engagement with the bank contact terminating the #2 conductor included in cable 1815, and through the winding of stepping magnet 1842, to battery. The stepping magnet 1842 will be maintained energized in this circuit and the stop relay 1816 is again energized to perform the same functions as previously described. The wipers of the second register 1802 are at this time stopped in engagement with their second bank contacts. Stop relay 1816 at armature 1876 again sends a revertive impulse for operating the check-back relay 1002 in Fig. 10 in conjunction with the operation of the punch magnet in the punch, at armatures 1877 and 1878 completes a locking circuit for itself, and at armature 1879 again energizes relay 1817. At armature 1819, relay 1817 opens the locking circuit of computing relay 1720 and also opens the circuit extending to the stepping magnet 1846 of the sequence switch 1800 to cause the wipers of the sequence switch to take another step. When the both check-back relays in Fig. 10 energize responsive to the operation of the printer and punch, ground is removed from conductor 1085, thereby opening the locking circuit through the upper winding of stop relay 1816. The operation of the check-back relays also removes ground from the #3 conductor included in cable 1081, with the result that the computing relay 1703 and relay 1923 deenergize. Since the wipers of the sequence switch 1800 have advanced another step, the original energizing circuit through the lower winding of stop relay 1816 is opened and said relay opens the original energizing circuit of relay 1817 at armature 1879. The computing relay 1720 has by this time deenergized in response to the removal of ground from conductor 1740 by the operation of armature 1819, and ground is removed from conductors 1730 and 1857 to permit both relays 1817 and 1900 to deenergize. The deenergization of stepping magnet 1842 steps the wipers of the second register 1802 into engagement with their third set of bank contacts where the C2 wiper now engages the bank contact terminating #4 conductor in cable 1722 while the B2 wiper engages the bank contact terminating the #3 conductor included in cable 1711.

The wipers of the sequence switch 1800 have now been advanced into engagement with their second set of bank contacts, and, therefore, a circuit may be traced from grounded armature 1869, wiper 1847, the second bank contact terminating the #3 conductor of cable 1813, and through the winding of relay 1823, to battery. Relay 1823 at its lower-inner armature completes a locking circuit through its lower winding to the grounded conductor 1810, and at armature 1853 disconnects the second register and connects up the third register or register 1803. At armature 1873, relay 1823 prepares a circuit for operating the stepping magnet 1843 of the third register.

When relay 1817 deenergizes, said relay at armature 1819 again grounds conductor 1740 and again completes a circuit for energizing the stepping magnet 1846 of the sequence switch. At armature 1818, relay 1817 now completes a circuit for energizing one of the lower computing relays shown in Fig. 17 dependent upon the position of the B3 wiper of register 1803. Since it was assumed that no previous digit had at this time been stored on the register, the B3 wiper will be in engagement with the #0 conductor included in cable 1711, with the result that the computing relay 1720 is energized by way of armature 1853 and its working contact over the previously traced circuit. The adding machine is now ready to receive the next digit of the serial number, and in addition both the printer and the punch are also in readiness to receive the next digit. In the same manner as just described the remaining digits of the serial number and the digits in the sales price are registered successively in the succeeding registers of the adding machine.

From the foregoing it will be seen that the five registers shown in Fig. 18 have successively registered the last five digits of the serial number, or digits 4, 3, 2, 1, and 0; while the registers 1906 to 1910, inclusive, have registered the five digits in the sales price, or digits 1, 2, 3, 5, and 0. It will also be understood from the foregoing that the sequence switch wipers have operated step by step for successively operating the relays such as relays 1822 to 1825, inclusive, and 1926 to 1920, inclusive, for sequentially conditioning each register for operation. Therefore, after the last digit, or digit 0, of the sales price has been registered in register 1910 in response to the deenergization of stepping magnet 1940, the sequence switch wipers at this time are in engagement with their tenth set of bank contacts, and, therefore, a circuit may be traced from grounded armature 1869 by way of wiper 1847 and the tenth bank contact accessible thereto, and through the lower winding of relay 1830 to battery for energizing relay 1830. At armature 1839, relay 1830 completes a locking circuit for itself from off-normal springs 1866, which are maintained closed until the wipers of the switch are restored to normal; and at armature 1838 completes a self-restoring circuit for motor magnet 1846 as follows: from grounded, closed, off-normal springs 1866, armature 1839, armature 1838, interrupter springs on stepping magnet 1846, conductor 1858, armature 2075 in Fig. 20, conductor 1859, and through the winding of stepping magnet 1846 to battery. Stepping magnet 1846 energizes over the above-traced circuit, and at its interrupter springs opens its circuit to cause the wipers to take another step. The wipers, therefore, step into engagement with the normal position contacts, or the position shown in the drawings, and cause the off-normal springs 1866 to open to prevent a reenergization of the stepping magnet, and to cause the deenergization of relay 1830.

Before describing the operation of the printer, punch, and transmitter as a result of transmitting the last digit of the sales price, it is thought advisable at this time to more fully describe the operation of the adding machine, after which we will again return and explain the operations which take place after the transmission of the last digit of the sales price.

Referring now to Fig. 17 and to the foregoing description, it will be seen that the lower relays, such as relays 1711 to 1720, inclusive, are energized dependent upon the position of the B wipers in the various registers, and that the upper computing relays, such as relays 1701 to 1710, are operated dependent upon which one of the ten conductors in cable 1081 is at the time grounded. It will, therefore, be seen that these relays perform simple addition and provide carry-overs to be explained more fully hereinafter. By means of the following computing table, the additions performed by the computing relays can readily be determined, the digit registered in the registers is denoted by one of the conductors of cable 1721, the digit transmitted by the transmitter being denoted by the relay energized over one of the conductors in cable 1081, and the result by the numerals shown below the relays, which numerals indicate which one of the conductors in cable 1722 is grounded. The asterisk indicates a carry-over.

Computing table

| No. of wire in cable 1721 having positive battery thereon | 1701 | 1702 | 1703 | 1704 | 1705 | 1706 | 1707 | 1708 | 1709 | 1710 |
|---|---|---|---|---|---|---|---|---|---|---|
| 0 | 1 | 2 | 3 | 4 | 5 | 6 | 7 | 8 | 9 | 0 |
| 1 | 2 | 3 | 4 | 5 | 6 | 7 | 8 | 9 | 0* | 1 |
| 2 | 3 | 4 | 5 | 6 | 7 | 8 | 9 | 0* | 1* | 2 |
| 3 | 4 | 5 | 6 | 7 | 8 | 9 | 0* | 1* | 2* | 3 |
| 4 | 5 | 6 | 7 | 8 | 9 | 0* | 1* | 2* | 3* | 4 |
| 5 | 6 | 7 | 8 | 9 | 0* | 1* | 2* | 3** | 4* | 5 |
| 6 | 7 | 8 | 9 | 0* | 1* | 2* | 3* | 4* | 5* | 6 |
| 7 | 8 | 9 | 0* | 1* | 2* | 3* | 4* | 5* | 6* | 7 |
| 8 | 9 | 0* | 1* | 2* | 3* | 4* | 5* | 6* | 7* | 8 |
| 9 | 0* | 1* | 2* | 3* | 4* | 5* | 6* | 7* | 8* | 9 |

From the foregoing chart it will be evident that, with all the registers in zero position, positive battery is connected to the #0 conductor of cable 1721 each time one of these registers is selected for registration of a digit by the sequence switch 1800. Therefore, the digit that is registered in each register as it is selected corresponds to the digit of the grounded conductor in cable 1081.

We will now proceed to register the digits of a second number and a second sales price, but, before the second registration can take place, it should be stated that the punch has restored to normal, and, therefore, opened the circuit of cut-in relay 1868 to remove ground from conductor 1810 to cause the deenergization of the locked relays 1822 to 1825, inclusive, and relays 1926 to 1920, inclusive. On the next transmission, and when the punch again reaches its thirty-sixth position, the cut-in relay 1868 is again energized to perform the functions previously stated. The adding machine is, therefore, ready to receive the remaining digits of the new serial number and the digits of the new sales price. The operation of armature 1869 by cut-in relay 1868 grounds conductor 1810, grounds conductor 1740 by way of armature 1819, and completes a circuit for energizing the stepping magnet 1846 of sequence switch 1800, as previously traced. A circuit may also be traced for energizing computing relay 1714 from grounded armature 1869 by way of armature 1818, conductor 1856, armature 2077, conductor 1902, armature 1901 and its resting contact, through the armatures and their resting contacts, over the circuit previously traced, to the B1 wiper which at this time is in engagement with its fourth bank contact terminating #4 conductor in cable 1711, and thence through the winding of computing relay 1714 to battery. Computing relay 1714 at its lower armature grounds conductor 1730, at its inner-upper armature completes a locking circuit for itself to grounded conductor 1740, at armature 1754 connects ground to the #4 conductor included in cable 1721, and at armature 1744 prepares a carry-over circuit to conductor 1731. When conductor 1730 was grounded by relay 1714, relay 1900 energizes over the previously-traced circuit to open the original energizing circuit of relay 1714 and to prepare a circuit for the stepping magnet 1841 of the first register. In case the #4 conductor included in cable 1081 is grounded by the operation of the decoding relay in Fig. 10, relays 1704 and 1923 energize in the same manner as previously described. Since the #4 conductor in cable 1721 is grounded, and since computing relay 1704 is now energized, a circuit may be traced from the #4 conductor included in cable 1721 through the armature third from the bottom, controlled by relay 1704, to the #8 conductor included in conductor 1722 for marking the stopping point in the C bank of the first register. At armature 1924, relay 1923 completes the previously-traced circuit for automatically stepping the stepping magnet 1841 of the first register. The wipers of the first register are stepped step by step until the C1 wiper encounters the grounded contacts terminating the #8 conductor included in cable 1722. Stop relay 1816 is energized over the previously-traced circuit to stop the registers and to energize relay 1817, as previously described. The stepping magnet 1846 deenergizes and steps the wipers of the sequence switch one step, the computing relays 1704 and 1714 deenergize, relays 1900, 1923, 1816, and 1817 also deenergize in the same manner, as previously described, and the stepping magnet 1841 of the first register deenergizes to step the wipers an additional step. Relay 1822 is energized responsive to the wiper 1847 of the sequence switch stepping into engagement with its first bank contact to disconnect the first register and to prepare the second register for operation. At this time, since the digit 3 is stored in the second register, computing relay 1713 will be energized over the B2 wiper of register 1802 and will cause the energization of relay 1900 to prepare the adding machine for the next digit. In case the next digit is the digit 4, computing relay 1704 and relay 1923 are again energized when the polarized decoding relays in Fig. 10 ground the #4 conductor in cable 1081. Referring to the computing table, it will be seen that with computing relays 1713 and 1704 energized, the #7 conductor in cable 1722 is grounded to mark the second register 1802 in the C2 bank. At armature 1924 the energization of relay 1923 again completes the circuit for stepping magnet 1842 by way of armature 1872 and its working contact to cause the wipers of the second register to hunt for the grounded bank contact in the C2 bank. When the C2 wiper of register 1802 encounters the bank contact terminating the grounded #7 conductor included in cable 1722, stop relay 1816 is again energized while the stepping magnet 1842 is maintained in its energized position. Stop relay 1816 again sends the grounded reverted impulse to operate the check-back relay of Fig. 10, and again causes the energization of relay 1817. At armature 1819, relay 1817 removes ground from conductor 1740, thereby releasing computing relay 1713 and opening the circuit of stepping magnet 1846 to cause the wipers of the sequence switch to take an additional step to select the third register, at which time the circuit for relay 1823 is closed and said relay energizes. Due to the operation of the check-back relays 1001 and 1002 in Fig. 10, computing relay 1704 and relay 1923 deenergize. The stop relay 1816, relay 1817, and relay 1900 also deenergize in the same manner as previously described. In response to the deenergization of relays 1817 and 1900, a circuit may be traced for energizing computing relay 1712 by way of the B3 wiper of register 1803, which at this time is in engagement with conductor #2 of cable 1711 since the digit 2 has been previously stored on this register. Computing relay 1712 now energizes and locks to grounded conductor 1740, and stepping magnet 1846 of the sequence switch is again energized in the manner previously described. Computing relay 1713 at its lower armature grounds conductor 1730 for causing the energization of relay 1900, and the adding machine is now ready to receive the next digit of the serial number. In case the next transmitted digit is the digit 3, computing relay 1703 will energize in series with relay 1923; and, since the digit 2 is stored on the third register 1803, the computing relay 1712 will energize and the register 1803 will automatically step in the same manner as previously described; and, in this case, after the final deenergization of the stepping magnet 1843, the B3 wiper of register 1803 will be in engagement with the bank contact terminating the #5 conductor in cable 1711.

It will be noted up to this point that the adding machine has performed simple addition without any carry-overs, and, therefore, in order to explain one of the carry-over arrangements it will be assumed that the next digit of the serial number to be transmitted is the digit 9. Since the register 1804 has previously stored the digit 1, computing relay 1711 will energize, and when the #9 conductor in cable 1081 is grounded the computing relay 1709 is energized in series with relay 1923. By referring to the computing table, it will be seen that with the energization of relays 1711 and 1709 in the #0 conductor in cable 1722 is grounded, and, therefore, the C4 wiper of the fourth register will operate step by step in the same manner as previously described until the C4 wiper engages the grounded bank contact terminating the #0 conductor in cable 1722. Since the sum of the stored digit and the transmitted digit is more than 9, a circuit may be traced for grounding the carry-over conductor 1731 as follows: from ground by way of the lower armature of relay 1709, armature 1741 and its working contact, conductor 1731, armature 1821, wiper 1850 of the sequence switch, the third bank contact terminating the #3 conductor in cable 1815, and through the winding of stepping magnet 1843 of the third register to battery. When stop relays 1816 and 1817 are again energized in the same manner as previously described, the stepping magnet 1843 of the third register and the stepping magnet 1844 of the fourth register deenergize to step the wipers of the third and fourth registers, respectively, to their next or succeeding positions. The fourth register will step from in engagement with its ninth bank contact and the D4 wiper will encounter a grounded bank contact, thereby causing the fourth register 1804 to take an additional step responsive to the energization and deenergization of stepping magnet 1844 over an obvious circuit. The wipers of register 1804 have now been rotated to the position shown in the drawings, and the third register, or register 1803, has been operated into engagement with its sixth bank contact. The register 1803 has, therefore, been advanced an additional step to register the carry-over from the fourth register 1804.

It can be plainly seen from the circuit arrangement shown in Fig. 17 that when the sum of any stored digit and a transmitted digit is more than 9, the carry-over conductor 1731 will be grounded to cause the preceding register to take an additional step in the same manner as just described.

Since the 0 digit is registered in the last register 1805 of the serial number register, and since the next digit transmitted is the digit 0, the computing relays 1720 and 1710 energize and cause the register 1806 to complete a full revolution to again set the B5 wiper in zero position. From the foregoing it will be seen that the second serial number 44390 has been added to the first transmitted serial number 43210, and that the registers have added these two serial numbers. The registers are now in positions 8, 7, 6, 0, and 0, which, it will be seen, equals the sum of the two serial numbers.

It will now be assumed that the second transmitted sales price is $968.99. The computing relays, the registers, and the sequence switch 1800 operate in the same manner to add this last transmitted sales price to the first registered sales price, with the result that register 1911 has its B11 wipers in engagement with the first bank contact, the register 1906 has its B6 wiper in engagement with its zero or normal position, the register 1907 has its B7 wiper in engagement with its ninth bank contact, the register 1908 has its B8 wiper in engagement with its second bank contact, the register 1909 has its wiper in engagement with its third bank contact, and the last register 1910 has its B10 wiper in engagement with its eighth bank contact. The price registers in Fig. 19 have, therefore, added the two sales prices in a manner which can be easily understood from the foregoing description. It should possibly be mentioned at this time, in order to get a full understanding of the adding machine, that the A wipers of the various registers are provided to enable a double or larger carry-over, that is, if the digit being registered on a register provides a carry-over arrangement as previously described, and should the preceding register be in position 9, then the preceding register must provide arrangements for another carry-over. For example, it will be assumed that register 1802 is in position 2, register 1803 is in position 9, register 1804 is in position 9, and register 1805 is in position 5. It will further be assumed that the digit 6 is to be added to the digit 5 stored in register 1805 and, therefore, the register 1805 will rotate to its first position and provide a carry-over arangement for operating the register 1804 in the same manner as previously described. At this time, because the register 1804 is in its ninth position and the register 1803 is also in its ninth position, a circuit may be traced from the grounded carry-over conductor 1731 by way of armature 1821, wiper 1850, in engagement with the bank contact terminating conductor #4 in cable 1815, through the winding of stepping magnet 1844, to battery, and, by another path, over the ninth position bank contact, which is now engaged by the A4 wiper, armature 1895, through the winding of stepping magnet 1843, to battery, and through another circuit through the ninth bank contact engaged by wiper A3, armature 1894, and through the winding of stepping magnet 1842 to battery. The stepping magnets 1842, 1843, and 1844 are energized over the circuit just traced preparatory to stepping the wipers of the second, third, and fourth registers upon their de-energizations. This circuit just traced is opened responsive to the operation of relay 1817, with the result that the three stepping magnets deenergize and step the wipers of the registers as set forth. The second register or register 1802 has been moved from its second to its third position, the register 1803 has been moved from its ninth to its zero position, the register 1804 has also been moved from its ninth to its zero position, while the register 1804 has been operated into its first position. It should possibly be stated at this time that no carry-over arrangement is provided in connection with the first register 1801 because none is needed as the sum of the serial numbers transmitted is to be used only against the sum of the serial numbers on the card withdrawn from the inventory file, so that, if the last five digits in the adding machine are the same as the sum of the total taken from the inventory cards, it is, therefore, reasonable to assume that the proper inventory cards have been withdrawn from the inventory file.

From the foregoing description it can readily be seen that the printer, the punch, and the adding machine are operated simultaneously responsive to the last five digits of each serial number transmitted and responsive to the transmission of the digits in the sales prices.

Returning now to the operation of the printer at a time when the last digit or digit 0 of the sales price is transmitted, the #0 magnet prints the digit 0 in the thirtieth position, after which the carriage of the printer is automatically stepped to its thirty-first position. When the printer carriage reaches its thirty-first position, springs 1120 close and energize the carriage-return relay 1172 over an obvious circuit to cause the carriage of the printer to be restored to normal and to operate the paper or tape one step preparatory to printing the next series of digits transmitted by the transmitter. When the carriage is restored to its normal position, the springs 1122 open and disconnect one of the ground connections from the release trunk conductor 928.

The #0 magnet in the power punch, shown in Fig. 11, is also operated responsive to the transmission of the last digit of the sales price, or digit 0, to operate and lock the set-up bars and to operate the escapement to cause the carriage to be stepped from its forty-fifth position, at which time bar 1178 completes a circuit for energizing trip magnet 1179 as follows: ground by way of springs 1177, through the winding of trip magnet 1179, and through armature 1137 to negative battery. Trip magnet 1179, upon energizing, attracts its armature 1180 to permit the spring 1192 to rotate the flange 1194 into engagement with the constantly rotating flange 1195. The shafts 1185 and 1185' are, therefore, operated in the manner previously described and in the manner described in the aforesaid Lasker patent to cause the card in punching position to be perforated in accordance with the locked set-up bars after which the carriage is returned to its normal, or in this case, its twenty-first position. At the same time that the carriage is being returned to its normal position, the card feed mechanism of the punch is operated in the well-known manner to feed a new card into punching position such as indicated diagrammatically in Fig. 11—B. This card, after perforation, is ejected into the card hopper in the well-known manner.

The card just perforated by the punch and ejected into the card hopper is termed a "Sales audit and accounts receivable card" and has been perforated with the date of sale, the cashier's or customer's number, the clerk's number, the class of goods, the department number, the serial number, the sales price, and "send", "yard goods", or "bulk" perforations in case the goods sold is to be sent and in case the article sold is yard goods or bulk goods. The printing machine or the Electromatic printer has printed the cashier's number, the clerk's number, the class, the department, the serial number, and the sales price on the tape.

As previously stated, Fig. 21 may be substituted for Fig. 11, and in this case the upper armatures from 1050 to 1065, inclusive, are operated to code the conductors included in cable 1077 to operate the set-up magnets in the Teletype printer. By referring to the code shown just to the right of the dotted rectangle in Fig. 21, it will be seen that in order to cause the Teletype printer to print the digit 0 it is necessary for the number 1 and 5 magnets, as well as the so-called sixth pulse magnet 2155, to be energized over the conductors included in cable 1077. In order to transmit the digit 0, relays 1003 and 1007 are energized to close their upper armatures. Circuits may be traced responsive to the operation of relays 1003 and 1007 for grounding conductors 1071, 1075, and 1076 as follows: from grounded armature 1053, armature 1064, armature 1050, to conductor 1076, through armature 1051 to conductor 1071, and through armature 1063 to conductor 1075. With the above explanation, it can be readily seen by consulting the code shown to the right of the Teletype printer that the well-known Teletype printer may be operated to print the digits transmitted by the transmitter in response to the operation of the decoding relay in Fig. 10. After transmitting the last digit of the sales price, the Teletype printer is moved into its twenty-sixth position, whereupon it closes an obvious circuit for operating magnet 2155, whereupon the carriage of the printer is restored to its normal position in the well-known manner. It should be mentioned that the Teletype printer is mechanically arranged to change from a black to a red ribbon and vice versa in certain positions of the printer carriage, so that the cashier's number is printed in black ink, the clerk's number in red ink, the class and department numbers in black ink, the serial number in red ink, and the sales price in black ink. This arrangement provides a means for easily distinguishing between the different recorded statistics. The off-normal springs 2122 in the Teletype printer control the same functions as springs 1122 of the Electromatic printer. Since the detail operations of the Teletype printer is well known and described in the bulletin previously referred to, it is believed that this brief description of the operation of the Teletype printer at this time will suffice.

When the switch S in the transmitter has been stepped into engagement with its twenty-fifth set of bank contacts to transmit the last digit of the sales price, the stepping magnet SM is operated over the following circuit responsive to the operation of the stepping relay 806: from grounded conductor 722, armature 826, armature 829, armature 839, conductor 717, F wiper of the switch S, and through the winding of stepping magnet SM, to battery. Stepping magnet SM energizes and prepares the circuit to step the wipers from in engagement with their twenty-fifth contact into their first or normal position. When the check-back relays 1001 and 1002 deenergize responsive to the transmission of the last digit, the circuit of stepping relay 806 is opened with the result that said relay deenergizes and at armature 829 opens the circuit of stepping magnet SM to cause the wipers to step into their first position, or the position shown in the drawings. When the D wiper of switch S reaches its first or normal position, ground is removed from conductor 701, which ground up to this time has been maintaining relay 805 short circuited by way of armatures 837, 838, armature 821 and its working contact, armature 824, and through the winding of relay 805 to grounded conductor 722. When ground is removed from conductors 701 and 702 by the stepping of the D wiper to its normal position, relay 805 energizes in series with relay 804 over an obvious circuit. At armature 826, relay 805 disconnects grounded conductor 722 from conductors 716 and 717, and at armature 825 and its working contact completes a circuit for energizing the print magnet 82 as follows: from grounded conductor 722, start springs 65, conductor 703, armature 819, armature 825 and its working contact, conductor 704, and through the winding of print magnet 82 to battery. Print magnet 82, upon energizing, operates its armature to cause the steel spring 72 to be withdrawn from the edges of the printing bars 74, and, therefore, the springs 75 of the respective print bars cause the print bars to strike the type bars in the transmitter to print the date of sale on the merchandise card. In addition, the pin 87 on the first print bar 74 closes springs 88, whereupon a circuit may be traced for energizing the release magnet 91 of the transmitter and the release magnet 601 of the keyboard in Fig. 6; from grounded conductor 722 by way of start springs 65, springs 88 closed by the restoration of the print bar 74, conductor 608, through the winding of release magnet 601 to battery to restore any of the operated keys in Fig. 6 and by way of the winding of release magnet 91 to battery. Release magnet 91, upon energizing, operates its armature 92 to open the circuit of the hold magnet 66 at springs 93, to operate the catch 67 to permit the restoration of armature 63 of the hold magnet, whereby the lug 64 is withdrawn from the hole 62 in bracket 61 to permit the cover of the transmitter to open. When the transmitter opens the circuit through the holes in the card, the card-check relay 725 deenergizes to remove ground from conductors 722 and 710. In response to the removal of ground from conductor 722, relays 801, 803, 804, and 805 deenergize as well as send relay 802, in case it should be operated. The transmitter is now open and the cards may be removed at any time in readiness for the next sale.

When relay 805 energizes as previously described, said relay at armature 827 opens the circuit of relays 812 and 901, whereupon said relays deenergize. The deenergization of relay 812 disconnects the control and step conductors and also prepares the start circuit for another transmitter on the same line.

Relay 901, upon deenergizing, at armature 916 opens the holding circuit of relay 908, with the result that the test relay 908 deenergizes and at armature 965 completes an obvious circuit for energizing the release magnet 913 to release the wipers of the finder to their normal position. At armature 962, relay 908 opens the circuit of relay 909, which deenergizes and removes one of the ground connections from release trunk conductor 928. In case the finder wipers, the printer, and the punch have been restored to normal, and in case a new card has been inserted in punching position in the punch, all of the ground connections to release trunk conductor 928 at this time have been removed, with the result that the circuit to the dash-pot relay 914 is opened before the dash-pot relay has had sufficient time to fully operate to close an alarm circuit. When ground is removed from release trunk conductor 928, relay 906 also deenergizes in case there is no ground connection to common start conductor 926, with the result that transfer relay 905 will energize and again prepare the circuit for start relay 904. In case there is another call in this group, ground will be connected to conductor 926, with the result that relay 906 will be held over its lower winding to prevent the reenergization of transfer relay 905. Transfer relay 905 is prevented from energizing at this time to prevent this finder, which is just being released, from stealing the call away from the second finder which has been operated for a second call. It should also be mentioned that the off-normal springs 944 and 946 open when the wipers of the finders are fully restored to their normal positions. Off-normal springs 946 open the circuit of release magnet 913 while the off-normal springs 944 disconnect ground from the release trunk conductor 928. It will also be obvious that by the deenergization of relay 909 the decoding relays in Fig. 10 are also disconnected. The entire switch train used in transmitting this sales transaction has now been released and may be used on subsequent calls.

Arrangements have been made for punching the card in the Powers punch in the eleventh hole position in the thirty-first column in order to inform the attendant in the records room when an article purchased is to be sent to the purchaser's address. In case a cash purchase has been made and the customer desires the article to be sent, the send key 26 will be operated before the transmitter is closed. Under these conditions, and when the transmitter is closed to ground conductor 722 as previously described, a circuit may be traced from grounded conductor 722 by way of armature 823 and its resting contact, armature 841 and its resting contact, send springs 26, normally closed springs controlled by armature 817, and through the winding of the send relay 802 to battery. Send relay 802, upon energizing, at armature 817 completes a locking circuit for itself by way of grounded conductor 722 before the cash relay 803 has had sufficient time to energize and open the circuit of the send relay at armature 823. Armature 818 of send relay 802 is operated to disconnect conductor 20b included in cable 718 from conductor 720 and to connect conductor 20b to conductor 721. At armature 816, relay 802 grounds conductor 713, which terminates in the fourteenth bank contact accessible to the E wiper. When the E wiper engages its fourteenth contact in a manner previously described, a circuit may be traced by way of the grounded fourteenth bank contact, E wiper, conductor 712, armature 828, armature 858, conductor 860, resting contact of armature 922 and said armature, finder bank contact 935 and wiper 942 now in engagement therewith, armature 961, armature 957 and its resting contact, conductor 987, and through the winding of relay 1133 to battery. Relay 1133 energizes over the above-traced circuit, and at armature 1144 closes a circuit for operating the #11 punch magnet in the Powers punch as follows: ground by way of any one of the grounded armatures 1021, 1028, and 1037 by way of armatures 1013 and 1017, conductor 1085, armature 1144, #11 punch magnet, and armature 1137 to negative battery. The #11 punch magnet is operated simultaneously with the #7 punch magnet which has been operated from the transmitter by way of the A, B, and C conductors and the decoding relays shown in Fig. 10. The Powers punch, therefore, in the thirty-first column locks the #7 and the #11 set-up bars preparatory to punching the card in the thirty-first vertical column in the #7 and #11 hole positions. The eleventh hole position is punched in the card to indicate that the article is to be sent. From the foregoing it can be seen that it is necessary to operate the send key 26 before the transmitter is closed so that the send relay 802 will be energized before the cash relay 803 is energized, because relay 803 will open the circuit of the send relay 802 at armature 823 in case the send key were operated after the transmitter is closed. From the foregoing, it will, therefore, be seen that the operation of the send key 26 after the transmitter is closed is without effect.

Arrangements have also been made for transmitting yard or bulk goods transactions to the central records room. Since the number of yards varies in accordance with the demand for each customer, or the number of articles sold by bulk also varies, special merchandise cards such as card 46', shown in Fig. 5—A, are provided for yard and bulk goods. Because of the varied amounts purchased by the customer, and the varying price, the yard or bulk goods articles have a special card with only a certain number of perforations. For instance, a bolt of goods will have attached thereto a yard-goods tag, which will be perforated in accordance with the class of goods, the department, the last four numbers of the serial number, and with only one card-check hole. The first two numbers of the serial number will be left blank on the card and no perforations will be included in the card for these two digits, while the columns in the card provided for the price will also be left blank. Referring now to Fig. 7, the yard-goods card will have perforations to work in conjunction with the pins 43 shown in the eleventh, twelfth, thirteenth, fourteenth, seventeenth, eighteenth, nineteenth, and twentieth vertical columns shown in Fig. 7. This yard-goods card has a hole perforated to permit a pin 38 of the transmitter to engage the card-check pin 111.

The first two vertical rows of keys 15 and 16, shown in Fig. 6, are provided for supplying the first two digits of the serial number, while the remaining five vertical columns 21 to 25, inclusive, keys are for supplying the price of the goods sold. Each vertical row of keys, such as 15, is provided with ten keys numbered 1 to 0, inclusive, for providing the necessary marking to be applied to the banks of the switch in the transmitter and for controlling the card-check relay 725, as will be more fully disclosed hereinafter. It will be noted that the negative battery control conductor 720 is multipled to conductor 602, which is multip'ed up through the various left-hand springs in the keys. For instance, the #2 key in the first vertical column, or column 15, at springs 613 connects the negative conductor 602 to the b conductor which terminates in the fifteenth bank contact accessible to the B wiper shown in Fig. 7. Spring 612 in key 2 connects the positive battery conductor 603 to the c lead which terminates in the fifteenth bank contact accessible to the C wiper of the switch in Fig. 7. It will also be noted that the key #1 when operated connects negative battery conductor 602 to the a conductor which terminates in the fifteenth bank contact accessible to the A wiper and also connects the positive battery conductor 603 to the b conductor which terminates in the fifteenth bank contact accessible to the B wiper. In a somewhat similar manner, all of the left-hand springs in all of the keys shown in Fig. 6 connect negative battery and positive battery potential to the A, B, and C conductors in accordance with the key actuated. For instance, the #2 key in the last vertical column of keys (not shown) when actuated connects negative battery to the twenty-fifth contact terminating in the bank accessible to the B wiper, and also connects positive battery to the twenty-fifth bank contact accessible to the C wiper. It will, therefore, be seen that the keys operate to apply the code to the A, B, and C conductors in a manner similar to that described through the holes in the merchandise card. The right-hand springs in each of the vertical rows of keys are provided for controlling the check-back relay 725. It will be noted that the outer right-hand springs, such as springs 615 of key 2 in the first vertical row of keys, are connected in multiple to conductors 606 and 607. These springs provide a circuit for short circuiting the card-check relay 725 when a merchandise card is inserted in the transmitter by way of card check pin 110, conductors 606 and 607, and the lower winding of relay 725. The transmitter will, therefore, not lock when any key is operated at a time when a merchandise card is in the transmitter. The inner right-hand springs in each vertical row of keys, such as springs 614, close a circuit for energizing the card-check relay 725 only when a key in each vertical row is operated. These springs form a continuous chain for connecting conductor 604 to conductor 605 only when a key in each column is operated. The vertical row of keys numbered 1 to 0 in column 15 is used for designating the full number of yards, while the vertical row of keys in column 16 is used for designating eighths of yards; for instance, if the clerk sold three and one-half yards of goods the #3 key in column 15 and the #4 key in column 16 would be operated to indicate three and one-half or three and four-eighths yards.

It will now be assumed that a clerk has sold three and one-half yards of goods to a customer, and the sales price is one dollar per yard. The clerk will, therefore, remove the yard-goods card from the bolt of goods and will give this yard-goods card and her own to the cashier who will place the yard-goods card, the clerk's card, and her own, or cashier's card, in the transmitter. Since the clerk has sold three and one-half yards, the #3 key in column 15 and the #4 key in column 16 will be operated to designate three and one-half yards. The cashier will also operate the "0" keys in columns 21 and 22, the #3 key in column 23, the #5 key in column 24, and the #0 key in column 25 to indicate the price of the three and one-half yards of goods.

When the proper cards have been properly placed in the transmitter and a key in each of the vertical rows in Fig. 6 is operated, the cashier will close the transmitter, and, responsive thereto, a circuit may be traced for operating the card-check relay 725 as follows: from ground by way of springs 95, conductor 732, pin 116, pin 38 extending through the hole in the clerk's card, the metal strip 37 to pin 38 extending through the hole in the yard-goods card which is now in engagement with card-check pin 111, conductor 604, through the inner-right-hand springs of key #3 in vertical column 15, through the inner-right-hand springs of key #4 in column 16, and in a similar manner through the inner-right-hand springs of the operated keys in columns 21 to 25, inclusive, to conductor 605, through the upper winding of card-check relay 725, and resistance 728, to negative battery. From the foregoing circuit, it will, therefore, be seen that in case the cashier fails to operate a key in any one column, the chain circuit just described will not be completed for the card-check relay 725. It will also be seen that in case any one card is omitted from the transmitter the card-check relay will be shorted.

The transmitter transmits the cashier's number, the clerk's number, and the class and department numbers punched in the yard-goods card in the same manner as previously described. At this point the operation of the transmitter is slightly different because the yard-goods card has no holes punched in the fifteenth and sixteenth vertical positions designated in Fig. 7. The coding of the A, B, and C wires is, therefore, taken off the operated #3 and #4 keys in the fifteenth and sixteenth columns, respectively. After transmission of the department number to the recording room, the carriage of the punch, shown in Fig. 11, is now in its thirty-fifth position, while the carriage of the Electromatic printer, shown in Fig. 11, is in its nineteenth position.

When the stepping relay 806 in Fig. 8 reenergizes responsive to the carriages of the punch and printer moving to their respective positions, said relay at armature 830 connects negative battery by way of resistance 832, conductor 720, conductor 602, springs 616 and 617, the $a$ and $c$ conductors extending from the first vertical row of keys by way of the twenty-one-conductor cable 601 to the fifteenth bank contact accessible to the A and C wipers of the switch in Fig. 7. The connection of battery potential to the C and A conductors causes the operation of polarized relays 1004 and 1008, which in turn cause both the printer magnet #3 and the punch magnet #3 to operate the printer and punch in the manner previously described. In a similar manner, since the #4 key in column 16 is operated, the springs therein connect the positive conductor 603 to the $a$ conductor and connect the $c$ conductor to the negative battery conductor 602. The $a$ and $c$ conductors extending from the second vertical row of keys by way of conductors 601 terminate in the sixteenth bank contact accessible to the A and B wipers of the switch in Fig. 7. When the A and B wipers reach the sixteenth bank contact the A conductor is grounded while the B conductor is connected to negative battery, thereby causing the relays 1003 and 1006 in Fig. 10 to energize and operate the #4 printer magnet and the #4 punch magnet.

It should have been mentioned that due to the circuit extending through the card-check hole in the yard-goods card, a circuit may be traced by way of grounded conductor 732, card-check pin 116, by way of card-check pin 111, conductor 604, and thence to the fifteenth bank contact accessible to the E wiper of the switch for causing the punch to be set to indicate a yard-goods sale. When the E wiper of the switch reaches its fifteenth position, the previously-traced circuit for relay 1133 is then closed to cause the operation of the #11 punch magnet, thereby causing the card in the punch to be later punched in the eleventh-hole position in column 35 at the same time that the #3 punch magnet is operated over the A and B conductors as previously described. Since holes have been punched in the yard-goods card for the remainder of the serial number, therefore, a circuit may be traced through the pins shown in vertical columns 17, 18, 19, and 20 in Fig. 7 for operating the apparatus in the same manner as previously described. When the transmitter has finished transmitting the last digit of the serial number, the transmitter will then transmit the price of the article. Since the price is not punched in the yard-goods card, the operation of the price keys in columns 21 to 25, inclusive, control the code to be sent over the A, B, and C conductors in the same manner as previously described for the first two numbers in the serial number. It being remembered that the keys in the vertical columns in Fig. 6 connect the $a$, $b$, and $c$ conductors to negative or positive battery and that the $a$, $b$, and $c$ conductors for columns 21, 22, 23, 24, and 25 terminate in correspondingly-numbered banks in the switch in the transmitter by way of the twenty-one-conductor trunk 601. Since the sales price is three and one-half dollars, the #0 key in column 21 causes the #0 magnet in the printer and punch to operate. In a similar manner, the remaining successive codes 0, 3, 5, and 0 are transmitted to cause the proper operation of the correspondingly numbered magnets in the printer and punch. After the last sales price digit, or digit 0, has been transmitted to the printer and punch, the trip magnet 1179 and the carriage-return relay 1172 are operated in the same manner as previously described. The punch punches the card in accordance with the locked set-up bars, after which the card is ejected into a card hopper and a new card is inserted in a card punching position. The operation of the carriage-return relay 1172 in the printer causes the carriage to be returned to its first position and to rotate the tape or paper to provide a new horizontal row for printing any subsequent transaction.

It will now be assumed that a customer having a charge account desires to make a purchase and charge it to her account. Each customer having a charge account will be furnished with an identification card having perforated in code, data corresponding to the customer's number, and, in addition, having a single hole punched in the position of the card-check pins so that pin 113, shown in Fig. 7, alone is effective for controlling the transmitter. The general procedure would be to give the customers different numbers from those assigned to the cashiers, but in order to more conveniently describe the operation it will be assumed that the customer's number in this case is 107654. When the sales clerk makes the sale and the customer tells her to charge it to her account, the customer will give her card to the clerk, who in turn will give the customer's card along with her own card to the cashier together with the merchandise card, and the cashier will insert the merchandise card, the customer's card, and the clerk's card in the transmitter. The cashier will operate the send key in case the customer desires the article purchased to be sent to her address, or will leave the send key 26 in open position if the customer desires to take the article with her. The cashier will now close the transmitter, and in case the cards are properly inserted the card-check relay 725 is energized by way of pins 116 and 110 over the circuit previously traced for a cash sale. In this case, since only the card-check pin 113 is effective because there is no perforation for pin 114, the cash relays 801 and 803 are not energized. However, a circuit may be traced for the hold magnet 66 to lock the transmitter in the same manner as previously described. Responsive to the operation of the hold magnet 66, a circuit is now closed for operating the credit relay 808 as follows: from ground by way of springs 95, conductor 732, card-check pin 116, conductor 37, card-check pin 113, armature 727, springs 90 closed by the hold magnet 66, credit conductor 711, armature 820, through the winding of credit relay 808, normally closed springs controlled by armature 842, conductor 865, armature 1215, resting contact of armature 1220 and said armature, and through the resistance 1219 to negative battery. Credit relay 808 energizes over the above-traced circuit, and at armature 842 opens its original energizing circuit and closes a circuit by way of conductor 864, normally closed springs controlled by armature 1218, and through the winding of line relay 1202, to battery. Relays 1202 and 808 are maintained energized in series over this latter circuit. At the resting contacts of armature 842, relay 808 opens the hold circuit extending to hold conductor 864 to prevent the second or any other transmitter on this line from sending a credit sales transaction. At armature 840, relay 808 prepares a point in the circuit extending to the stepping relay 806; at the resting contact of armature 841 opens the circuit extending to the send key 26; at the working contact of armature 841 closes a circuit from grounded conductor 722 by way of armature 823 for energizing the credit-switching relay 807; and at armature 843 prepares a point in the circuit for the credit release relay 810. Credit-switching relay 807, upon energizing, at armatures 834, 835, and 836, connects the C, B, and A conductors to the C', B', and A' conductors which terminate in the multipled finder bank contacts 1230, 1231, and 1232, respectively. At armature 837, relay 807 disconnects conductor 701 from conductor 702, at armature 838 prepares a circuit for relay 809; and at armature 839 disconnects the conductor 716 from conductor 717 to cause the switch in Fig. 7 to stop in engagement with its twenty-fifth set of bank contacts.

Responsive to the energization of line relay 1202, said relay at armature 1220 and its resting contact removes negative battery potential from conductor 865 in order to prevent the energization of any other credit relays, such as relays 808 and 808', thereby preventing a second transmitter on this line from transmitting a credit transaction until after this transmitter on this line is through sending its credit transaction. At armature 1220 and its working contact, relay 1202 applies negative battery potential to the multipled contacts 1234; at armature 1222 and its working contact prepares a circuit to the lower winding of cut-off relay 1201; and at armature 1221 completes an obvious circuit for energizing the start- and level-marking relay 1203. At armature 1223, relay 1203 connects ground to vertical bank contacts 1236 in the various credit finders, and at armature 1224 closes a circuit for energizing the start relay 1204 in the first idle finder in this group. The operation of this finder is identical with the operation of the finder described in Fig. 9, and, therefore, only a brief description of its operation will be given at this time. In case the finder shown in Fig. 12 is the first idle finder, then start relay 1204 will energize and at armature 1253 close a circuit for energizing the vertical magnet 1211 to step the wipers of the finder in its first vertical step. Vertical magnet 1211 at armature 1267 completes a circuit for energizing the stepping relay 1210, and the latter relay at armature 1276 interrupts the circuit of the vertical magnet 1211. This interaction between the stepping relay 1210 and vertical magnet 1211 continues until the vertical test wiper 1243 encounters a vertical bank contact grounded by the marking relay 1203. Therefore, when vertical bank wiper 1243 encounters bank contact 1236, a circuit may be traced through armature 1250 and the upper winding of change-over relay 1207 and the winding of relay 1210 to battery. The change-over relay 1207 is energized over the above-traced circuit and the stepping relay 1210 is maintained energized. Change-over relay 1207 at armature 1258 prepares a circuit through the upper winding of test relay 1208; at armature 1259 completes a locking circuit for itself; and at armature 1260 completes the circuit for the rotary magnet 1212, which energizes and at armature 1266 interrupts its own circuit, thereby rotating the wipers of the finder step by step. When test wiper 1241 of the finder encounters the negative battery potential applied to bank contact 1234 by relay 1202, test relay 1208 energizes and at armature 1264 opens the circuit to the rotary magnet 1212 to stop the wipers of the finder on this set of bank contacts. At armature 1261, test relay 1208 completes a circuit by way of armature 1257, wiper 1242, bank contact 1235, armature 1222 and its working contact, and through the lower winding of cut-off relay 1201 to battery. Cut-off relay 1201 energizes over the above-traced circuit, and at armature 1216 completes a locking circuit for relay 1208 by way of armature 1216, bank contact 1234, wiper 1241, armature 1263, and through the lower winding of said relay 1208 to battery. At armature 1217, cut-off relay 1201 completes a circuit for maintaining itself energized in series with credit relay 808 over conductor 864, and at the normally closed springs controlled by armature 1218 opens the original energizing circuit of line relay 1202.

Responsive to the energization of switching relay 1209, armatures 1270, 1271, 1272, and 1273 connect the C', B', A', and step conductors through to the C', B', A', and step conductors extending to Fig. 13. At armature 1274, relay 1209 grounds the start conductor 1284, and at armature 1275 completes a circuit for energizing relay 1206. At armature 1256, relay 1206 opens the circuit of relay 1205, and the latter relay deenergizes and at armature 1254 extends the start conductor 1226 to the next finder over conductor 1290. Since relay 1203 is deenergized at this time, the next finder is not operated. At armature 1254 the circuit for start relay 1204 is opened, and, therefore, after an interval, the start relay deenergizes to open the locking circuit of change-over relay 1207. Change-over relay 1207 deenergizes, and at armature 1257 connects conductor 1287 to conductor 866 for a purpose to be described more fully hereinafter. At armature 1257, change-over relay 1207 also opens the circuit of line relay 1202, with the result that ground potential by way of armature 1216 is connected to the finder bank 1234 in order to prevent any other finder from seizing this line circuit.

When switching relay 1209 energizes and grounds conductor 1284 by way of armature 1274, a circuit may be traced by way of armature 1354 and its resting contact, armature 1315 and through the lower winding of polarized relays 1303 to 1308, inclusive, to energize the polarizing winding of these relays. A branch of this circuit may also be traced by way of armature 1314, resting contact of armature 1353 and said armature, step conductor, armature 1273, wiper 1240 in engagement with multiple bank 1233, step conductor 861, armature 840, armature 844, armature 852 and its resting contact, and through the winding of stepping relay 806 to battery for energizing the latter relay. At armature 829, stepping relay 806 completes a circuit for energizing the stepping magnet SM in Fig. 7 by way of grounded conductor 722, armature 826, armature 829, conductor 716, the first bank contact accessible to the test wiper, and through the winding of stepping magnet SM to battery. Stepping magnet SM energizes and operates its pawl preparatory to stepping the wipers of the switch. At armatures 830 and 831, stepping relay 806 connects negative battery and ground potential to conductors 720 and 721 for the purpose of coding the A, B, and C conductors by means of the holes through the customer's card in the same manner as previously described. In this case, since the digit 1 is punched in the #1 vertical column, a circuit may be traced for connecting negative battery to the A conductor as follows: from negative battery, resistance 832, armature 830, conductor 720, through pins extending through the holes indicated by the top heavy black circle in vertical column #1 in Fig. 7, conductor 1a terminating in the first bank contact accessible to the A wiper and to the A conductor. This circuit is extended by way of armature 836 to the A' conductor and thence by way of bank contact 1232, wiper 1239, armature 1272, armature 1352 and its resting contact and through the upper windings of relays 1303 and 1304 to mid-point or neutral battery. Since negative battery is connected to the A' conductor, polarized relay 1304 alone energizes over the above-traced circuit. In a similar manner, the B' conductor is connected to positive battery by way of grounded conductor 722, resistance 833, armature 831, conductor 721, the lower heavy black circle shown in #1 column, through the multiple connection to conductor 1b which terminates in the first contact accessible to the B wiper and said wiper, B conductor, armature 835, B' conductor, and thence by way of bank contact 1231, wiper 1238, armature 1271, armature 1351 and its working contact, and through the upper winding of polarized relays 1305 and 1306 to neutral battery. Since the B' conductor is connected to positive battery, polarized relay 1305 alone energizes over the above-traced circuit. The polarized relays 1304 and 1305 are, therefore, energized in response to the transmitter sending the code of digit 1. At armatures 1321 and 1324, relays 1304 and 1305 prepare a locking circuit for the check-back relay 1302, and at armatures 1323 and 1326 connect ground to the #1 conductor included in cable 1381 extending to the position selecting relays shown in Fig. 14. Ground extends by way of armature 1337 and its resting contact, armature 1332 and its resting contact, armature 1317, armature 1323, armature 1326, conductor #1 included in cable 1381, and thence by way of armature 1429, armature 1422 and through the winding of position selecting relay 1401 to negative battery for energizing relay 1401. Position selecting relay 1401 energizes over the above-traced circuit, and at armature 1417 prepares a circuit for energizing relay 1402 when ground is removed from the #1 conductor in cable 1381 and for maintaining relays 1401 and 1402 locked energized to the grounded release trunk conductor 1228. The operation of armatures 1418 and 1419 at this time are without effect since the relay 1409 at this time is not energized. At armature 1420, relay 1401 connects ground by way of armatures 1424 and 1420 to conductor 1383 and through the upper winding of check-back relay 1302 to battery for energizing the check-back relay 1302. Relay 1302, upon energizing, at armature 1314 opens the circuit extending to the stepping relay 806 in the transmitter; at armature 1315 opens the circuit extending through the lower windings of the polarized relays to cause their deenergization, and at armature 1317 removes ground from the #1 conductor included in the cable 1381. When ground is removed from conductor #1 included in cable 1381, the short circuit around relay 1402 is removed, with the result that relay 1402 energizes and is maintained energized in series with relay 1401 by way of the grounded release conductor 1228.

Before proceeding with the detailed circuit description, it is believed advisable to describe the arrangement of the position selecting relays shown in Fig. 14 and the position cut-in relays shown in Fig. 15. In the upper portion of Fig. 14 two sets of position selecting relays are shown, the first set 1401 to 1404, inclusive, for selecting credit clerks' positions from 10 to 19, inclusive, and the second set 1405 to 1408, inclusive, for selecting ten other credit clerks' positions from 20 to 29, inclusive. The upper two sets of relays are individual to a certain trunk or individual to the finder shown in Fig. 12. In the instant disclosure only the #10 credit position is shown fully wired for use, it being understood that the other credit positions are wired in a similar manner. It can also be readily seen that if more than twenty credit positions are needed, then additional position selecting relays will be connected to the #3 and #4 conductors included in the cable 1381 in a manner similar to the connection of the position selecting relay shown connected to the #1 and #2 conductors. This addition would, therefore, increase the number of positions to forty. As shown, the first digit sent over cable 1381 will cause the operation of position selecting relays 1401 to 1404, inclusive, in case the digit is 1, and, in case the first digit is 2, the relays 1405 to 1408, inclusive, will operate. When the second digit is sent over cable 1381, a circuit is completed for a particular position cut-in relay in Fig. 15, dependent upon which of the position selecting relays are at this time operated. The lower portion of Fig. 14 shows a similar arrangement of position selecting relays for another trunk (not shown).

Fig. 15 shows four position cut-in relays 1501, 1502, 1506, and 1507. The position cut-in relays 1501 and 1506 are individual to a certain trunk, or in this case are individual to the finder shown in Fig. 12. It will also be understood that there are additional position cut-in relays individual to this trunk for other credit clerks' positions. In a similar manner, the position cut-in relays 1502 and 1507 are individual to the trunk indicated by the position selecting relays in the lower portion of Fig. 14. Relays 1501 to 1505, inclusive, are individual to a given clerk's position, in this case position #10, while relays 1506 to 1510, inclusive, are individual to position #25. It will also be understood that there are additional cut-in relays (not shown) similar to relays 1501 and 1502 individual to position #10. These additional relays are each individual to a certain trunk. From the foregoing, it will, therefore, be seen that there is one cut-in position relay per trunk at each credit clerk's position. For example, position cut-in relay 1501 is individual to the #10 credit clerk's position and also individual to the trunk extending to the finder shown in Fig. 12. The key TK shown to the right, together with relays 1504, 1505, 1509, and 1510, is for transferring calls intended for credit position #10 to credit position #25, and vice versa, and will be described more fully hereinafter.

When relay 1402 energizes in series with relay 1401, relay 1402 at armature 1421 opens the circuit extending to the digit 2 selecting relay or relay 1405; at armature 1422 opens the original energizing circuit of relay 1401; at armature 1423 closes an obvious circuit for energizing relays 1403 and 1404; and at armature 1424 removes ground from conductor 1383, thereby opening the original energizing circuit of check-back relay 1302. At armatures 1451 to 1450, inclusive, relay 1403 prepares circuits for lighting a lamp at a credit clerk's position, such as lamp 1577 at position 10, shown in Fig. 15. At armatures 1461 to 1460, inclusive, relay 1404 prepares circuits for energizing ten position cut-in relays, each of which is individual to one of the ten credit positions Nos. 10 to 19, inclusive.

The deenergization of stepping relay 806, in response to the operation of check-back relay 1302, removes the potentials from the A' and B' conductors and causes the stepping magnet SM to step the wipers of the switch shown in Fig. 7 into engagement with their second set of bank contacts in the same manner as previously described. Responsive to the deenergization of the polarized relays 1304 and 1305 and the energization of relay 1402, check-back relay 1302 deenergizes and at armature 1315 again completes the circuit through the lower winding of the polarized relays, and at armature 1314 again completes the circuit for energizing the stepping relay 806 in the transmitter. Responsive to the energization of stepping relay 806, the next digit, or digit 0, in the customer's number is transmitted. The digit 0 is indicated by the full black circles shown in vertical column #2 of Fig. 7, and at this time a circuit may be traced by way of grounded conductor 722, armature 831, conductor 721, through the holes perforated in the customer's card for the second digit, or digit 0 in this case, to the second bank contacts accessible to the C and A wipers of the switch, over the C and A conductors through the armatures 836 and 834 to the C' and A' conductors, through the finder to armatures 1350 and 1352, and thence through the upper windings of relays 1303 and 1304 and through the upper windings of relays 1307 and 1308. In this case, since ground potential is connected to the C' and A' conductors, only polarized relays 1303 and 1307 are energized. A circuit may now be traced for grounding the #0 conductor in cable 1381 as follows: from grounded armature 1328 and its resting contact, armature 1324 and its resting contact, armature 1317, armature 1319, armature 1336 to the #0 conductor included in cable 1381, and to armatures 1450 and 1460. A circuit may now be traced for lighting the lamp 1577 as follows: from grounded armature 1450, conductor 1492, spring 1571 and its resting contact, and through the filament of the lamp 1577 to negative battery. Another circuit may also be traced from grounded armature 1460 by way of conductor 1493 through the winding of position cut-in relay 1501, through the normally closed springs controlled by armature 1519, armature 1523, armature 1526, and through resistance 1530 to battery. Position cut-in relay 1501 energizes over the above-traced circuit, and at armature 1519 and its working contact interrupts its original energizing circuit and substitutes the winding of relay 1503 in place of the resistance 1530. Relay 1503 energizes in series with relay 1501 as follows: through the winding of cut-in relay 1501, armature 1519 and its working contact, through the resting contacts and armatures in series on all of the cut-in relays individual to the #10 position, through armature 1527 and its resting contact, and the winding of relay 1503 to battery. Relay 1503 upon energizing at armature 1523 disconnects the battery potential connected to resistance 1530 from all of the remaining cut-in relays individual to the #10 position to prevent their energization when this position is busy, and at armature 1524 opens a point in the circuit extending to the transfer relays 1504 and 1505 to prevent their energization at this time.

At armatures 1511, 1512, 1513, and 1514, relay 1501, upon energizing, connects the C', B', A', and step conductors included in cable 1496 to the decoding polarized relay shown in Fig. 16 by way of cable 1590 and the resting contacts of armatures 1551, 1552, 1553, and 1554. At armature 1515, relay 1501 connects the start conductor 1384 included in cable 1491 to conductor 1595 included in cable 1590; at armature 1516 connects conductor 1287 to conductor 1596 included in cable 1590; at armature 1517 connects the release conductor 1228 to release conductor 1597 included in cable 1590; and at armature 1518 closes a locking circuit for itself from grounded release conductor 1228. At armatures 1521 and 1522 relay 1501 connects ground through resistance 1529 to the A' and C' conductors included in cable 1497; and at armature 1520 connects ground to conductor 1385 included in cable 1491 for energizing the transfer relay 1300 in Fig. 13.

Transfer relay 1300, upon energizing, at armatures 1350 to 1354, inclusive, disconnects the decoding polarized relays of Fig. 13 and connects the conductors instead to the apparatus shown in Figs. 14 and 15 by way of cables 1490 and 1491. At armatures 1353 and 1354 transfer relay 1300 opens the circuit extending to the stepping relay 806, with the result that the stepping relay deenergizes and causes the stepping magnet SM in Fig. 7 to operate the wipers of the switch into engagement with their third set of bank contacts. At this time a circuit may be traced by repeating relay 1409 as follows: from grounded armature 1274, start conductor 1284, armature 1354 and its working contact, start conductor 1384, cable 1491, armature 1515, armature 1555 and its resting contact, conductor 1595 included in cable 1590, armature 1658, armature 1614, resting contact of armature 1657 and said armature, step conductor included in cable 1590, resting contact of armature 1554 and said armature, armature 1514, step conductor included in cable 1496, armature 1445 and its resting contact, armature 1437 and its resting contact, and through the winding of repeating relay 1409 to battery. A branch of the above-traced circuit connects ground from armature 1658, armature 1615, and through the lower windings of the polarized relays 1603 to 1608, inclusive, for polarizing these relays in the same manner as previously described for the other similar decoding polarized relays.

Repeating relay 1409, upon energizing over the above-traced circuit, at armature 1433 connects the grounded release trunk conductor 1228 to the winding of relay 1410, but this relay at this time does not energize because it is short circuited from ground over the step conductor. At armature 1435 relay 1409 closes a circuit for energizing polarized relay 1505 as follows: from ground through resistance 1413, armature 1418, armature 1435, armature 1439 to the B' conductor included in cable 1496, armature 1512, armature 1552 and its resting contact, to the B' conductor included in cable 1590, armature 1655 and its resting contact, and through the upper windings of polarized relays 1605 and 1606 to mid-point or neutral battery. Another circuit for energizing polarized relay 1604 may be traced as follows: from negative battery through resistance 1414, armature 1419, armature 1436, armature 1440 to the A' conductor included in cable 1496, armature 1513, armature 1553 and its resting contact to the A' conductor included in cable 1590, armature 1656 and its resting contact, and through the upper windings of relays 1603 and 1604 to mid-point or neutral battery. From the foregoing it will be seen that the position selecting relay 1401 connects battery and ground potential to the decoding relays in Fig. 16 by way of the repeating relay 1401 to cause the decoding relays to operate the #1 print magnet in the Electromatic printer shown in Fig. 16. Relays 1401 and 1409, therefore, repeat the digit 1 in order to cause the printer to print the full customer's number.

When polarized relays 1604 and 1605 energize, said relays at armatures 1621 and 1624 prepare a locking circuit for the check-back relay 1602, and at armature 1637 connects ground by way of armature 1632 and its resting contact, armature 1617, armatures 1623 and 1626, conductor #1 included in cable 1699 extending to the #1 print magnet in the Electromatic printer. The Electromatic printer magnet #1 is energized over the above-traced circuit and prints the numeral 1 on the tape in the printer. In addition, the operation of the #1 print magnet operates an escapement to cause the carriage to move one step and also operate a bar which is common to all of the numeral print magnets to close springs 1651. When the escapement causes movement of the carriage to its second position, the carriage off-normal springs 1652 close to connect ground to the release trunk conductor 1597. When springs 1651 close by the operation of any one of the numeral print magnets, a circuit is closed for energizing the check-back relay 1602 through its upper winding. At armature 1616 relay 1602 closes a locking circuit for itself, and at armature 1617 removes ground from the #1 conductor extending to the #1 print magnet to cause its deenergization. At armature 1615 the polarizing circuit through the lower windings of the polarized relays is opened, and at armature 1614 relay 1602 disconnects the grounded start conductor 1595 from the step conductor, thereby removing the short circuit from around relay 1410, whereupon relay 1410 energizes in series with repeating relay 1409. Relays 1409 and 1410 now remain energized over the grounded release trunk conductor 1228. At armature 1437, relay 1410 prepares a circuit for relay 1411, and at amatures 1438, 1439, and 1440 disconnects the A', B', and C' conductors in cable 1496 from the negative battery ground potentials applied by the position selecting relay 1401. The decoding polarized relays 1604 and 1605 now deenergize and open the locking circuit of the card-check relay 1602, and the latter relay deenergizes. Responsive to the deenergization of the check-back relay 1602, the circuit for polarizing the decoding polarized relay is again completed, and at armature 1614 a circuit is completed from grounded armature 1274 over the previously-traced circuit to armature 1445, and thence by way of armature 1437 and its working contact through the winding of relay 1411 to battery. Relay 1411 energizes over the above-traced circuit, and at armature 1441 prepares a circuit for energizing relay 1412. Relay 1411, at armatures 1442, 1443, and 1444, connects the C', B', and A' conductors included in cable 1497 to the C', B', and A' conductors included in cable 1496. A circuit may now be traced for operating the polarized relays in Fig. 16 in accordance with the digit 0 or the second digit in the customer's number. A circuit for energizing polarized relay 1603 may be traced as follows: from ground through resistance 1529, armature 1522, A' conductor included in cable 1497, resting contact of armature 1448, armature 1444 to the A' conductor included in cable 1496, armature 1513, armature 1553 and its resting contact to the A' conductor included in cable 1590, armature 1656 and its resing contact, and through the upper windings of polarized relays 1603 and 1604 to mid-point or neutral battery. Since positive battery is connected to the A' conductor, only polarized relay 1603 is energized over the above-traced circuit. A circuit for energizing polarized relay 1607 extends by way of ground through resistance 1529, armature 1521, C' conductor included in cable 1497, resting contacts of armature 1446 and said armature, armature 1442, C' conductor included in cable 1496, armature 1511, armature 1551 and its resting contact, C' conductor included in cable 1590, armature 1654 and its resting contact, and through the upper windings of polarized relays 1607 and 1608 to mid-point or neutral battery. Since the C' conductor is grounded, polarized relay 1607 energizes and completes a circuit for grounding the #0 conductor included in cable 1699 as follows: from ground by way of armature 1628 and its resting contact, armature 1624 and its resting contact, armature 1617, armature 1619, armature 1636, the 0 conductor included in cable 1699, and through the #0 print magnet to negative battery. The #0 print magnet prints the digit 0 and causes the carriage to step into its third position. Springs 1651 again close and again energize the check-back relay 1602, which is locked in energized position. Responsive to the energization of relay 1602, ground is removed from the 0 conductor which is included in cable 1699 and also opens the circuit extending through the lower windings of the polarized relays. At armature 1614, relay 1602 removes the short circuit from around relay 1412, with the result that relay 1412 now energizes in series with relay 1411 by way of grounded release trunk conductor 1228 and armature 1441. Relay 1412, upon energizing, at armature 1445 and its working contact completes a circuit for energizing the stepping relay 806 in the transmitter over the step conductors; at the resting contacts of armatures 1446, 1447, and 1448 disconnects the C', B', and A' conductors included in cable 1497 from the A', B', and C' conductors included in cable 1496, and at the working contacts of said armatures connect the A', B', and C' conductors included in cable 1490 to the A', B', and C' conductors included in cable 1496. The A', B', and C' conductors in cable 1496 are now directly connected to the A, B, and C wipers of the switch in Fig. 7, and, therefore, the decoding relays shown in Fig. 16 are from now on directly controlled by the wipers of the switch. The first two digits in the customer's number have selected the proper credit operator's position, and the two digits have then been repeated to the decoding relays in Fig. 16 to operate the Electromatic printer in accordance therewith.

When the decoding relays 1603 and 1607 and check-back relay 1602 deenergize after operating the #0 print magnet, the circuit for energizing the stepping relay 806 in the transmitter may now be traced from grounded armature 1274, start conductor 1284, armature 1354 and its working contact, conductor 1384 included in cable 1491, armature 1515, armature 1555 and its resting contact, conductor 1595 included in cable 1590, armature 1658, armature 1614, armature 1657, step conductor included in cable 1590, resting contact of armature 1554 and said armature, armature 1514, step conductor included in cable 1496, armature 1445 and its working contact, step conductor included in cable 1490, working contact of armature 1353 and said armature, and thence over the previously-traced circuit to the stepping relay 806 in the transmitter. Since the third digit, or digit 7, in the customer's number includes the perforations in the customer's card, indicated by the heavy small black circles in vertical column #3 of Fig. 7, it can readily be seen that the third bank contact accessible to the A wiper has negative battery potential applied thereto, while the third bank contact accessible to the C wiper of the switch has positive battery connected thereto in response to the operation of the stepping relay 806 in the same manner as previously described. From the foregoing, it may be readily seen that, in accordance with the third digit of the customer's number, or digit 7, the A' conductor is connected to negative battery, while the C' conductor is connected to positive battery. Therefore, in the same manner as previously described, the decoding relays 1604 and 1607 are energized to ground the #7 conductor to cause the #7 print magnet in the Electromatic printer to print the digit 7 on the tape. The springs 1651 are again closed to operate the check-back relay 1602 to cause the stepping relay in the transmitter to deenergize and step the wipers of the switch preparatory to sending the next digit of the customer's number. The remaining digits in the customer's number, that is, digits 6, 5, and 4, as indicated in Fig. 7, are transmitted to cause the printer to print the numerals 6, 5, and 4 on the tape. After printing the last digit of the customer's number, or digit 4, the carriage moves to its seventh position, in which position springs 1647 close to operate the space magnet 1648, thereby causing the carriage to move one space without printing any digit. The carriage of the printer is now in its eighth position and remains in this position until the transmitter is ready to transmit the "take" or "send" indication of the article to be charged to the customer.

When the transmitter has transmitted the sixth digit in the customer's number, the D wiper of the switch is advanced into engagement with its seventh bank contact, which is connected to conductor 702. When the D wiper of the switch reaches its seventh position, a circuit for automatically stepping the wipers of the switch into engagement with its twentieth set of bank contacts may be traced as follows: from ground by way of springs 95, the D wiper of the switch in engagement with the seventh bank contact, conductor 702, armature 838 and its working contact, through the winding of relay 809 to battery, which energizes, and at armature 845 extends the circuit by way of armature 821 and its resting contact, conductor 715, interrupter springs 19, and through the winding of stepping magnet SM to battery. Stepping magnet SM operates in a buzzer-like manner over the above-traced circuit and rotates the wipers of the switch step by step until the D wiper no longer encounters a grounded contact. Since the seventh to the nineteenth bank contacts accessible to the D wiper are multipled together and connected to ground, the wipers of the switch will be rotated and stopped in their twentieth position. Relay 809 is momentarily operated, and when the D wiper of the switch loses ground, the relay 809 will deenergize. At armature 844, relay 809, therefore, momentarily opens the circuit of stepping relay 806.

It will now be assumed that the cashier has not operated the "send" key 26, and, therefore, the transmitter will transmit a "take" indication (digit 4) when the wipers of the transmitter switch are in their twentieth positions. Since the "send" key 26 is not operated then, relay 802 is likewise not operated, and when stepping relay 806 energizes responsive to the deenergization of relay 809, the stepping relay at armatures 830 and 831 connect negative battery to the B' conductor by way of the twentieth bank contact and B wiper and positive battery to the A' conductor by way of the twentieth bank contact and A wiper. Decoding relays 1603 and 1606 energize and cause the printer to print digit 4 on the tape. The carriage steps from its eighth to its ninth position where springs 1647 again close to operate the space magnet 1648 to cause the carriage to move to its tenth position in readiness to print the sales price of the article. Check-back relay 1602 operates responsive to the operation of the printer to cause the wipers of the transmitter switch to step to their twenty-first position and to deenergize the decoding relays of Fig. 16 as previously described.

It will now be assumed that the price of the article desired by the customer is $123.50, and, therefore, the merchandise card is perforated in vertical columns 21 to 25 in code with perforations corresponding to digits 1, 2, 3, 5, and 0. Due to the price perforations in the merchandise card, the twenty-first bank contact accessible to the A wiper is connected to negative battery while the twenty-first bank contact accessible to the B wiper is connected to positive battery responsive to the energization of the stepping relay 806. The polarized decoding relays 1604 and 1605 operate in the same manner as previously described to cause the #1 print magnet to print the first digit, or digit 1, of the price on the tape. The remaining digits of the price are transmitted in the same manner as previously described. After printing the last digit, or digit 0, of the sales price, the carriage of the printer moves to its fifteenth position, whereupon the springs 1647 again close to operate the space magnet 1648 to step the carriage another step. The carriage of the printer has, therefore, stepped into its sixteenth position, and in this position springs 1653 are closed to prepare a circuit for relay 1664 and for completing a circuit for energizing the transfer relay 1600 as follows: from ground by way of springs 1653, conductor 1598 included in cable 1590, resting contact of armature 1558 and said armature, conductor 1591, and through the upper winding of transfer relay 1600 to battery. At armature 1659 relay 1600 completes a locking circuit for itself through its lower winding to the grounded release trunk conductor 1597, and at armatures 1654 to 1658, inclusive, and their resting contacts disconnects the polarized decoding relays and check-back relay from the conductors in cable 1590. At armatures 1654 and 1655 and their working contacts the C' and B' conductors are connected to the heavy conductors extending to the monophone telephone set to provide a talking circuit between the cashier at the transmitter and the credit operator. At armature 1657 and its working contact, the step conductor included in cable 1590 is connected to the working contacts of armatures 1670, 1673, and 1675. The printer is at this time in its sixteenth position and the wipers of the switch in the transmitter are in engagement with their twenty-fifth set of bank contacts because wiper F at this time does not encounter a grounded multiple contact, and, therefore, the stepping magnet is not operated at this time to step the wipers out of engagement with their twenty-fifth bank contact.

The printer at the #10 credit operator's position has printed the cashier's number 107654, the digit 4 to indicate a "take" transaction, 12350 to indicate the sales price of the article; and the carriage remains in sixteenth position in order to print an indication as to whether the credit operator approves or rejects this transaction. The operator at #10 credit position, upon reading the customer's number and amount of sale, will search through her file located at this position in search of this particular customer's number. In this particular instance it will be assumed that this particular customer's credit is O. K., and the credit operator will, therefore, operate the O. K. key to approve the sale.

Responsive to the operation of the OK key, springs 1661 close a circuit for relay 1665 as follows: from ground by way of springs 1653, armature 1668 and its resting contact, springs 1661, and through the winding of relay 1665 to battery. At armature 1672, relay 1665 connects ground to the #1 conductor included in cables 1699' to the #1 print magnet in the printer. The #1 print magnet is operated to print the numeral 1 on the tape, thereby indicating that this particular transaction has been approved by the credit operator. Responsive to the operation of the print magnet #1 the carriage of the printer is moved into its seventeenth position, and in this position closes springs 1650, which close an obvious circuit for the carriage return relay 1649. The operation of the carriage-return relay 1649 returns the carriage to its normal position and also advances the tape one step in the well-known manner. When the carriage of the printer is fully restored to its normal position, the springs 1652 are opened to remove ground from release trunk conductor 1597. At armature 1670 the operation of the OK relay 1665 grounds the step conductor by way of working contacts of armature 1657 and said armature, step conductor included in cable 1590, resting contact of armature 1554 and said armature, armature 1514, cable 1496, armature 1445 and its working contact, step conductor included in cable 1490, working contact of armature 1353 and said armature, armature 1273, wiper 1240 in engagement with bank contact 1233, conductor 861, armature 840, armature 844, armature 852 and its resting contact, and through the winding of stepping relay 806 to battery. At armature 1671 relay 1665 closes an obvious circuit for energizing relay 1664, which upon energizing locks itself to grounded release trunk conductor 1597 and opens the circuit to relay 1665 at armature 1668. Another circuit may be traced from grounded armature 1671 by way of conductor 1596 included in cable 1590, resting contact of armature 1556 and said armature, armature 1516, conductor 1287 included in cable 1491, resting contact of armature 1257 and said armature, armature 1261, wiper 1242 in engagement with bank contact 1235, armature 1222 and its resting contact, conductor 866, armature 843, armature 853, and through the winding of credit release relay 810 to battery. The stepping relay 806 and the credit release relay 810 energize over the above-traced circuits. The operation of stepping relay 806 at this time is without effect because the polarized control relays have been disconnected and because wiper F of the switch in the transmitter is in engagement with its twenty-fifth bank contact, which at this time is not grounded due to the operation of armature 839 of credit switching relay 807. Credit release relay 810, upon energizing, at armature 846 grounds conductor 714 for energizing the stepping magnet SM preparatory to stepping the wipers of the switch from in engagement with their twenty-fifth bank contacts, at armature 847 completes a circuit for energizing cash relays 801 and 803, and at armature 848 prepares a circuit for energizing relay 811, which, however, at this instant is short circuited from ground over conductors 866 and 722. The circuit for energizing cash relays 801 and 803 extends by way of grounded step conductor 861, armature 840, armature 844, armature 852 and its resting contact, armature 847, and through the windings of relays 801 and 803 to battery. At armature 819, relay 803 maintains the circuit for the hold magnet 66 closed; at armature 820 opens the circuit of credit relay 808 and cut-off relay 1201; at armature 821 opens a point in the restoring circuit and prepares a circuit for relay 804; at armature 822 closes a locking circuit for itself and for relays 801 and 806 before the ground is removed from the step conductor 861 and release conductor 866 by the deenergization of the relay 1665; and at armature 823 opens the circuit of relay 807 and the circuit for energizing relay 811 in series with relay 810 before ground is removed from conductor 866 by the deenergization of relay 1665. Relay 811, therefore, does not fully energize, and relay 810 is only momentarily energized when a credit sale is approved.

Credit switching relay 807, upon deenergizing, at armatures 834, 835, and 836 disconnects the C', B', and A' conductors from the C, B, and A conductors, at armatures 837 and 838 prepares a circuit for energizing relay 804, and at armature 839 closes a circuit for maintaining the stepping magnet SM energized as follows: grounded conductor 722, armature 826, armature 829, armature 839, conductor 717, twenty-fifth bank contact and F wiper, and through the winding of stepping magnet SM to battery. Relay 808, upon deenergizing, at armature 840 disconnects the credit step conductor 861 from the winding of stepping relay 806, at armature 842 opens a point in its holding circuit, and at armature 843 disconnects the grounded credit release conductor 866 from the windings of relays 810 and 811. Credit release relay 810, upon deenergizing, at armature 846 disconnects ground from conductor 714 and at armature 847 opens the circuit extending to stepping relay 806. Stepping relay 806, upon deenergizing, at armature 829 opens the circuit extending to the stepping magnet SM, with the result that the stepping magnet deenergizes and steps the wipers of the switch in Fig. 7 into engagement with their first bank contacts.

Responsive to the deenergization of relay 1201, said relay at armature 1216 opens the circuit of relay 1208 with the result that relay 1208 deenergizes and in turn deenergizes the switching relay 1209. At armature 1265 relay 1208 closes a circuit extending from armature 1253 and its resting contact and through the vertical off-normal springs 1246 for energizing the finder release magnet 1213, thereby causing the finder to release its wipers to normal position. At armatures 1270 to 1273, inclusive, switching relay 1209 disconnects the C', B', A', and step conductors from the wipers of the finder, at armature 1274 removes ground from the start conductor 1284, and at armature 1275 removes one of the ground connections from release trunk conductor 1228. When the wipers of the finder are restored to their normal position, the vertical off-normal springs 1244 and 1246 are opened, the off-normal springs 1244 opening the circuit of relay 1206 and also removing another ground connection from the release trunk conductor 1228; and at off-normal springs 1246 opens the circuit of the release magnet 1213. The deenergization of relay 1206 again completes the circuit for energizing relay 1205 to prepare a circuit for start relay 1204. At this time, all of the ground connections are disconnected from release trunk conductor 1228 with the result that the dash-pot relay 1214 will deenergize. When ground is disconnected from release trunk conductor 1228, relays 1401, 1402, 1403, 1404, 1409, 1410, 1411, and 1412 will deenergize and restore their armatures. Position cut-in relay 1501 and relay 1503 will also deenergize responsive to the disconnection of ground from release trunk conductor 1228. When ground is removed from release trunk conductor 1228, ground is also removed from release trunk conductor 1597, and, therefore, transfer relay 1600 also deenergizes. The deenergization of position cut-in relay 1501 at armature 1520 disconnects ground from transfer conductor 1385 with the result that the transfer relay 1300 also deenergizes. The entire credit switch trains shown in Figs. 12, 13, 14, 15, and 16 have now been released and are now in their normal positions or the positions shown in the drawings.

Returning now to the transmitter and at a time when the cash relay 803 energizes after the credit operator has approved the credit sale, said relay at armature 823 and its working contact closes a circuit for energizing the cash switching relay 812 over conductor 862 as previously described in the cash sale. It will now be seen that the relays and apparatus in the transmitter are in the same position as in the start of transmission for a cash sale, and from this point on the transmitter shown in Figs. 7 and 8, the finder in Fig. 9, the polarized control relay in Fig. 10, the printer and punch in Fig. 11, and the adding machine operate in the same manner as described for a cash sale to make a record in the central records room of the approved credit sale.

Returning now to the credit operator's position shown in Fig. 16 and at a time when the full sales price is printed on the tape and at a time when springs 1653 are closed, it will now be assumed that for some reason or other this particular customer is not entitled to charge the amount registered on the tape. When the credit operator, in accordance with the record, finds it necessary to reject a charge or credit sale, the credit operator will operate the call-back key CB, thereby completing a circuit for energizing relay 1664 as follows: from ground by way of springs 1653 closed by the carriage in its sixteenth position, armature 1668, call-back springs 1660, through the normally closed springs controlled by armature 1669, and the winding of relay 1664 to battery. At armature 1668, relay 1664 and its resting contact disconnects the call-back (CB) and OK keys, and at its working contact prepares the circuit for the hold and reject key, and at armature 1669 opens its original energizing circuit and also completes a locking circuit for itself from the grounded release trunk conductor 1597.

At the same time that the call-back key operates, a circuit may be traced for credit-release relay 810 before relay 1664 fully energizes to open its armature 1668. This circuit may be traced from springs 1653, armature 1668 and its resting contact, call-back springs 1660, conductor 1596, and thence over the previously-traced circuit through the winding of credit-release relay 810 to battery. Credit-release relay 810, upon energizing, at armature 848 connects the grounded conductor 722 through the winding of relay 811. Shortly after relay 810 energizes, relay 1664 becomes fully energized, and at armature 1668 opens the original energizing circuit of relay 810. When ground is removed from conductor 866 by the energization of relay 1664, relay 811 energizes in series with relay 810 as follows: from grounded conductor 722, armature 823 and its resting contact, armature 848, through the winding of relay 811, and through the winding of relay 810 to battery. Relay 811 at armature 849 completes a circuit by way of conductor 706 and normally closed cradle springs 731 to the lamp 25 and buzzer 824 for operating the same in order to signal the cashier at the transmitter. Since the call-back key alone has been operated at the credit operator's position the stepping conductor 861 is not grounded, and, therefore, the relays 801, 803, and 806 are not at this time energized as previously described for an approved transaction. Relay 811 at armatures 850 and 851 completes the talking circuit over the heavy conductors 707 and 708 and the C' and B' conductors. At armature 853, relay 811 opens a further point in the original energizing circuit of relay 810, and at armature 852 and its working contact connects the step conductor 861 to conductor 705.

The credit operator, after momentarily operating the call-back key CB, will remove the monophone from the cradle, thereby closing the cradle springs CS preparatory to talking to the cashier. The cashier in response to the operation of the buzzer 824 and the lighting of lamp 25 removes the monophone from the cradle, thereby at cradle springs 731 opening the circuit to the buzzer and light and at cradle springs 730 preparing a circuit for operating the release magnet 91. The credit operator will now talk to the cashier over the talking circuit indicated by the heavy black lines including the C' and B' conductors, and will inform the cashier that she is unable to approve this charge sale. Talking battery for the credit operator is furnished through relay 1680, while the talking battery for the various cashiers is furnished through relay 1681.

As soon as the credit operator has informed the cashier that she cannot approve this sale, the credit operator will operate the reject key REJ, thereby closing a circuit for energizing reject relay 1667 as follows: grounded springs 1653, armature 1668 and its working contact, reject springs 1663, and through the winding of reject relay 1667 to battery.

At armature 1676, reject relay 1667 grounds the #3 conductor included in cable 1699', thereby causing the operation of the #3 print magnet to print the numeral 3 on the tape in position 16. At armature 1675, relay 1667 grounds the step conductor included in cable 1590 to thereby close a circuit, as previously traced, to credit stepping conductor 861, and thence by way of armature 840, armature 844, armature 852 and its working contact, conductor 705, through the cradle springs 730 closed by the removal of the monophone from the cradle, and through the winding of release magnet 91 to battery. A branch of the above-traced circuit extends by way of conductor 608 through the key release magnet 601 for releasing any of the keys which may be locked in operated position in yard-goods key set.

Returning now to the printer shown in Fig. 16, the operation of the #3 print magnet causes the numeral 3 to be printed on the tape in the manner previously described, and causes the carriage of the printer to be advanced to its seventeenth position, whereupon springs 1650 close a circuit for energizing the carriage-return relay 1649 to return the carriage to its normal position and space the tape one step in the well-known manner. When the carriage reaches its normal position, springs 1652 open to remove one of the ground connections connected to release trunk conductor 1597. Relays 1600 and 1664, however, are maintained energized by the other ground connections connected to the release trunk conductor.

Returning now to the transmitter, and at a time when the release magnet 91 is energized over conductor 705, it will be noted that release magnet 91 operates its armatures 92 to open springs 93 and to move the catch 67 to permit the release of armature 63 of the hold magnet 66. Hold magnet 66 deenergizes responsive to the opening of springs 93 and removes the lugs 64 from the hole 62 in the bracket 61 to permit the cover of the transmitter to open, and at springs 90 opens the circuit of credit relay 808 and cut-off relay 1201. Relay 808, upon deenergizing, at armature 840 opens the circuit of release magnet 91, at armature 841 opens the circuit of switching relay 807, at armature 843 opens a point in the original energizing circuit of relay 810, and at armature 842 prepares the original energizing circuit for relay 808 and prepares the chain circuit from the hold conductor 864 to the other transmitters on the same line. Relay 807, upon deenergizing, at armatures 834, 835, and 836 disconnects the C, B, and A conductors from the C', B', and A' conductors, and at armatures 837 and 838 completes a circuit for restoring the wipers of the switch in the transmitter as follows: from grounded conductor 732, D wiper in engagement with any one of its associated multipled bank contacts, conductors 701 or 702, armatures 837 and 838, armature 821, conductor 715, interrupter springs 19, and through the winding of stepping magnet SM to battery. Stepping magnet SM operates in the manner of a buzzer to restore the wipers to their normal position or in engagement with the first set of bank contacts, in which case the D wiper no longer is connected with either conductor 701 or 702. Any time after the opening of the transmitter, the cashier may replace the monophone on the cradle. When the transmitter opens, the card-check relay 725 deenergizes and ground is removed from conductor 722. The removal of ground from conductor 722 causes all of the relays in Fig. 8 which are locked energized thereto to deenergize, and, therefore, relays 810 and 811 are at this time deenergized. It should be noted at this time that, because this particular sale was rejected, no circuit was completed for print magnet 82, and, therefore, when the cover of the transmitter is automatically opened in response to the credit operator's operating the reject key REJ, the steel spring 72 is not removed from the edges of the print bars 74, and the print bars 74 are, therefore, returned to their normal positions at the same time that the cover is opened, and, due to the slow release controlled by the dash-pot in the transmitter, the type on the print bars at this time does not print the date of sale on the merchandise card. All of the apparatus and relays involved in this transaction are, therefore, at normal position, and may be used for other transactions.

It will be noted that the hold key 1662 is wired substantially the same as the reject key 1663, with the exception that the operation of the hold key causes the operation of relay 1666 to cause the printer to print the numeral 2 instead of numeral 3, as is done when the reject key is operated. The operation controlled by the hold relay 1666 is the same as that controlled by reject key 1667, and it is, therefore, thought that this description need not be repeated.

From the foregoing, it may, therefore, be seen that on an approved credit sale the credit operator operates the OK key to cause an O. K. indication to be printed by the printer and causes the recording of the sale in the central records room after which the transmitter is automatically opened. The automatic opening of the transmitter at this time indicates to the cashier that the sale has been approved by the credit operator. In case the sale is rejected or is to be held, the reject or hold keys are operated only after the call-back key CB has been operated to signal the cashier, thereby necessitating the removal of the monophone from the cradle at the cashier's transmitter before the hold or reject keys can effectively be operated and before the transmitter is opened by the credit operator in response to the operation of either one of the hold or reject keys. The cashier, therefore, must always talk to the credit operator before the transmitter can be opened so that the cashier will receive certain instructions if necessary to take care of this particular transaction.

The modification shown in Fig. 22 may be substituted for Fig. 16 in case a Teletype printer is to be used instead of an Electromatic printer. It will be noted that the transfer relay 2200 corresponds to transfer relay 1600 and operates in the same manner as described for relay 1600. The check-back relay 2202 is similar to relay 1602 and operates whenever the sixth-pulse magnet 2241 is operated to close its armature 1242. Since the sixth-pulse magnet 2241 operates in response to each digit printed in the Teletype printer, the check-back relay 2202 will operate in a manner similar to that described for relay 1602. The polarized decoding relays 2203 to 2208, inclusive, are similar to the decoding relays 1603 to 1608, inclusive, and operate in the same manner as described for the decoding relays shown in Fig. 16. The decoding relays 2203 to 2208, inclusive, control the circuits for operating the set-up magnets 1 to 5, inclusive, in the Teletype printer in combination in accordance with the code shown just to the right of the Teletype printer in Fig. 22. From the foregoing description, it may be readily seen that when the digit 1 is transmitted from the transmitter decoding relays 2204 and 2205 operate to complete circuits for the Nos. 2 and 3 set-up magnets and for the sixth-pulse magnet 2241 as follows: from ground at armature 2223, armature 2227, armature 2213, through the winding of magnet 2241 and also from armature 2213 by way of armatures 2222 and 2226 to the Nos. 2 and 3 set-up magnets to negative battery. The Nos. 2 and 3 set-up magnets, together with the operation of the magnet 2241, cause the Teletype printer to print the digit 1 on the tape and to operate the carriage of the printer one step. The check-back relay 2202 energizes responsive to the operation of magnet 2241 to cause the de-energization of the polarized relays, and the stepping of the switch in the transmitter to its next position in the same manner, as previously described. In response to the transmission of the next digit, or digit 0, polarized relays 2203 and 2207 operate to in turn operate the #1 and #5 set-up magnets and magnet 2241 in the Teletype printer to print the digit 0 on the tape. The circuit for operating the #1 and #5 set-up magnets in the printer extends from grounded armature 2220, armature 2235, armature 2213, and over armatures 2217 and 2234 to the #1 and #5 set-up magnets in the printer. In a manner similar to that described, the remaining digits of the customer's number are transmitted and recorded by the Teletype printer, after which a "take" or "send" indication is printed dependent upon whether the send key 26 and send relay 802 are operated or not. By referring to Fig. 8, and in case the transaction is a "send" transaction, the key 25 and send relay 802 are operated, and, therefore, the code applied to A' and B' control conductors causes the operation of relays 2203 and 2205, which in turn prepares the #1 and #3 set of magnets in the printer to print the digit 5, thereby indicating a "send" transaction. In case the send key had not been operated, then send relay 802 would not have been operated, with the result that at this time the A' conductor is connected to positive battery while the B' conductor is connected to negative battery. This combination causes the energization of relay 2203 and relay 2206 to cause the operation of the #1 and #4 set-up magnets in the printer, which in turn print the digit 4 to indicate a "take" transaction.

From this point on, in the same manner as previously described, the price of the article to be charged is then transmitted and recorded by the set-up magnets. After printing the last digit of the sales price, the carriage of the printer is stepped into its thirteenth position in the well-known manner, and in this position a circuit may be traced for energizing transfer relay 2200 and slow-to-release relay 2264; from grounded springs 2239 which are closed when the carriage reaches its thirteenth position, transfer conductor 1598 included in cable 1590, resting contact of armature 1558 and said armature, conductor 1591, and through the upper winding of relay 2200, to battery. Relay 2200, upon energizing, at armature 2259 completes a locking circuit through its lower winding to the release-trunk conductor 1597, at armatures 2254 and 2255 disconnects a portion of the polarized decoding relays and connects in place thereof the talking circuit at the credit operator's position, and at armatures 2257 and 2258 connects the step and start conductors to the relay group shown to the right. The circuit for energizing relay 2264 extends by way of springs 2239, left-hand armature of relay 2265, and through the winding of relay 2264 to battery. At armature 2270, relay 2264 prepares a circuit for operating the sixth-pulse magnet 2241, and at armature 2271 prepares a circuit for operating the set-up magnets in the printer. A circuit for energizing relay 810 in the transmitter is completed responsive to the operation of transfer relay 2200 as follows: from ground at armature 1274 by way of start conductors 1284, 1584, and 1595, as previously traced, armature 2258 and its working contact, resting contact of armature 2285 and said armature, armature 2280, armature 2274 and its resting contact, and thence by way of conductor 1596 and over the previously traced circuit through the winding of relay 810 to battery.

As soon as the full customer's number, the "take" or "send" indication, and the sales price of the article are printed on the tape by the Teletype printer, the credit operator at this position will consult her records, and either approve, hold, or reject this transaction. Assuming first that the credit operator finds this account to be in order, she will then operate the OK key, thereby causing the operation of OK relay 2266 as follows: ground on grounded start conductor 1595, armature 2285, armature 2280, armature 2274 and its resting contact, armature 2275, OK springs 2261, through the normally closed springs controlled by armature 2276, and through the winding of OK relay 2267 to battery. At armature 2275, relay 2267 opens a point in the circuit through the call-back key CB, at armature 2276 completes a locking circuit for itself including the start conductor 1595; and at armature 2277 completes an obvious energizing circuit for relay 2265 and also connects ground to the step conductor for energizing the stepping relay 806 and relays 801 and 803. At armatures 2278 and 2279, ground from armature 2271 is connected to the #2 and #3 set-up magnets, while ground extending by way of armature 2277, armature 2272, armature 2270, and through the winding of the sixth-pulse magnet 2241 causes the energization of the sixth-pulse magnet and the #2 and #3 set-up magnets to print the numeral 1, indicating an approval, on the tape. The printing of the digit 1, or the O. K. indication, causes the carriage of the printer to step into its fourteenth position, where a circuit is closed by way of springs 2238 for operating the sixth-pulse magnet 2241 alone. The Teletype printer is so arranged that whenever the sixth-pulse magnet, such as 2241, is operated alone and not in conjunction with any of the set-up magnets, the carriage is automatically released and set for printing the next transaction. Shortly after relay 2265 energizes, the slow-to-release relay 2264 will deenergize and remove ground potential from the set-up magnets and the sixth-pulse magnet to permit the carriage to be automatically stepped from its thirteenth to its fourteenth position, after which it is automatically relased in the manner set forth.

When ground is connected to the step conductor responsive to the operation of relay 2267, stepping relay 806 and relays 801 and 803 are energized and cause the transmitter to operate the same as a cash sale in the same manner as previously described.

In case the credit operator finds it necessary to reject the transaction after consulting her records, the credit operator will first operate the call-back key CB. Responsive to the operation of the call-back key CB, relay 2266 energizes over the following circuit: from grounded start conductor 1595, armature 2285, armature 2280, armature 2274 and its resting contact, armature 2275, call-back springs 2260, and through the normally-closed springs controlled by armature 2273 and the winding of call-back relay 2266 to negative battery. At armature 2273, relay 2266 completes a locking circuit for itself, and at armature 2274 and its working contact prepares a circuit for the hold and reject keys, and at its resting contact disconnects the grounded start conductor from conductor 1596 to open the original energizing circuit of relay 810 in the transmitter. When ground is removed from conductors 1596 and 866, the short circuit from around relay 811 is removed, and, therefore, relay 811 energizes in series with relay 810 by way of armatures 848 and 823 to grounded conductor 722. At armature 849, relay 811 operates the buzzer 824 and lights the lamp 25, and at armatures 850 and 851 prepares the talking circuit between the monophones at the transmitter and the credit operator's position. At armature 852, relay 811 prepares the circuit for operating the release magnet 91 in the transmitter. The credit operator will now remove the monophones from the cradle, thereby closing the cradle springs 2294, and the cashier at the transmitter will also remove her monophone, thereby at cradle springs 731 opening the circuit to the buzzer 824 and lamp 25, and at cradle springs 730 prepares a further point in the circuit to the release magnet 91. The credit operator will now tell the cashier that she is unable to approve the customer's credit for this article and will then operate the reject key REJ and replace her monophone. Responsive to the operation of the reject key 2263, a circuit may be traced from grounded start conductor 1595 by way of armatures 2285, 2280, 2274 and its working contact, reject springs 2263, through the normally closed springs controlled by armature 2286, and through the winding of reject relay 2269 to battery. At armature 2286, reject relay 2269 completes a locking circuit for itself from grounded start conductor 1595 before its original energizing circuit is open at armature 2285. At armatures 2288 and 2289, reject relay 2269 completes a circuit from grounded armature 2271 for operating the #4 and #5 set-up magnets in the printer to cause the digit 2 to be printed on the tape. The digit 2 indicates that this particular transaction has been rejected by the credit operator. At armature 2287, reject relay 2269 completes a circuit for energizing relay 2265, which in turn completes the circuit for operating the sixth-pulse magnet 2241 as well as opening the original energizing circuit of relay 2265. Armature 2287 also grounds the step conductor, thereby completing a circuit for energizing the release magnet 91 in the same manner as previously described. The transmitter now releases and opens responsive to the operation of the release magnet 91 in the same manner as previously described.

In case the credit operator should operate the hold key in place of the reject key, the operation would be the same as just described with the exception that relay 2268 is operated to cause the #1 and #5 set-up magnets to print the digit 0 to indicate a hold condition. After printing the hold, O. K., or reject indication on the tape in the printer, the carriage of the printer moves to its fourteenth position to close springs 2238, whereupon the sixth-pulse magnet 2241 energizes alone to release the carriage in the same manner as previously described.

In case a customer desires to have several yards of goods charged to her account, the credit operator will have no indication as to the nature of the transaction because none is needed, but after the credit operator has O. K.'d this particular charge sale the call will go through the same as a credit sale and the yard-goods punching will be made on the card in the central records room in the same manner as described in a cash sale.

As previously described, it can be readily seen how two or more transmitters on the same line are prevented from simultaneously sending cash or credit transactions at the same time on account of the hold and start conductors which extend to the cash and credit switch trains. However, the circuits of these transmitters on the same transmitter line are so arranged that one transmitter may be transmitting a cash transaction while a second transmitter on the same transmitter line may be transmitting a transaction to the credit operator's position. This is readily apparent because the cash switching relay 812 on the first transmitter does not in any way control the circuits extending to the credit line relays, and, therefore, the second transmitter on the line may transmit a credit transaction to the credit operator simultaneously with the transmission of a cash transaction from the first transmitter. In addition, it should be noted that in case the second transmitter should finish the credit transaction and the credit operator should operate the OK key before the first transmitter has finished transmitting the cash transaction, the circuit of the cash switching relay, such as relay 812 in the second transmitter, cannot at this time energize because the energizing circuit for the credit switching relay in the second transmitter is opened at armature 859 by the cash switching relay 812 in the first transmitter. Since the cash switching relay, such as 812' in the second transmitter, cannot at this time energize, the transaction is held until the first transmitter on the line has completed its transaction and released the cash switch train. From the foregoing, it, therefore, may be seen that two different types of transactions, for instance, a cash transaction and a credit transaction, may be simultaneously transmitted from the same transmitter line from two different transmitters, and that a second cash transaction or an approved credit transaction must wait until the first transmitter transmitting a cash transaction has completed this transmission and released.

Returning now to the finder shown in Fig. 9, it may happen, due to some fault, that the test relay 908 may fail to energize. In this case, the finder-rotary magnet 912 will continue to rotate the wipers until they are moved into their eleventh rotary position, at which time cam springs 945 close. Responsive to the closure of springs 945, a circuit is closed through the upper winding of relay 906 for energizing this relay. At armature 956, relay 906 opens the circuit of transfer relay 905, with the result that the transfer relay 905 deenergizes and opens the circuit of start relay 904, and also transfers the start circuit to the next idle finder in the chain by way of armatures 954 and its resting contact. Since at this time the cut-off relay 901 is not energized and line relay 902 and level marking relay 903 are energized, armature 955 on relay 905 closes a circuit from grounded armature 924, start conductor 926, and through the lower winding of relay 906 to battery. Relay 906 is, therefore, maintained energized until ground is removed from start conductor 926 so as to prevent the energization of transfer relay 905 from operating and stealing a call from an operated finder in the chain. It will, therefore, be seen that relay 906 is maintained energized as long as the start conductor 926 has a ground connected thereto by any level marking relay, such as 903, and, therefore, the release of a finder does not change the starting circuit until all of the ground connections have been removed from start conductor 926. After an interval for which it is adjusted, slow-to-release relay 904 deenergizes and at armature 953 completes a circuit for energizing the release magnet 913 to release the finder to its normal position. When ground is removed from start conductor 926, the circuit to the lower winding of relay 906 is opened and said relay deenergizes to reestablish the circuit for energizing transfer relay 905. The energization of relay 905 prepares the start circuit for relay 904 so that the finder shown in Fig. 9 may be used on a subsequent call.

As previously mentioned, the dash-pot relay 914 is provided for operating an alarm signal to indicate trouble, and said dash-pot relay is fully operated only in case of trouble. For some reason or other, relay 906 may fail to operate, and, under such conditions, the dash-pot relay 914 will energize over the release-trunk conductor 928 after a predetermined time. When dash-pot relay 914 is fully energized, it will operate an alarm signal (not shown) and close springs 927 to operate relay 906 as follows: from grounded springs 927, through the upper winding of start relay 904, working contact of armature 952 and said armature, and through the upper winding of relay 906 to battery. Start relay 904 is maintained energized over the above-traced circuit, and, therefore, no circuit is closed for the release magnet 913, with the result that the finder fails to release. The attendant, upon hearing the alarm signal, will investigate and clear the fault so that the finder may be used on subsequent calls.

From the foregoing, it will be seen that in case the release-trunk conductor 928 is grounded for a predetermined time, the dash-pot relay 914 will energize and transmit an alarm. In case the printer shown in Fig. 11 fails to return to normal within a predetermined time, the springs 1122 will cause the operation of the dash-pot relay 914. In addition, in case the Powers punch shown in Fig. 11 also fails to return to its twenty-first position within a predetermined time, springs 1134 maintain ground on release-trunk conductor 928 for operating the dashpot relay 914. In case the card-feed mechanism of the Powers punch fails to insert a card, such as 1161, between the insulated rollers 1160, the release-trunk conductor 928 will be grounded to cause the energization of the dash-pot relay 914. The failure of the proper operation of the adding machine and the Powers punch will prevent the operation of the check-back relay, such as relay 1002. The failure of the printer to close springs 1121 prevents the operation of check-back relay 1001. When either check-back relay fails to operate, the transmission stops and a delay long enough to allow the operation of dash-pot relay 914 is provided.

Since the finder shown in Fig. 12 is similar to the finder shown in Fig. 9, the operation of the dash-pot relay 1214 in Fig. 12 is controlled and operated in the same manner as described for the dash-pot relay 914 in Fig. 9; and, therefore, if the printer in Fig. 16 or the printer in Fig. 22 fails to restore within a predetermined time due to some fault or undue delay by the credit operator, the release-trunk conductor 1228 will be maintained at ground potential to cause the operation of the dash-pot relay 1214 to transmit an alarm.

As previously mentioned, the transfer key TK shown in Fig. 15 is for transferring calls between two credit operators' positions such as 10 and 25. In case the key TK is operated in an upward direction, the calls coming in intended for the #10 operator's position will be routed to the #25 position; and in case the key TK is operated in a downward direction, the calls normally extending to the #25 position will be routed to the #10 credit operator's position. Assuming now that the credit operator at position #25 wishes to leave her position, she will operate the key TK in a downward direction to transfer the calls over to the #10 position. Responsive to the operation of springs 1575, a circuit may be traced by way of armature 1528, armature 1544, and through the lower winding of transfer relays 1509 and 1510 to negative battery. Relays 1509 and 1510 energize over the above-traced circuit, and at armature 1545 completes a locking circuit through the upper windings in series to the release-trunk conductor 1228. At armatures 1561 to 1568, inclusive, and their working contacts, the control conductors are switched over to the #10 position as will be readily seen. It can readily be seen that this transfer cannot take place as long as relay 1508 is energized since the latter relay at armature 1544 would open the transfer circuit of relays 1509 and 1510. From the foregoing, it will, therefore, be seen that the operator can only transfer at a time when relay 1508 is in deenergized position, thereby necessitating the credit operator's taking care of a call at her position before transferring. Since the transfer circuits for transferring calls originally intended for position #10 to position #25 are somewhat similar, it is believed unnecessary to describe these in detail. The operation of springs 1574 switches the lamp conductor 1494' from lamp 1578 to lamp 1576. The operation of springs 1573 switches the lamp conductor 1494 from lamp 1579 to lamp 1577. All calls now coming in having customers' numbers beginning with digits 2 and 5 are routed to the #10 position along with the customers' numbers beginning with digits 1 and 0. The credit operator is informed by the lighting of a lamp associated with her position when a call has reached her position and each operator knows she should not leave her position after throwing the transfer key TK until all her lamps are dark thereat.

Returning now to the adding machine and assuming that the operator in the recording room desires to take a total of all the sales prices registered in the adding machine, the total can be obtained by operation of either the price-total key 1124 or the price sub-total key 1125, the price-total key 1124 (Fig. 11) being operated when it is desired to take a total and to restore the registers of Fig. 19 to their zero positions, thereby erasing the registrations therein, and the price-sub-total key 1125 being operated when it is desired to take a total of the sales prices transmitted without erasing the registrations in the sales price registers. When it is desired to take a total of the serial numbers transmitted, the serial-total key 1123 is operated, whereupon the registers of Fig. 18 will be restored to their zero positions and the registrations therein erased.

By "taking the total" is meant the printing of the total, registered in one of the sets of registers, by the Electromatic or Teletype printer.

It will first be assumed that the operator desires to take the total of the serial numbers. Operation of the serial-total key 1123 connects positive battery to conductor 1113 (Figs. 11, 10, and 20). If positive battery is connected to conductor 928, then relay 2055 is in energized position and the circuits extending over armatures 2056, 2057, 2058, and conductors 1113, 1114, and 1115 to the total taking keys are open, with the result that totals cannot be taken as long as the release trunk conductor 928 is grounded from either the printer, the punch, or the finder. Therefore, operation of any of the total-taking keys will be ineffective unless there is no ground connection at this particular time on conductor 928.

Assuming that, when the serial-total key 1123 is operated, ground is not connected to conductor 928, relay 2055 will not be operated and positive battery connected through the contacts of the serial-total key 1123 to conductor 1113 causes the operation of relay 2048. Upon operating, relay 2048 at armature 2050 connects positive battery to conductor 2082; at its armature 2051 completes the circuit of relay 2031 by extending the positive battery connected to conductor 2082 through resting contact and armature 2030, armature 2027 and its resting contact, armature 2051 and its make contact, and winding of relay 2031 to negative battery; at armature 2052 and its make contact completes a locking circuit for itself to positive battery by way of armature 2004 and its resting contact; at armature 2053 connects positive battery to release trunk conductor 928; and at armatures 2049 and 2054 prepares circuits to be described later. The connection of positive battery to conductor 928 causes the energization of relay 906 in Fig. 9 to busy this particular finder by rendering the same non-selectable by the deenergization of relay 905.

Connection of positive battery to conductor 928 also operates relay 2055 to disconnect the total keys of Fig. 11 from the equipment of Fig. 20, while the connection of positive battery to conductor 2082 completes the circuit for energizing relay 2079, which upon operation disconnects the printer magnets from the punch magnets and the conductors of cable 1081. The printer magnets, by the operation of relay 2079, are now connected by way of the conductors in cables 1110 and 1711 to the B level of bank contacts of the register switches in Figs. 18 and 19. Relay 2079 at armature 2074 opens the circuit of relay 1900; at armature 2075 opens the circuit of magnet 1846; at armature 2077 separates conductors 1856 and 1902; and at armature 2076 completes a circuit over conductor 1860 through the lower winding of relay 1830 to battery. Relay 1830 energizes, and at armature 1836 separates conductors 1740 and 1858.

Completion of the circuit of relay 2031 as described results in the operation of this relay and the completion of the circuit of relay 2029 at armature 2032. Relay 2029 thereupon operates, and at its armature 2030 opens the circuit of relay 2031, which thereupon deenergizes and opens the circuit of relay 2029. Relay 2029 thereupon deenergizes, again completing the circuit of relay 2031 which operates and in turn operates relay 2029. From this interaction of relays 2031 and 2029, it can be seen that positive battery connected to conductor 2082 at armature 2050 is momentarily and repeatedly connected to conductor 2083, and consequently at the same time to conductor 1111.

The momentary connections of positive battery to conductors 2083 and 1111 constitute the transmission of impulses over these conductors, the impulses being transmitted over conductor 2083 to motor magnet 2076 of the register-selecting switch 2070, and over conductor 1111 to space magnet 1171 of the Electromatic printer. Therefore, in the well known manner, the register-selecting switch 2070 takes one step for each impulse received, and the carriage of the Electromatic printer also takes one step for each impulse received, the switch and the printer carriage stepping in synchronism.

Inasmuch as wiper 2073 of switch 2070 is connected to conductor 2082, which has positive battery connected thereto as long as relay 2048 remains operated, wiper 2073 connects positive battery to each of its contacts as the wipers of switch 2070 are stepped from position to position. Therefore, when wiper 2073 engages its tenth contact, positive battery is extended by way of the tenth contact, conductor 2086, armature 2022 and resting contact of relay 2021, and through the winding of relay 2018 to negative battery. Relay 2018 thereupon operates, and, at its armature 2019, prepares a locking circuit for itself to positive battery on conductor 2082, which locking circuit includes the winding of relay 2021. Relay 2021 cannot energize at this time, however, since with positive battery on conductor 2086 the winding of relay 2021 has positive battery connected to both of its terminals.

Inasmuch as wiper 2073 is a bridging wiper, it will bridge contacts 10 and 11 as the wiper is moved from contact 10 to contact 11, thereby maintaining closed the energizing circuit of relay 2018 and prevent operation of relay 2021 by way of armature 2020 until wiper 2073 has moved completely out of position.

The wiper 2073 starts in its second revolution, and when wiper 2073 moves into engagements with its first contact, positive battery is removed from conductor 2086, and relay 2021 then operates in series with relay 2018. Relay 2021 at its armature 2022 extends conductor 2086 to conductor 2088, and, at its armature 2023, extends conductor 2087 to conductor 2089 by way of armature 2054 and its make contact. Switch 2070 continues to step, and, when wiper 2073 is moved into its seventh position on its second revolution, positive battery is extended by way of conductor 2087, make contact and armature 2023, armature 2054, conductor 2089, armature 2028, and through the winding of relay 2024 to negative battery. Relay 2024 thereupon operates, and at its armature 2025 prepares a locking circuit for itself which includes the winding of relay 2026. However, relay 2026 cannot operate at this time because of the connection of positive battery to both terminals of its windings.

When wiper 2073 steps out of seventh position into engagement with its eighth bank contact, positive battery is removed from conductor 2087 thereby allowing relay 2026 to operate in series with relay 2024. Upon operating, relay 2026 at its armature 2028 opens the original energizing circuit of relay 2024, and at its armature 2027 opens the circuits of relay 2031 and space magnet 1171. At armature 2027 and its working contact, relay 2026 extends the positive battery on conductor 2082, upon the restoration of relay 2029, by way of conductor 2090, and armature 2049 to wiper 2072. Since relay 2026 remains operated in series with relay 2024, the interrupter action of relays 2031 and 2029 is stopped and consequently the stepping of the switch 2070 and the printer carriage is also stopped.

At this time, the wipers of switch 2070 are standing in engagement with their eighth bank contacts. By this it can be readily determined that nineteen impulses have been transmitted over conductor 1111 to the space magnet 1171 of the Electromatic printer. Therefore, the carriage of the Electromatic printer has been stepped from its normal position, or first printing position, to its twentieth position, in which position the first digit of the serial total will be printed. Closure of the contacts 1170 of the printer will have no effect at this time since the springs 1169 of the punch are not closed.

The positive battery connected to wiper 2072, which wiper is in engagement at this time with the eighth contact of its bank, is extended over conductor #1 of cable 2061, Figs. 20, 19, and 18, to wiper B1 of register 1801. Since the total of the serial numbers registered is 87,600, as previously described, wiper B1 is standing in engagement with its eighth position contact, and the positive battery is extended over conductor #8 of cable 1711 (Figs. 18, 19, and 20), to contact 2088 of relay 2079 to #8 conductor in cable 1110, and to printer magnet #8, whereupon this print magnet operates, causing the numeral "8" to be printed by the Electromatic printer and causing positive battery to be connected to conductor 1082 through the contacts 1121 responsive to the operation of the #8 print magnet. This connection of positive battery to conductor 1082 results in the operation of relay 2029, Fig. 20.

Returning now to the point in the description where the relay 2026 first operated, it will be seen that when relay 2029 deenergizes, following the operation of relay 2026, the positive battery on conductor 2082 is reconnected to conductor 2083, thereby causing the energization of motor magnet 2076 of register-selecting switch 2070. Inasmuch as relay 2029 now remains inert, the motor magnet 2076 remains energized and ready to advance the wipers of switch 2070.

Therefore, when relay 2029 operates, following the operation of the print magnet as just described, it interrupts the circuit of the motor magnet 2076 at its armature 2030, thereby causing the motor magnet 2076 to deenergize and advance the wipers 2071—2073 into engagement with their ninth bank contacts. Wiper 2072 in moving from its eighth to its ninth contact removes the positive battery from conductor #1 of cable 2061, and consequently from conductor #8 of cables 1711 and 1110, thereby causing the print magnet #8 to deenergize and remove positive battery from conductor 1082, thereby causing relay 2029 to deenergize and again complete the circuit of motor magnet 2076.

In this position of wiper 2072, positive battery is extended over conductor #2 of cable 2061 to wiper B2 of register 1802, which is standing in engagement with its seventh bank contact, and over conductor #7 of cables 1711 and 1110 to print magnet #7, thereby causing the operation of this print magnet to print the numeral "7" and to again complete the circuit of relay 2029, which, upon operating, causes the motor magnet 2076 to advance the wipers of switch 2070 into engagement with their tenth bank contacts, whereupon the circuit of the #7 print magnet is opened. This magnet in turn opens the circuit of relay 2029 which again restores and completes the circuit of the motor magnet 2076. Positive battery is now extended over wiper 2072 to the #3 conductor of cable 2061, and over this #3 conductor to wiper B3 of register 1803. Since wiper B3 is standing in engagement with its sixth position contact, the positive battery is extended over conductor #6 of cables 1711 and 1110 to the #6 print magnet, which magnet thereupon operates to cause the printing of the numeral "6" and the connection of positive battery to conductor 1082, to again cause relay 2029 to function to advance the wipers of switch 2070 into engagement with its eleventh contacts. In this position of the wipers, the positive battery is extended over wiper 2072, conductor #4 of cable 2061, to wiper B4 of register 1804.

Since wiper B4 is standing in engagement with its zero contact, the positive battery extends over conductor #0 of cables 1711 and 1110 to the #0 print magnet, whereupon the numeral "0" is printed by the Electromatic printer and the relay 2029 is operated to cause the advancement of wiper 2072 to its first position.

In the first position of wiper 2072, positive battery is extended over conductor #5 of cable 2061 to wiper B5 of register 1805, and thence over conductor #0 of cables 1711 and 1110, since wiper B5 is in engagement with its zero contact, to the #0 print magnet, whereupon the numeral "0" is printed by the Electromatic printer and the relay 2029 is once again operated to advance wiper 2072 to its second position.

In the second position of wiper 2072, positive battery is extended over the conductor connected to the second position contact and through the winding of relay 2001, to negative battery, whereupon relay 2001 operates and at its armature 2002 completes a locking circuit for itself to positive battery on conductor 928. At its five uppermost armatures, relay 2001 connects the winding of relay 2016 in parallel to conductors #1 to #5, inclusive, of cable 2062, thereby placing positive battery through the winding of relay 2016 on these five conductors. At armature 2003, relay 2001 extends the positive battery through the winding of relay 2016 to the motor magnet 2076 by way of off-normal springs 2078 of switch 2070 and the interrupter contacts 2077 of motor magnet 2076. Therefore, motor magnet 2076 functions in the well known manner to restore the switch wipers to their normal position, in which position the off-normal springs 2078 opens the circuit of the motor magnet 2076.

Relay 2001 at its armature 2004 opens the locking circuit of relay 2048, causing this relay to de-energize and retract its armature, and thereby remove positive battery from conductors 2082, 2083, and 2090. Relay 2079 thereupon deenergizes and restores the circuits controlled thereby to the normal condition.

Relay 2001, upon operating, at its armature 2005, connects positive battery to conductor 1112 (Figs. 20, 10, and 11), and through the winding of carriage-return magnet 1172 to negative battery. Carriage-return magnet 1172 thereupon operates to cause the return of the printer to its normal position.

Relay 2048 is a slow-to-release relay and consequently delays the action described in connection with the deenergization thereof for an interval to allow the serial number registers to be restored to normal position.

Inasmuch as the registers 1801, 1802, and 1803 are not in their zero or normal positions, the off-normal springs 1861, 1862, and 1863 of those registers, respectively, are closed. Therefore, the connection of positive battery to conductors #1 to #5, inclusive, of cable 2062 is extended over this cable to the motor magnets 1841 to 1843, inclusive, of registers 1801 to 1803, inclusive, respectively. By means of their interrupter springs, these motor magnets operate to restore the wipers of the respective registers to their normal or zero positions. As the wipers of each register reach their normal positions, the off-normal springs of that register are opened and the motor magnet of that register, therefore, ceases to function; consequently the wipers remain in the normal or zero position.

Relay 2016 operates over the conductors 1 to 3, inclusive, of cable 2062 in series with the motor magnets, and, being a slow-to-release relay, remains energized until the last of the off-normal springs of the registers have been opened. Relay 2016, at armature 2017, connects positive battery to release trunk conductor 928 to maintain relay 2001 locked and relay 2055 energized, following the restoration of relay 2048, until all of the registers have been restored.

Upon the restoration of all of the registers 1801 to 1805, inclusive, to their zero positions, and the register-selecting switch 2070 to its normal position, relay 2016 de-energizes and opens the locking circuit of relay 2001 and the circuit of relay 2055, whereupon these relays restore and in so doing return the equipment of Fig. 20 to the position in which it is shown in the drawings.

It will be appreciated that, following the operation of the serial-total key, the register-selecting switch 2070 and the carriage of the printer are synchronously stepped until the printer carriage has been moved to the proper total printing position; that, during the positioning movement of the printer carriage, the necessary circuits are prepared by the action of the register-selecting switch 2070 to cause the serial-number total registered in the serial number registers to be printed digit by digit in the Electromatic printer under the control of that printer; and that, when the complete serial total has been printed, the printer carriage is restored to normal as are also the serial number registers and the register-selecting switch.

When it is desired to take a total of the sales prices and, at the same time, wipe out the total registered upon the sales price registers of Fig. 19 in order that an entirely new total of other sales prices may be obtained, the operator at the central recording room depresses the price-total key 1124 (Fig. 11), whereupon positive battery is connected to conductor 1114 (Figs. 11, 10, and 20), and then, by way of armature 2057 and resting contact of relay 2055, through the winding of relay 2041, to negative battery. Relay 2041 then operates, at its armature 2045 and make contact, locking itself to positive battery by way of armature 2009 and its resting contact. Relay 2041, at its armature 2043, connects positive battery to conductor 2082 to start the interrupter actions of relays 2031 and 2029 to transmit the impulses over conductor 2083 to motor magnet 2076 of register-selecting switch 2070, and, simultaneously therewith, over conductor 1111 to the space magnet 1171 of the Electromatic printer. Relay 2041, at its armature 2042 and make contact, prepares a circuit for connecting positive battery to wiper 2071, at its armature 2046 and make contact connects positive battery to release trunk conductor 928 to operate relay 2055, and at armature 2047 prepares the energizing circuit of relay 2024.

The motor magnet 2076 responds to the impulses transmitted thereto over conductor 2083 to rotate the wipers of the register-selecting switch 2070 in a step-by-step manner over its bank contacts. The space magnet 1171 (Fig. 11) responds to the impulses transmitted thereto over conductor 1111 to step the printer carriage from its normal position in synchronism with the stepping of the wipers of the switch 2070.

As wiper 2073 passes over its tenth and eleventh position contacts in the first revolution of this wiper, relays 2018 and 2021 operate as previously described. This time, however, when wiper 2073 is started on its second revolution and reaches its seventh position, no circuit is completed for relay 2024 since relay 2048 is not operated. Therefore, the wipers of switch 2070 continue to step and wiper 2073 again engages its tenth position contact. When this occurs, positive battery on wiper 2073 is extended over conductor 2086, armature 2022 and its make contact, conductor 2088, armature 2047 and its make contact, conductor 2089, armature 2028 and its resting contact, and through the winding of relay 2024 to negative battery. Relay 2024 thereupon operates, and, at its armature 2025, prepares the locking circuit for itself which includes the winding of relay 2026. Relay 2026 is unable to operate at this time since positive battery is connected to both terminals of its winding. Inasmuch as relay 2026 is short circuited by the bridging action of wiper 2073 until wiper 2073 leaves its eleventh position contact, relay 2026 does not operate until the wipers of register-selecting switch 2070 have been moved into their first positions. When this occurs, relay 2026 will operate, opening the energizing circuit of relay 2031 and connecting conductor 2083 to conductor 2090, whereupon the restoration of relay 2029 connects positive battery on conductor 2082 to wiper 2071 and to the motor magnet 2076.

When the transmission of impulses, by the action of relays 2031 and 2029, is stopped responsive to the energization of relay 2026, twenty-three impulses will have been transmitted to the motor magnet 2076 and to the space magnet 1171, resulting in the positioning of the wipers of switch 2070 in engagement with the first position contacts and the positioning of the printer carriage in its twenty-fourth position. This movement of the printer carriage to the twenty-fourth position for the printing of the first digit of the sales-price total enables the sales total to be printed underneath the individual prices recorded by the printer.

With wiper 2071 in its first position, positive battery is connected to conductor #12 of cable 2061 and extends thereover to wiper B12 of register 1912 (Fig. 19). Since the total registered on the price registers is assumed to be 0109238, wiper B12 of register 1912 is standing in zero position at this time since not sufficient additions have taken place to cause the wipers of register 1912 to be advanced from their normal to their first position to register a carry-over unit therein. Therefore, the positive battery on wiper B12 extends over the #0 conductor of cables 1711 and 1110 to the #0 printing magnet of the Electromatic printer, whereupon the digit "0" is printed in the twenty-fourth position of the carriage and the circuit of relay 2029 is completed over conductor 1082 from the make contacts of springs 1121 of the printer. The wipers of the register-selecting switch 2070 are thereupon advanced in synchronism with the printer carriage, as previously described.

In turn now, positive battery is extended over conductors #11, #6, #7, #8, #9, and #10 of cable 2061 and in turn through wipers B11, B6, B7, B8, B9, and B10 of registers 1911, 1906, 1907, 1908, 1909, and 1910, respectively and in turn over conductors #1, #0, #9, #2, #3, #8 of cables 1711 and 1110, and in turn to printer magnets #1, #0, #9, #2, #3, and #8, whereupon these magnets are operated in turn to print in the twenty-fifth to the thirtieth positions, inclusive, the numerals 1, 0, 9, 2, 3, and 8, which indicate the sales-price total of $1,092.38, registered in the sales-price register.

As previously described, the register-selecting switch 2070 is advanced under control of the printer magnets as each of these magnets operates to print the corresponding numeral of the sales-price total. After the last digit of the sales price has been printed, the printer carriage is advanced to its thirty-first position and the wipers of register-selector 2070 are advanced into engagement with the eighth bank contacts of their respective banks, whereupon the positive battery on wiper 2071 is extended by way of conductor 2085, armature 2034 and its resting contact, to the winding of relay 2006 and negative battery. Relay 2006 thereupon operates and at its armature 2007 locks itself to positive battery on conductor 928 supplied through armature 2046 and its make contact. At the seven upper armatures of relay 2006, positive battery through the winding of relay 2016 is extended over conductors #6 to #12, inclusive, of cable 2062 to restore the registers 1906 to 1912, inclusive, to normal. The connection of the positive battery to conductor #12 of cable 2062 has no effect at this time since register 1912 is in its normal position and the off-normal springs 1962 are open. At armature 2008 and make contact of relay 2006, the positive battery through the winding of relay 2016 is extended to motor magnet 2076 over off-normal springs 2078 and interrupter contacts 2077. Motor magnet 2076 thereupon interrupts its own circuit until the wipers 2071–2073, inclusive, have been restored to their normal position, whereupon the off-normal springs 2078 open and the wipers come to rest.

Relay 2016 operates in series with the motor magnets of the price registers and of the register-selecting switch 2070 and remains so operated until the last of the registers has restored to normal. During the time in which relay 2016 is operated, its armature 2017 maintains positive battery on conductor 928 to maintain relays 2006 and 2055 operated and to maintain busy this particular finder-printer-adding machine and punch link.

Relay 2006, upon first operating, opens the locking circuit of relay 2041, which restores, and places the deenergization of relay 2055 under control of relay 2016 by removing positive battery at armature 2046 from conductor 928.

When relay 2016 finally restores, relay 2006 restores, as does also relay 2055, whereupon the total-taking keys are reconnected to the equipment of Fig. 20, and all the equipment of Fig. 20 is restored to its normal condition.

Following the printing of the last digit of the sales-price total, the carriage-return magnet 1172 is operated over conductor 1112 by the operation of relay 2006 or by way of springs 1120 operated by the printer carriage, and the printer carriage is thereby restored to normal in the well known manner.

The operation of the total-taking equipment, responsive to the operation of the price sub-total key 1125, is identical with that just described in connection with the operation, when the price-total key 1124 is operated, up to the point where the wiper 2071 is stepped from its seventh position contact to its eighth position contact following the operation of the Electromatic printer to print the last digit of the sales-price total. Inasmuch as relay 2033 is operated when the price sub-total is being taken, instead of the relay 2041, the positive battery extended by way of wiper 2071 and the eighth bank contact to conductor 2085 is now extended by way of armature 2034 and its make contact to the winding of relay 2011 rather than to the winding of relay 2006 by way of resting contact of armature 2034. Therefore, since relay 2011 is provided with no contacts by means of which positive battery is connected to any of the conductors of cable 2062, the sales-price registers 1906 to 1912, inclusive, will not be restored to their normal or zero positions following the printing of the sales-price total registered therein by the Electromatic printer as is done in the case of the taking of the price-total by the operation of the price-total key 1124.

Relay 2011 performs all of the other functions performed by relay 2006, and, upon restoring following the return of register-selecting switch 2070 to its normal position, is restored by the deenergization of relay 2016 along with relay 2055, whereupon the equipment can again be controlled in any manner as desired by the operator.

As previously mentioned, the modification shown in Fig. 21 may be substituted for Fig. 11, and, therefore, when the various totals are taken from the registers of the adding machine in response to the operation of the total-taking keys, such as 2123, 2124 and 2125 the relays 2101 to 2110, inclusive, are operated over the conductors in cable 1110 instead of the print magnets of Fig. 11. Assuming now that the Teletype printer is to be used to take the serial number total registered on the adding machine, the key 2123 is momentarily depressed to energize relay 2048 over conductor 1113 in case relay 2055 is not at the time energized due to ground on conductor 928. Relay 2048 at armature 2050 connects positive battery to conductor 2082 to start the transmission of impulses over conductor 2083 to motor magnet 2076 and simultaneously therewith over conductor 1111 to space relay 2111. The motor magnet 2076 operates the register-selecting switch 2070 in the same manner as previously described.

Relay 2111 energizes responsive to each ground impulse connected to conductor 1111 to cause the carriage of the Teletype printer to step one space without printing a character. At armature 2174 relay 2111 connects ground through the winding of relay 2100, which energizes and at armature 2112 completes a circuit for energizing the sixth-pulse magnet 2155. At armature 2113 relay 2100 also closes a circuit from ground by way of armature 2175 for operating set-up magnet #3. Since the carriage of the Teletype printer is arranged to step its carriage whenever the #3 magnet alone is energized with the sixth-pulse magnet 2155, as will be seen by the code shown in the upper extreme right of Fig. 21, it will, therefore, be seen that the carriage of the printer is operated step-by-step in response to the ground impulses on conductor 1111 to step the carriage to its twentieth position in readiness to print the first digit of the serial number total. Sixth-pulse magnet 2155 at armature 2156 connects ground to conductor 1082 to energize relay 2029 for the same purposes as previously described.

Relays 2018, 2021, 2024, and 2026 have energized in the same manner as previously described responsive to the operation of the register-selecting switch 2070, and, therefore, the first digit of the serial total stored in register 1801 grounds the #8 conductor in cable 1110 to energize relay 2108. Relay 2108, upon energizing, at armature 2166 completes a circuit for energizing relay 2100, and at armatures 2167 and 2168 completes circuits for the #2 and #4 set-up magnets in the Teletype printer when relay 2100 operates its armature 2113. At armature 2112, relay 2100 again energizes the sixth-pulse magnet 2155 to cause the digit 8 to be printed on the tape and to cause the carriage of the printer to step to its next position. In a manner similar to that previously described, relays 2107, 2106, 2110, and 2110 are energized in the order named to cause the set-up magnets and sixth-pulse magnet 2155 to print the remainder of the serial total. Since the circuits for accomplishing the above are obvious from the drawings and the foregoing description and the "code" shown, it is believed unnecessary to further describe these circuits in detail.

When the serial total 87600 is printed on the tape, relay 2001 is energized in the same manner as previously described to ground conductor 1112 to energize sixth-pulse magnet 2155. Since the sixth-pulse magnet 2155 is energized alone and no set-up magnet is energized, the carriage of the Teletype printer is restored to its normal position in the well-known manner.

The relays 2100 to 2111, inclusive, and printer operate in a similar manner as just described when a price total or sub-total is taken, and, therefore, this detail description can be dispensed with other than to state that in taking a price total or sub-total the carriage of the printer is spaced to its twenty-fourth position before printing the first digit of the price total.

Having described the invention, what is considered new and is desired to have protected by Letters Patent will be set forth in the following claims.

What is claimed is:

1. In an electrically-operated accounting system for department stores wherein articles of merchandise are charged to customers at the time of sale, means for electrically transmitting indications from a sales floor identifying a customer and the sales price of an article of merchandise during a sales transaction, a recorder located in the credit department of the store operated responsive to said transmission for recording the number of the customer and the sales price of the article, and electrical means controlled from the credit department for approving or rejecting such sales transaction at the sales floor.

2. In an electrically-controlled credit, authorization system for department stores wherein articles of merchandise are selected by customers and charged to their accounts at the time of sale, means for electrically transmitting indications from the sales floors of the store during sales transactions identifying the customers by number and the sales prices of the articles of merchandise selected by the customers for purchase on credit, a recorder located in the credit authorization room of the department store operated responsive to said transmissions for recording the customer's numbers and the sales prices of the articles selected, and means controlled from the credit room for operating said recorder during such sales transactions to make a record of the approval or rejection of each sales transaction.

3. In an accounting system wherein articles of merchandise are selected by customers and charged to their accounts at the time of sale, a sales position and a credit position, means for transmitting sales indications from the sales position to the credit position during a sales transaction identifying the customer and the sales price of the article selected by the customer for purchase on credit, means controlled from said credit position for signalling said sales position of the credit clerk's intention to reject such sales transaction, and means operated responsive thereto for preventing the approval of this transmitted sales transaction.

4. In an electrically-operated accounting system, means for electrically transmitting indications from a sales floor identifying a customer by number and the sales price of an article of merchandise selected by a customer for purchase during a charge sales transaction, a recorder at a credit clerk's position operated responsive to said transmission for recording the customer's number and the sales price of the article selected, means controlled by the credit clerk at said position for approving or rejecting such sales transaction and for operating said recorder to record the approval or rejection, a recorder at a central records room, and means operative in case the credit clerk approves the said sales transaction for operating the recorder in the records room to make a complete record of the said sales transaction.

5. In an accounting system wherein statistical data relating to charge transactions are recorded, means for transmitting only enough indications to identify a transaction, a recorder for recording said indications in response to said transmission, means for approving or rejecting said transaction and for operating said recorder to record such approval or rejection, another recorder, means operative only in case said transaction is approved for transmitting all the data relating to said transaction to the said other recorder, and means at said other recorder operated responsive to said last transmission for recording all the data relating to said transaction to make a complete statistical record.

6. In an accounting system wherein statistical data relating to charge transactions is recorded, means for transmitting data indications identifying a transaction for approval or rejection, a recorder operated to record the said data indications in response to said transmission, and manually controlled means for approving or rejecting said transaction and for automatically operating said recorder to record such approval or rejection.

7. In an accounting system wherein articles of merchandise are selected by customers and charged to their accounts at the time of sale, sales positions and credit positions, means for transmitting indications from the sales positions to the credit positions during sales transactions identifying the customers and the sales prices of articles selected by customers for purchase on credit, means controlled from the credit positions for approving or rejecting each sales transaction, communicating instrumentalities at each sales and credit position normally ineffective for communicating purposes, and means operative only in case a sales transaction is rejected for automatically rendering the communicating instrumentalities at the sales position transmitting this sales transaction and the credit position rejecting this sales transaction effective for communicating purposes.

8. In an accounting system wherein articles of merchandise are selected by customers and charged to their accounts at the time of sale, sales positions and credit positions, circuits between said sales and credit positions, means for transmitting indications from the sales positions over said circuits to the credit positions during sales transactions identifying the customers and the sales prices of articles selected by customers for purchase on credit, means controlled from said credit positions for approving or rejecting each sales transaction, and means operative in case a sales transaction is rejected for automatically completing a communicating circuit over one of said circuits between the sales position transmitting this sales transaction and the credit position rejecting this sales transaction.

9. In an accounting system wherein articles of merchandise are charged to customers at the time of sale, means for transmitting data identifying the customer, the sales price of the article selected by the customer for purchase on credit, and a take or send indication indicating whether the customer is taking the article or having it sent to the customer's address, and a recorder operated responsive to said transmission to make a record of the data identifying the customer, the sales price of the article, and the take or send identification.

10. In an accounting system wherein data identifying articles of merchandise purchased by customers is automatically transmitted from the various sales floors and recorded at a central records room at the time of sale, means operable during a sales transaction to one of a plurality of positons dependent upon whether the purchaser is taking the article purchased or having it sent to the customer's address, and means for automatically transmitting and recording a take or send indication with each sales transaction in accordance with the operation of said last means for indicating whether the customer is taking the article purchased or having it sent to the customer's address.

11. In an accounting system for department stores wherein articles of merchandise are selected by customers and charged to their accounts at the time of sale, a plurality of credit positions, each credit position normally assigned to handle a certain predetermined number of customers' accounts, a recorder at each credit position, means for transmitting the cutomer's assigned number and the sales price of an article selected by the customer for purchase on credit, and means operated responsive to said transmission for selecting the recorder at a particular one of said credit positions in accordance with a portion of the transmitted customer's number and for operating the selected recorder to record the customer's number and the sales price of the article.

12. In an accounting system wherein articles of merchandise are selected by customers and charged to their accounts at the time of sale, a plurality of credit positions, each credit position normally assigned to handle a certain predetermined number of customer's accounts, a recorder at each credit position, means for transmitting the customer's assigned number and the sales price of an article selected by the customer for purchase on credit, means operated responsive to the transmission of a portion of the digits in the customer's assigned number for selecting the recorder at a particular one of said credit positions, means operated responsive to said selection for repeating the digits in the selecting portion of the customer's number, and means for operating said selected recorder in response to said repeated digits, the remaining transmitted digits in the customer's number and the transmission of said sales price to record the full customer's number and the sales price of the article.

13. In an accounting system wherein each charge account is recorded, a plurality of credit positions, each credit position normally assigned to handle a certain predetermined number of accounts, a recorder at each credit position, means for transmitting indications identifying a certain account and a certain transaction, and means operated responsive to said transmission for selecting the recorder at a particular one of said positions dependent upon the transmitted account identifications and for operating the selected recorder to record the account and transaction identifications.

14. In an accounting system wherein each charge account is recorded, a plurality of credit positions, each credit position normally assigned to handle a certain predetermined number of accounts, a recorder at each credit position, means for transmitting indications identifying a certain account and a certain transaction, means operated responsive to said transmission for selecting the recorder at a particular one of said positions dependent upon the transmitted account identifications and for operating the selected recorder to record the account and transaction identifications, switching means individual to each of said positions, and means operated responsive to the operation of the switching means individual to one of said positions for switching each transmission normally transmitted to said one position to an other of said credit positions to operate the recorder at said other position to record the account and transaction identifications.

15. In an accounting system wherein articles of merchandise are purchased on credit or with cash, a credit switch train for use when articles are purchased on credit, a cash switch train for use when articles are purchased with cash, a transmitter having means for transmitting sales data over either switch train, means for taking said transmitter into use on a credit sale, means responsive thereto for operating said transmitter to select said credit switch train and for transmitting sales data over said credit switch train, means for approving said credit sale, means operative responsive to said approval for reoperating said transmitter to select said cash switch train and to transmit the sales data over said cash switch train.

16. In a merchandising system wherein articles of merchandise are purchased on credit or with cash, a credit switch train for use when articles are purchased on credit, a cash switch train for use when articles are purchased with cash, a transmitter having means for transmitting sales data over either switch train, and means in said transmitter for distinguishing between a credit sale and a cash sale and for automatically selecting the credit switch train in case of a credit sale or for automatically selecting the cash switch train in case of a cash sale.

17. In an accounting system wherein articles of merchandise are purchased on credit or with cash, a credit switch train for use on credit sales, a cash switch train for use on cash sales, a transmitter having means for transmitting sales data over either switch train, a credit recorder, means for closing and locking said transmitter on a credit sale, means responsive to the closure of said transmitter for selecting said credit switch train and for transmitting the sales data over said credit switch train to said credit recorder, means in said credit recorder for making a record of said tansmitted sales data, means for approving or rejecting said credit sale and for operating said recorder to record such appoval or rejection, means operative in case said credit sale is approved for reoperating said transmitter to select said cash switch train, to transmit the sales data over said cash switch train, and to automatically open said transmitter after said last transmission, means operative in case said credit sale is rejected for operating a signal indicating such rejection and for maintaining said transmitter locked in operated position, and means for thereafter opening said transmitter only in response to a manual operation.

18. In an accounting system wherein articles of merchandise are purchased on credit or with cash, a transmitter having means for transmitting sales data on either credit or cash sales, means for closing and locking said transmitter on either a credit or a cash sale, means for approving or rejecting a credit sale, means for automatically unlocking said transmitter after transmission on an approved credit sale and on a cash sale, means for maintaining said transmitter locked in operated position after transmission in case the credit sale is rejected, and means for thereafter unlocking and opening said transmitter only in response to a manual operation.

19. In an accounting system wherein articles of merchandise are purchased on credit or with cash, a transmitter line comprising a credit branch line and a cash branch line, a plurality of transmitters on said transmitter line for transmitting sales data over said branch lines in response to credit and cash sales, means for simultaneously transmitting the sales data of a credit sale over said credit branch line and the sales data of a cash sale over said cash branch line from different transmitters on the same transmitter line, and means for preventing the simultaneous transmission of sales data of more than one credit sale over the credit branch or more than one cash sale over the cash branch from different transmitters on the same transmitter line.

20. In an accounting system wherein articles of merchandise are purchased on credit or with cash, a transmitter line comprising a credit branch line and a cash branch line, a plurality of transmitters on said transmitter line for transmitting sales data over said branch lines in response to credit and cash sales, means for simultaneously transmitting the sales data of a credit sale over said credit branch line and the sales data of a cash sale over said cash branch line from different transmitters on the same transmitter line, means for preventing the simultaneous transmission of sales data of more than one credit sale over the credit branch or more than one cash sale over the cash branch from different transmitters on the same transmitter line, means for approving the credit sale, and means responsive to said approval for transmitting the data of the approved credit sale over said cash branch line only when the cash branch line is idle.

21. In an accounting system wherein articles of merchandise are purchased on credit or with cash, customers' cards used on credit sales when customers purchase articles on credit, cashiers' cards used on cash sales when customers purchase articles with cash, different markings on said cards identifying a customer's card from a cashier's card, a transmitter having an allotted space for holding any one of said cards during a purchase, and card-check means in said transmitter operated in accordance with the different markings in said cards for distinguishing between a credit sale and a cash sale.

22. In an accounting system wherein articles of merchandise are purchased on credit or with cash, customers' cards used on credit sales when customers purchase articles on credit, cashiers' cards used on cash sales when customers purchase articles with cash, different markings on said cards identifying a customer's card from a cashier's card, a transmitter having an allotted space for holding any one of said cards during a purchase, card-check means in said transmitter operated in accordance with the different markings in said cards for distinguishing between a credit sale and a cash sale, a credit recorder for recording credit sales and a cash recorder for recording cash sales, and means controlled by said transmitter for operating said credit recorder in accordance with said markings to record a credit sale and said cash recorder in accordance with said markings to record a cash sale.

23. In an accounting system, a first card individual to an article of merchandise, a plurality of markings in said first card identifying this particular article and its sales price, a second card individual to a second article of merchandise, a lesser number of markings in said second card identifying this particular article, a transmitting device, a key set comprising a plurality of keys associated with said transmitting device, said keys operative to designate the sales price of the second article, a recording machine, means responsive to the insertion of said first card in said device and the closure thereof for automatically operating said machine to make a record of the first article and its sales price in accordance with the markings in said first card, and means responsive to the insertion of said second card in said device, the operation of said keys in accordance with the sales price of the second article, and the closure of said device for automatically operating said machine to make a record of the second article in accordance with the markings in the second card and to make a record of the sales price of such article in accordance with the operation of said keys.

24. In an accounting system, a card individual to an article of merchandise, markings in said card identifying this particular article of merchandise, a transmitting device, a key set comprising a plurality of keys associated with said transmitting device, said keys operative to designate the sales price of articles of merchandise, a recording machine, and means responsive to the insertion of said card in said transmitting device, the operation of said keys in accordance with the sales price of said article, and the closure of said device for automatically operating said machine to make a record of said article in accordance with the markings in said card and to make a record of the sales price of such article in accordance with the operated ones of said keys.

25. In an accounting system, a transmitter for transmitting sales data when locked in operated position, a card having sales data thereon for insertion into said transmitter, a plurality of sales data keys associated with said transmitter, and locking means in said transmitter operated only in response to the proper insertion of said card into said transmitter, the proper operation of the required number of said sales data keys, and the closure of said transmitter to lock said transmitter in operated position.

26. In an accounting system, a transmitter for transmitting sales data when locked in operated position, a card having sales data thereon for insertion into said transmitter, a plurality of sales data keys associated with said transmitter, locking means in said transmitter operated in response to the proper insertion of said card into said transmitter and the closure of said transmitter to lock said transmitter in operated position, and means for preventing the operation of said locking means to lock said transmitter in operated position in case any one of said keys are in operated position at the time of closure of said transmitter.

27. In an accounting system wherein a card is automatically fed to a marking machine and stopped in marking position after which said card is simultaneously marked with a plurality of data markings and then ejected from said machine, card-check means associated with the marking position of said machine, means for automatically selecting said machine, and a circuit controlled by said card-check means for rendering said machine selectable only in case said card is in the marking position of said machine.

28. In an electrically operated authorizing system for merchandising stores wherein articles of merchandise are charged to customers at the time of sale, means for electrically transmitting indications from a sales floor to a credit department identifying a sales transaction, and electrical means controlled from the credit department for approving or rejecting such sales transaction at the sales floor.

29. In an accounting system, an authorizing position and a recording position, a transmitter and means located at a point remote from said positions for electrically transmitting data corresponding to transactions to said authorizing position, and electrically controlled means at said authorizing position manually controlled in accordance with the approval of each transmitted transaction for electrically controlling said transmitter and means to retransmit the data corresponding to each approved transaction to said recording position.

30. In an accounting system, an authorizing position and a recording position, a transmitter and means located at a point remote from said positions for electrically transmitting data corresponding to transactions to said authorizing position, electrically controlled means at said authorizing position manually controlled in accordance with the approval of each transmitted transaction for electrically controlling said transmitter and means to retransmit the data corresponding to each approved transaction to said recording position, and a recorder at said recording position operated in response to said retransmitted data for recording the data of each approved transaction.

31. In an authorizing system, an authorizing position, a transmitter and means located at a point remote from said position for electrically transmitting data corresponding to transactions to said position, and electrically controlled means at said position manually controlled in accordance with the approval or rejection of each transmitted transaction for electrically controlling said transmitter at the remote point to indicate the approval or rejection of each transmitted transaction.

32. In an authorizing system, a transmitter and means for electrically transmitting statistical data corresponding to transactions, a recorder electrically operated in response to said transmitted data for recording the same, electrical means manually controlled for officially sanctioning or refusing each transaction, and means operated in response to the operation of said electrical means for automatically operating said recorder to record the sanctioning or refusal of each transaction.

33. In an authorizing system, an authorizing position, a transmitter and means located at a point remote from said position for electrically transmitting data corresponding to transactions, a recorder at said position electrically operated in response to said transmitted data for recording the same, electrical means at said position manually controlled for officially approving or rejecting each transaction, and means operated in response to the operation of said electrical means for electrically controlling said transmitter at the remote point to indicate the approval or rejection of each transaction.

34. In an electrically operated authorizing system for merchandising stores wherein articles of merchandise are charged to customers at the time of sale, means for electrically transmitting indications from a sales position to a credit position identifying a sales transaction, electrical means controlled from the credit position for approving or rejecting such sales transaction at the sales position, a talking circuit, and means for completing said talking circuit between said sales position and said credit position only in case the said sales transaction is rejected.

35. In an electrical transmitting system for merchandising stores wherein data identifying articles of merchandise purchased by customers is automatically transmitted from the various sales floors at the time of sale, a device having a plurality of positions and manually operable to one of said positions dependent upon whether the customer is taking the article purchased or having it sent to the customer's address, and means for automatically transmitting additional data to indicate a take or send indication with each sales transaction dependent upon the position to which said device has been operated.

36. In an electrical transmitting system for merchandising stores, sales floors having articles of merchandise for sale, identification markings for each article, a transmitter operated at the time of sale of an article for electrically transmitting from the sales floor data corresponding to the markings of the article sold to identify the article sold, and means including said transmitter for electrically transmitting additional data from the sales floor to indicate whether the customer is taking the article purchased or having it sent to the customer's address.

37. In an electrical transmitting system for merchandising stores, sales departments having articles of merchandise for sale, identification markings for each article, customers' numbers assigned to each customer for identifying each customer, a transmitter operated at the time of sale of an article for electrically transmitting from the sales departments data corresponding to the markings of the article sold and data corresponding to the customer's number to identify both the article sold and the customer making such purchase, and means including said transmitter for electrically transmitting from the sales departments additional data to indicate whether the customer is taking the article purchased or having it sent to the customer's address.

38. In an electrically operated authorizing system for merchandising stores having charge accounts, a plurality of credit positions, each credit position normally assigned to handle a certain predetermined number of accounts, means for transmitting from a sales floor indications identifying a certain account during a sales transaction, and means automatically operated responsive to said transmission for selecting a particular one of said positions dependent upon the transmitted account identifications.

39. In an electrically operated authorizing system for merchandizing stores wherein articles of merchandise are purchased on credit or with cash, identification means used on credit sales when customers purchase articles on credit, different identification means used on cash sales when customers purchase articles with cash, a credit switch train for use in a credit sales transaction and a cash switch train for use in a cash sales transaction, a transmitter having means for transmitting sales data over either switch train, and means in said transmitter for selecting a particular one of said switch trains dependent upon the identification means used in a sales transaction.

40. In an accounting system, markings associated with merchandise for sale for identifying such merchandise, a transmitter, a device associated with said transmitter, means in said device operated in a sales transaction in accordance with the quantity of merchandise sold and in accordance with the total sales price of the merchandise sold, and means controlled by said markings and the operated means of said device in response to the closure of said transmitter for automatically transmitting data corresponding to said markings and to the operated means of said device.

41. In an accounting system, a card individual to an article of merchandise, markings in said card identifying this particular article of merchandise, a transmitter, a yard goods device associated with said transmitter, means in said device operative to designate the number of yards and the sales price of the portion of said article of merchandise sold, and means responsive to the insertion of said card in said transmitter, the operation of the means of said device in accordance with the yards and sales price of said portion, and the closure of said transmitter for transmitting data corresponding to the markings in said card and to the operation of said means of said device.

42. In an accounting system, a card common to a plurality of articles of merchandise, markings in said card identifying said plurality of articles of merchandise, a transmitter, a device associated with said transmitter, means in said device operated in a sales transaction to designate the number of said articles sold and their sales price, and means responsive to the insertion of said card in said transmitter, the operation of the means of said device in accordance with the number of said articles sold and their total sales price, and the closure of said transmitter for transmitting data corresponding to the markings in said card and to the operation of said means of said device.

43. In an accounting system, a transmitter for transmitting sales data when locked in operated position, a device comprising a plurality of operable means associated with said transmitter, and locking means in said transmitter operated only in response to the operation of a predetermined number of said device means and to the closure of said transmitter to lock said transmitter in operated position.

44. In an accounting system, a transmitter for transmitting sales data when locked in operated position, a first card having sales data thereon for insertion in said transmitter, locking means in said transmitter operated in response to the insertion of said first card into said transmitter and to the closure of said transmitter to lock said transmitter in operated position, a plurality of sales data devices associated with said transmitter, means for preventing the operation of said locking means to lock said transmitter in operated position in case any one of said devices are in operated position at the time of closure of said transmitter, a second card having different sales data thereon for insertion in said transmitter, and means for operating said locking means when said second card is inserted in said transmitter only in case a predetermined number of said devices are operated at the time of closure of said transmitter.

45. In an accounting system, a marking machine, a marking position in said machine, means for automatically feeding and stopping a card in said marking position, card check means in said machine associated with said marking position, a circuit controlled by said card check means for rendering said machine selectable only in case a card is in the marking position of said machine, means for thereafter automatically selecting said machine for use, and means in said machine for simultaneously marking said card with a plurality of data markings.

46. In an accounting system, a marking machine, means for automatically feeding a card to said machine, a marking position in said machine, means for automatically stopping said card in said marking position, card check means associated with the said marking position of said machine, a circuit controlled by said card check means for rendering said machine selectable only in case a card is in the marking position of said machine, means for automatically selecting said machine for use, a plurality of marking means in said machine, means in said machine for preparing a portion of said marking means in response to transmitted data, and means in said machine for thereafter simultaneously marking said card with a plurality of data markings in accordance with said prepared marking means.

47. In a recording system, means including an automatic code transmitted for electrically transmitting code impulses corresponding to different data, a plurality of recorders, a first decoding means and a plurality of relays operated in accordance with certain of the transmitted coded impulses for selecting a particular one of said recorders, means controlled by the operated ones of said relays for retransmitting in code the coded impulses of the transmitted data used to select said recorder, means including a second decoding means operated in accordance with said retransmitted coded impulses and in accordance with the remaining coded impulses of said data transmitted by said transmitter for operating said selected recorder to record in full the complete data, and a revertive control arrangement for delaying the transmission of the remaining coded impulses of said coded data until after said recorder is selected and operated in accordance with said retransmitted coded impulses.

48. In a recording system, means including an automatic transmitter for electrically transmitting impulses corresponding to different data, a plurality of recorders, means for selecting a particular one of said recorders in accordance with certain of the transmitted impulses, means controlled by said selecting means for retransmitting the impulses of the transmitted data used to select said recorder, and means for operating said selected recorder in accordance with said retransmitted impulses and in accordance with the remaining impulses of said data transmitted by said transmitter to record in full the complete data.

49. In a recording system, means including an automatic transmitter for electrically transmitting impulses corresponding to different data, a plurality of recorders, means for selecting a particular one of said recorders in accordance with certain of the transmitted impulses, means controlled by said selecting means for retransmitting the impulses of the transmitted data used to select said recorder, means for operating said selected recorder in accordance with said retransmitted impulses and in accordance with the remaining impulses of said data transmitted by said transmitter to record in full the complete data, and means for delaying the transmission of the remaining impulses of said data until after said recorder is selected and operated in accordance with said retransmitted impulses.

50. In a recording system, a record having markings corresponding to predetermined data, a transmitter for holding said marked record, a recording machine, means responsive to the insertion of said record in said transmitter and the closure thereof for automatically connecting said transmitter with said machine, a marking device in said transmitter, means for operating and locking said marking device in operated position in response to the closure of said transmitter, means responsive to said connection for automatically operating said machine to mark another record in accordance with the data markings in said first record, and means for automatically tripping said locked marking device to mark data on said first record responsive to said machine completing its marking operations.

51. In a recording system, a record having markings corresponding to predetermined data, a transmitter for holding said marked record, a marking device in said transmitter, means responsive to the insertion of said record in said transmitter and the closure thereof for automatically locking said marking device in operated position, means in said transmitter responsive to said closure for automatically transmitting electrical impulses corresponding to the markings in said record, a recording machine operated in accordance with said transmitted impulses for recording the same, and means in said transmitter for automatically tripping said locked marking device to mark data on said record in response to said machine completing its recording operations.

MARTIN L. NELSON.
HAROLD C. ROBINSON.